US012045792B2

United States Patent
Rastogi et al.

(10) Patent No.: US 12,045,792 B2
(45) Date of Patent: Jul. 23, 2024

(54) SYSTEMS AND METHODS OF IMPLEMENTING A DISTRIBUTED RETAIL POINT-OF-SALE HARDWARE MANAGEMENT NETWORK

(71) Applicant: Walmart Apollo, LLC, Bentonville, AR (US)

(72) Inventors: Vaibhav Rastogi, Ashburn, VA (US); Chirag D. Parikh, Ashburn, VA (US); Venkata Ravi Kumar Yeluru, Herndon, VA (US); Christian A. Griggs, Fairfax, VA (US); Jessie Yan, Gaithersburg, MD (US); Jerrad A. Patch, Fairfax, VA (US); Scott W. Plunkett, Brambleton, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 34 days.

(21) Appl. No.: 17/334,276

(22) Filed: May 28, 2021

(65) Prior Publication Data
US 2022/0383284 A1 Dec. 1, 2022

(51) Int. Cl.
G06Q 20/20 (2012.01)
(52) U.S. Cl.
CPC ......... *G06Q 20/201* (2013.01); *G06Q 20/202* (2013.01); *G06Q 20/209* (2013.01)
(58) Field of Classification Search
CPC ..... G06Q 20/202; G06F 21/53; G06F 21/566; G06F 21/629; G06F 2209/542;
(Continued)

(56) References Cited

U.S. PATENT DOCUMENTS 7,765,291 B1  7/2010  Khan
8,806,508 B2  8/2014  Ng
(Continued)

FOREIGN PATENT DOCUMENTS

AU  2019100428  6/2019
CN  104158882   11/2014
CN  111240863   6/2020

OTHER PUBLICATIONS

Schuldt et al., Automatic Generation of Reliable E-Commerce Payment Processes, Jan. 1, 2000, IEEE, Proceedings of the First International Conference on Web Information Systems Engineering, vol. 1, pp. 434-441 (Year: 2000).
(Continued)

*Primary Examiner* — Florian M Zeender
*Assistant Examiner* — Vanessa Deligi
(74) *Attorney, Agent, or Firm* — Fitch, Even, Tabin & Flannery LLP

(57) ABSTRACT

In some embodiments, apparatuses and methods are provided herein useful to establish retail point-of-sale (POS) hardware management systems, comprising: an intermediary system control circuit configured to execute computer program modules comprising: a hardware management module configured to operate as an intermediary module between multiple different sets of client POS systems, a plurality of different sets of hardware systems, and a plurality of shared resource applications. The hardware management module comprises a plurality of hardware manager sub-modules each corresponding to one of the sets of hardware systems. Each of the hardware manager sub-modules is configured to output communications and receive communications, for a corresponding one set of hardware systems of different sets of hardware systems, in accordance with a single predefined hardware communications protocol, of a set of predefined hardware communications protocols,
(Continued)

corresponding to the set of hardware systems regardless of a type of hardware system or manufacturer.

24 Claims, 24 Drawing Sheets

(58) Field of Classification Search
CPC ............ G06F 2221/2149; G06F 9/541; G06F 16/2308; G06F 16/2452; G06F 16/957; G06F 21/52; G06F 21/54; G06F 21/55; G06F 2209/481; G06F 2221/2101; G06F 2221/2107; G06F 2221/2141; G06F 8/40; G06F 8/76; G06F 9/30109; G06F 9/30185; G06F 9/3836; G06F 9/384; G06F 9/4552; G06F 9/468; G06F 9/4812; G06F 9/5072; G06F 9/545; H04L 63/10; H04L 63/0227; H04L 63/20; H04L 63/02; H04L 63/0245; H04L 63/0442; H04L 63/1441; H04L 63/1483; H04L 63/1491
See application file for complete search history.

(56) References Cited

U.S. PATENT DOCUMENTS

| | | | |
|---|---|---|---|
| 10,803,435 B2 | 10/2020 | Nelms | |
| 11,410,104 B2 | 8/2022 | Todd | |
| 2002/0077929 A1 | 6/2002 | Knorr | |
| 2003/0061266 A1 | 3/2003 | Ouchi | |
| 2003/0167195 A1 | 9/2003 | Fernandes | |
| 2004/0049427 A1 | 3/2004 | Tami | |
| 2004/0059634 A1 | 3/2004 | Tami | |
| 2004/0133474 A1 | 7/2004 | Tami | |
| 2005/0261969 A1* | 11/2005 | Dimmock | G06Q 20/20 705/16 |
| 2011/0125541 A1 | 5/2011 | Whitsitt | |
| 2011/0145093 A1 | 6/2011 | Paradise | |
| 2011/0218921 A1 | 9/2011 | Addala | |
| 2011/0231224 A1 | 9/2011 | Winters | |
| 2011/0238528 A1 | 9/2011 | Bezos | |
| 2012/0253985 A1 | 10/2012 | Maron | |
| 2013/0030875 A1 | 1/2013 | Lee | |
| 2013/0103187 A1 | 4/2013 | Canter | |
| 2013/0138517 A1 | 5/2013 | Khan | |
| 2013/0191230 A1 | 7/2013 | Edwards | |
| 2014/0049791 A1* | 2/2014 | Nakamura | H04L 67/02 358/1.13 |
| 2014/0100912 A1 | 4/2014 | Bursey | |
| 2014/0180777 A1 | 6/2014 | Moshrefi | |
| 2014/0236672 A1 | 8/2014 | Yoder | |
| 2015/0039462 A1 | 2/2015 | Shastry | |
| 2015/0073938 A1 | 3/2015 | Chuma | |
| 2015/0095173 A1 | 4/2015 | Wong | |
| 2015/0206116 A1* | 7/2015 | Bess | G06Q 20/202 705/21 |
| 2015/0269561 A1 | 9/2015 | Barrett | |
| 2015/0332239 A1 | 11/2015 | Anderson | |
| 2016/0005020 A1* | 1/2016 | Fernando | G06Q 20/202 705/21 |
| 2016/0171399 A1 | 6/2016 | Santhanam | |
| 2016/0232515 A1 | 8/2016 | Jhas | |
| 2016/0292660 A1 | 10/2016 | Yu | |
| 2017/0004422 A1 | 1/2017 | Todd | |
| 2017/0161728 A1 | 6/2017 | Satyanarayan | |
| 2018/0089654 A1 | 3/2018 | Licht | |
| 2018/0336384 A1* | 11/2018 | Maezawa | G06K 19/06 |
| 2019/0005477 A1* | 1/2019 | Sanders | H04W 4/80 |
| 2019/0384617 A1* | 12/2019 | Jain | G06F 9/547 |
| 2020/0193408 A1* | 6/2020 | Hadley | G06Q 20/385 |
| 2021/0073763 A1* | 3/2021 | Gonzales | G06Q 20/20 |
| 2021/0073766 A1* | 3/2021 | Gonzales | G06Q 20/3276 |

OTHER PUBLICATIONS

PCT; App. No. PCT/2022/031092; International Search Report and Written Opinion dated Oct. 4, 2022 (7 pages).

* cited by examiner ary process of a client POS system utilizing, through the network intermediary system, a library of shared resource services, in accordance with some embodiments.

SYSTEMS AND METHODS OF IMPLEMENTING A DISTRIBUTED RETAIL POINT-OF-SALE HARDWARE MANAGEMENT NETWORK

TECHNICAL FIELD

This invention relates generally to an intermediary network between networked system components.

BACKGROUND

Point of sale (POS) systems are critical to retail stores and retailers. Such systems are often costly. Further, these POS systems typically are difficult to manage and update.

BRIEF DESCRIPTION OF THE DRAWINGS

Disclosed herein are embodiments of systems, apparatuses and methods pertaining an intermediary network between networked system components. This description includes drawings, wherein.

Figure 1:
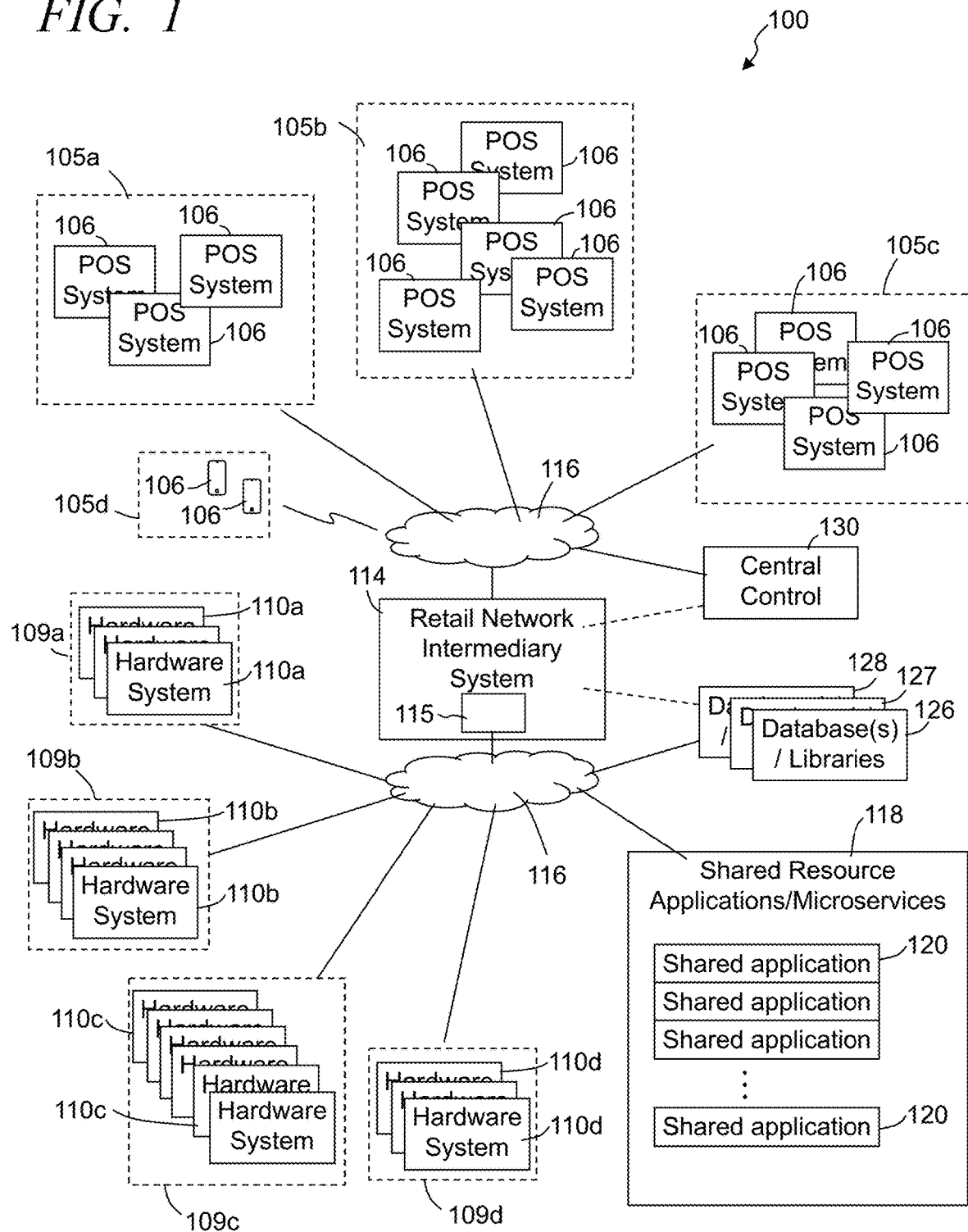
FIG. 1 illustrates a simplified block diagram of an exemplary networked retail point of sale system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide networked retail point of sale systems that include a retail network intermediary system that interfaces between physical point-of-sale (POS) systems utilized at retail stores in completing sales and physical hardware systems utilized by the POS systems to implement specific hardware functions, as well as interfacing between shared resource applications that can be executed during a sales process. It is common in a retail store to have multiple different types of POS systems. For example, most retail stores include multiple standard register POS systems that are operated by store associates (i.e., associated operated POS systems), often some retail stores include customer operated POS systems that allow customers to perform a check-out procedure, in some retail stores there are multiple different departments (e.g., pharmacy, automotive and/or tire service center, gardening center, electronics department, return or exchange department, other such departments, and often a combination of two or more of such departments) that in many instances employ department specific POS systems (which may be fixed in location and/or may be mobile platform POS systems) that are different than and/or implement different functionality than other POS systems at the retail store. As such, many retail stores include multiple different sets of different POS systems, where each set of POS systems is different than the other sets of POS systems. For example, associate operated POS systems are typically different, operate different and include different functionality than the customer operated POS systems. Similarly, automotive/tire center POS systems are typically different than and provide different functionality than associate operated POS systems, pharmacy POS systems, customer operated POS systems, etc.

Further, the different sets of POS systems often employ different physical systems that implement different operating systems, different internal POS communications and/or application program interface (API) protocol and different applications, which are typically unique to the manufacturer of the POS system, if not unique to the specific type of POS system. Accordingly, such a diversity of POS systems can result in a complex network with different sets of different, non-cooperative POS systems within a single retail store or set of stores. Additionally, such differences typically result in excess costs to maintain such different systems, acquire such different systems and operate such different systems. Still further, most retailer have to modify systems to comply with the specific POS API and/or communications protocols, which can significantly increase costs and typically imposes significant difficulties in attempting to implement any changes or upgrades.

Similarly, retail stores use numerous different kinds of physical, hardware systems that support and/or are utilized by POS systems. For example, many POS systems interface with an optical scanner (e.g., bar code scanner, image recognition scanner, etc.) that captures product identifying information in order acquire a cost for that product and add that cost to a sub-total during the process of completing a sale of one or more products. Similarly, many POS systems interface with a printer system to print receipts, product information, coupons, return information, and/or other relevant information for one or more products. Still further, most POS systems interface with a card reader system that reads credit card, gift card and/or other relevant cards identifying information in order to be used in acquiring payment for products being purchased by a customer. Similar to the multiple different sets of different types of POS systems, most retail stores utilize multiple different sets of different hardware systems (e.g., set of printer hardware systems, set of handheld scanner hardware systems, set of bed or stationary scanner hardware systems, set of scanner bed hardware systems, set of card reader hardware systems, set of weight scale hardware systems, set of cash in-take and/or out-put systems, set of cameras, a set of POS till drawer systems, a set of light controller systems, and other such hardware systems), and typically, within a given set of hardware systems, there are different kinds of hardware systems (as one example, within a set of printer hardware systems, there can be multiple different types of printers that may be used at the retail store and used with POS systems), which often are manufactured by different manufacturers. Accordingly, these different types of hardware systems operate differently, utilize different communication protocols, perform different functions, return different types of information and/or result in other such differences. These different types of hardware systems typically result in excess costs to acquire and maintain such systems, drastically limit an ability to update and/or make modifications, often cause significant complications in incorporating a new or different hardware system, and other such drawbacks.

Thus, some embodiments of the invention provide a networked retail point of sale system that establishes an intermediary system to streamline the cooperative operation of POS systems and hardware systems. Additionally, some embodiments enhance functionality of POS systems and/or hardware systems providing an interface between the POS systems and resource applications that can be shared across the multiple different sets of different POS systems. Similarly, some embodiments provide an interface between the hardware systems and the resource applications that can be shared across the multiple different sets of different hardware systems. Further, the retail network intermediary system, in some embodiments, greatly simplifies the cooperation between POS systems and hardware systems, between POS systems and the shared resource applications, and between the hardware systems and relevant shared resource applications. Still further, the retail network intermediary system significantly reduces the complexity of the networked retail point of sale systems, improves operations of the networked retail point of sale systems, and provides enhanced capabilities to the networked retail point of sale systems.

FIG. 1 illustrates a simplified block diagram of an exemplary networked retail point of sale system 100, in accordance with some embodiments. The networked retail point of sale system 100 includes one or more retail network abstraction intermediary systems and multiple different sets 105a-105d of one or more client point-of-sale (POS) systems 106 operated in association with a retail store. Typically, each set 105a of client POS systems includes client POS systems 106 that are different than the client POS systems of the other sets 105b-105d of client POS systems 106. For example, a first set 105a of POS systems 106 may be associate operated POS systems that are operated by retail store associates that check out customers to complete purchases of one or more products by the different customers; a second set 105b of client POS systems may be customer operated POS systems that are self-operated by individual customers; a third set 105c of client POS systems 106 may be one or more tire center client POS systems that are located in a tire center of the retail store; a fourth set 105d of multiple portable POS systems 106 that are utilized by store associates or customer (e.g., store associate mobile phone, store associate mobile tablet, customer mobile phone, customer mobile tablet, etc.); and other sets of client POS systems are often utilized in or associated with a single retail store or set of retail stores (e.g., gardening department, electronics department, pharmacy, returns department, layaway department, etc.). Similarly, these different sets 105a-105c of client POS systems 106 are typically different client POS systems that operate differently, provide different functionality, have different features, have different interfaces, provide access to and/or acquire different information, have different restrictions and/or conditions, other such differences or a combination of such differences. Further, these differences often result because the different client POS systems are manufactured from different manufacturers, utilize different operating systems, have different capabilities and/or other such differences.

The networked retail point of sale system 100 includes and/or is communicatively coupled with one or more hardware systems 110 associated with a plurality of different sets 109a-109d of different hardware systems 110 configured to be engaged by one or more of the client POS systems 106, other systems of the retail system and/or resource applications. As introduced above, the hardware systems can include, but are not limited to, printer systems, scanner systems, card reader systems, scale or weight measurement systems, imaging systems, communications systems (e.g., email communication systems, texting systems, etc.), copying systems, scanner bed systems, RFID tag reader systems, automated measurement systems, location detection systems, inventory detection systems, other such systems, and typically a combination of two or more of such different sets 109 of different hardware systems 110, where each set 109 corresponds to a function or physical task that is to be performed. For example, a first set 109a of hardware systems 110 may be printer systems providing a print function and that are utilized at least in part by one or more of the POS systems 106 (e.g., to print receipts); a second set 109b of hardware systems 110 may be product scanner systems (e.g., stationary and/or handheld bar code readers); a third set 109c of hardware systems 110 may be card reader systems that read credit card or other card information for use in acquiring payment on behalf of the customer for products being purchased by the customer; a fourth set 109d of hardware systems may be RFID tag reader systems; a fifth set of hardware systems may be image capture and product recognition systems; a sixth set of hardware systems may be scale or weighing systems; other such hardware systems; and typically a combination of two or more of such hardware systems are used by a one or more POS systems.

The simplified, exemplary networked retail point of sale system 100 illustrated in FIG. 1 is shown with three exemplary different sets 105a-105c of client POS systems 106 and four exemplary sets 109a-109d of hardware systems 110. It will be appreciated by those skilled in the art that the networked retail point of sale system 100 can include more or fewer different sets 105 of POS systems and/or more or fewer sets 109 of hardware systems 110. For example, the networked retail point of sale system 100 may include four, five, ten or more different sets 105 of POS systems 106 and/or four, five, fifteen or more different sets 109 of hardware systems 110. Similarly, the exemplary sets 105a-c of POS systems 106 are illustrated with three, five and four POS systems 106, respective, and the exemplary sets 109a-109d of hardware systems 110 are illustrated with three, four, six, and three hardware systems 110. It will be appreciated that more or fewer POS systems and/or hardware systems may be included in the respective sets of POS systems and sets of hardware systems. Further, in some implementations, one or more hardware devices 110 is directedly coupled to a single POS system 106. Still further, in some embodiments, one or more hardware devices 110 can be dedicated to and/or controlled by a single POS system 106 at a time. This control or ownership by the single POS system can be released to enable a different POS system to take control over that hardware system.

Further, the network retail point of sale system 100 further includes one or more retail network intermediary systems 114. In some embodiments, the network intermediary system 114 communicatively couples, over one or more distributed computer networks 116 and/or direct coupling, with one or more of the multiple different sets 105a-105c of the client POS systems 106 that are operated in association with the one or more retail stores. The network intermediary system 114 can be implemented through one or more local networked computer systems, one or more POS systems, one or more remote servers, other such computational systems, or a combination of such systems. Additionally or alternatively, the network intermediary system 114 can be implemented within a client POS system 106 and/or directly communicatively coupled with a particular client POS system 106. Accordingly, multiple different POS systems 106 can implement a respective network intermediate system 114. Furthermore, the network intermediary system 114 is typically communicatively coupled with the plurality of different sets 109a-109d of hardware systems 110. The network intermediary system 114 is configured to operate between at least one client POS system 106 and one or more and typically multiple hardware systems 110, and is reusable across the multiple different sets of client POS systems.

Additionally, the network retail point of sale system 100 further provides access to and/or includes a plurality of shared resource services 118 that are implemented through one or more shared resource applications 120 maintained on one or more non-transitory memory, databases, servers and/or other components storing multiple different shared applications 120 that are each accessible to be activated to implement one or more services or functions on behalf of the client POS systems 106 and/or hardware systems 110. The shared applications 120 enable the network retail point of sale system 100 to identify products based on product identifying information, compile products intended to be purchased, establish and/or update virtual cart information, acquire payment based on credit card and/or other card information, confirm conditions for purchases, complete purchases, and other such services. In some implementations, the retail point of sale system 100 utilizes shared application program interfaces (APIs) that operate to activate one or more of the shared applications 120 as part of a procedure or function initiated by one or more client POS systems 106 and/or hardware systems 110. The shared APIs, in some embodiments, are activated in response to each application service request from the client POS systems 106 and/or the hardware systems 110. Similarly, at least some of the shared APIs are configured to forward responses from the respective shared applications 120 based on the one or more services being performed. The responses can be returned to a state manager module (described in detail below) and/or some or all of the response may be returned to a particular client POS system 106 or particular hardware system 110 initiating the shared application. In some embodiments, however, one or more shared APIs may forward a response to a client POS system 106, a hardware system 110, or other component of the system that did not initiate the shared applications.

The network intermediary system 114 includes and/or is communicatively coupled, over one or more distributed computer networks 116 and/or directly, with the plurality of shared resource applications 120 and/or the system components (e.g., databases, servers, etc.) maintaining and/or storing the plurality of shared resource applications 120. Further, the network intermediary system 114 is coupled and operates between the client POS systems 106 and the resource applications 120, between the hardware systems 110 and the resource applications 120, and as described above between the client POS systems 106 and the hardware systems 110 providing an abstraction layer between these system components and operating at least in part as an interface between these system components. The retail network intermediary system is reusable across the multiple different sets of client POS systems and comprises an intermediary system control circuit 115 configured to execute computer program modules. The network intermediary system 114 is configured to be reusable across the multiple different sets of client POS systems and hardware network systems via the one or more networks 116 to enhance operation of the networked retail point of sale system 100, simplify the addition of different types of POS systems, hardware systems and resource applications, simplify the updating of POS systems, hardware systems and resource applications, and other such improvements to at least retail point of sale systems.

Figure 2A:
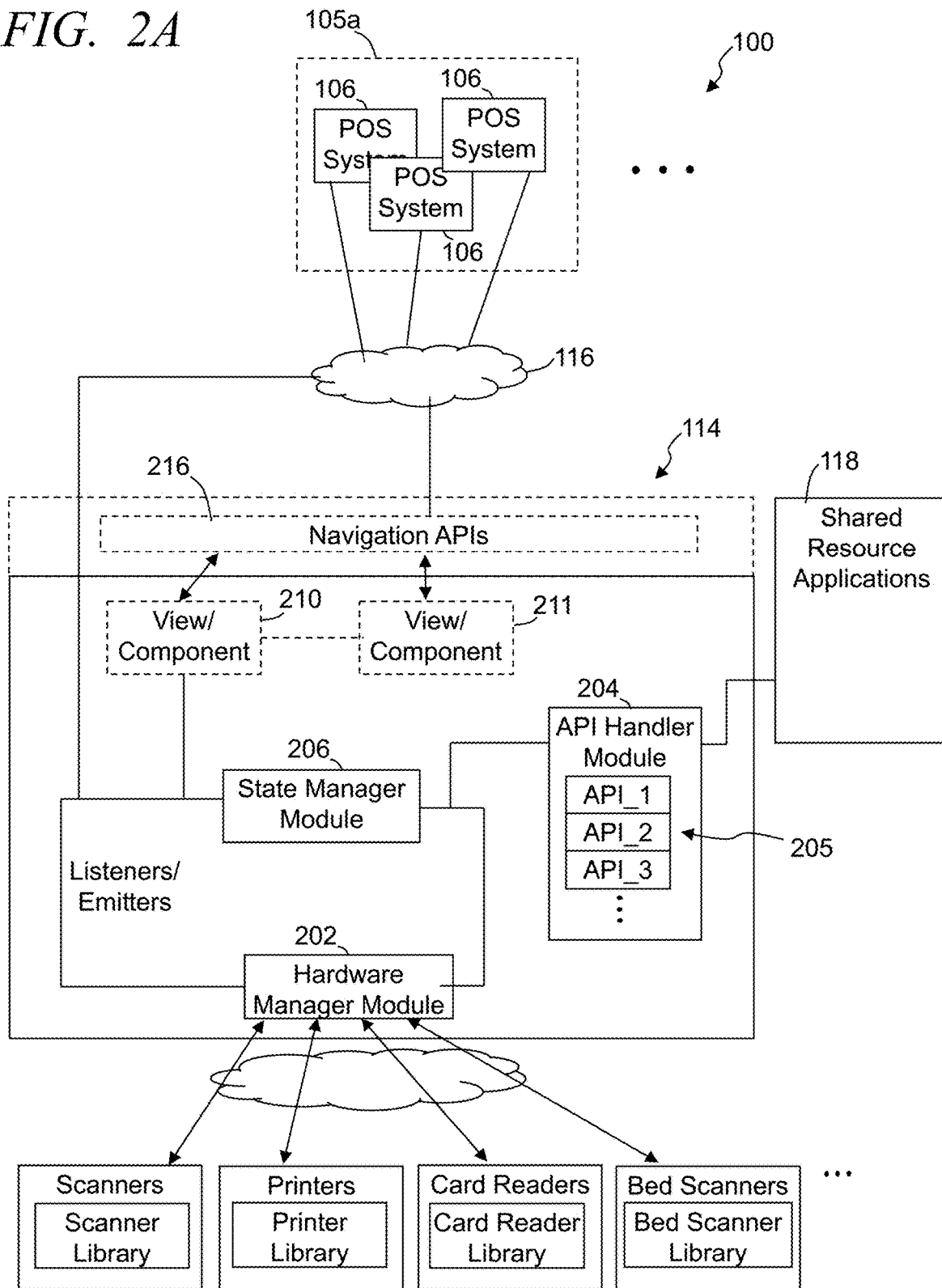
FIG. 2A illustrates a simplified block diagram of an exemplary network intermediary system as part of an exemplary networked retail point of sale system, in accordance with some embodiments.
Figure 2B:
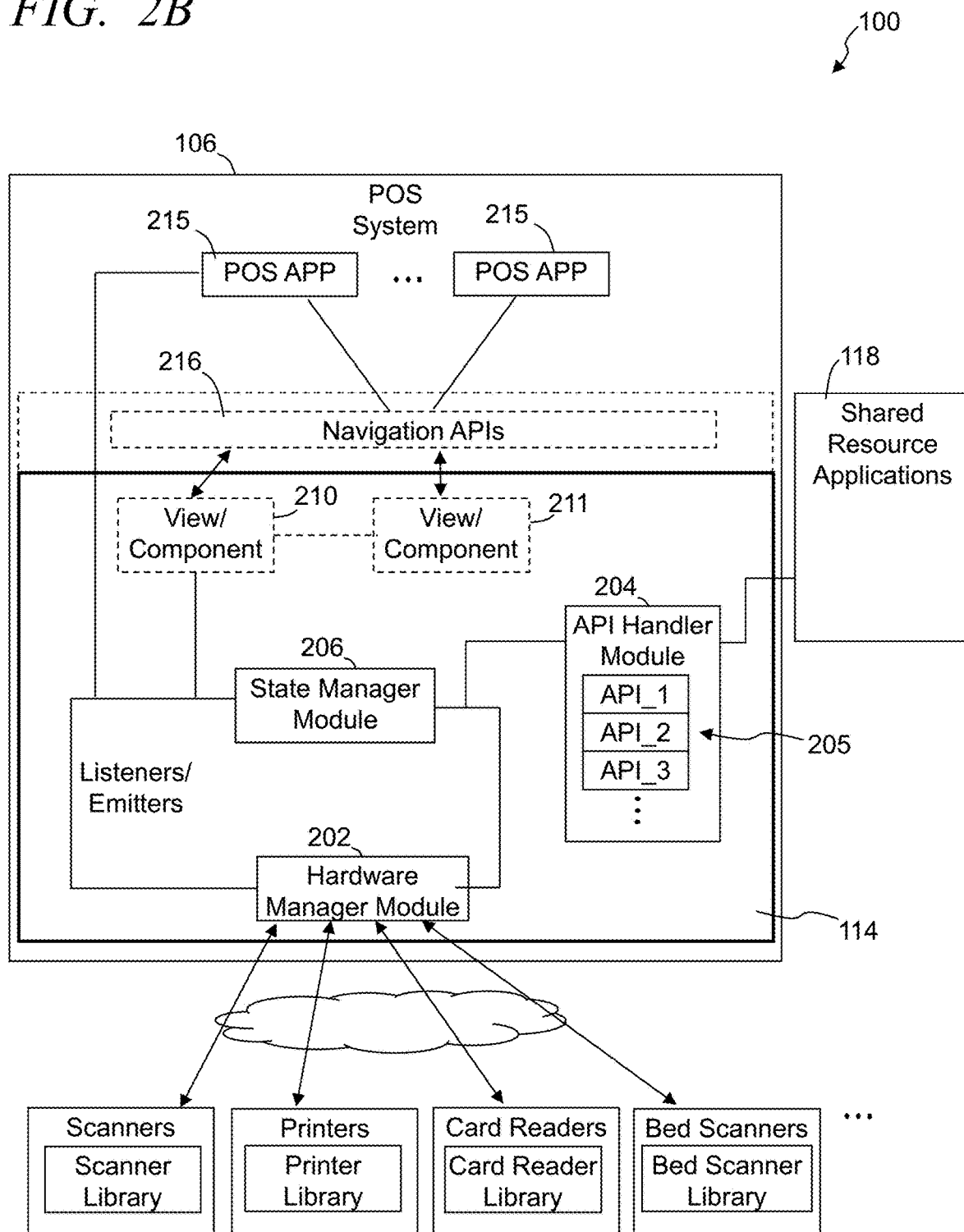
FIG. 2B illustrates a simplified block diagram of an exemplary network intermediary system implemented within a POS system as part of an exemplary networked retail point of sale system, in accordance with some embodiments.

FIG. 2A illustrates a simplified block diagram of an exemplary network intermediary system 114 as part of an exemplary networked retail point of sale system 100, in accordance with some embodiments. FIG. 2B illustrates a simplified block diagram of an exemplary network intermediary system 114 implemented within a POS system 106 as part of an exemplary networked retail point of sale system 100, in accordance with some embodiments. The network intermediary system 114, in some embodiments, is implemented through one or more software applications comprising code executed on a particular client POS system and utilized with one or more POS applications 215 of the particular POS system and/or POS applications 215 of POS systems communicatively coupled over the network. Referring to FIGS. 1-2B, the network intermediary system 114, in some embodiments, comprises one or more intermediary system control circuits 115 that are configured to execute a hardware manager module 202, an application program interface (API) handler module 204, and a state manager module 206. In other embodiments, the intermediary system control circuit is executed through one or more processors of a client POS system executing one or more network intermediary system applications. Some embodiments optionally include one or more view component modules 210-211 and/or one or more optional navigation APIs 216.

As described above, the network intermediary system 114 interfaces between one or more client POS systems 106, the different sets 109 of hardware systems 110, and the shared resource applications 120. The hardware manager module 202, in some embodiments, is configured to output and receive communications, commands and/or information to and from the different sets 109 of hardware systems 110. Further, the hardware manager module 202 limits the communications, commands and/or information to be specific to a single predefined hardware communications protocol for that set 109 of hardware systems 110 regardless of a type of hardware system or manufacturer of a respective one of the hardware systems of the respective set of hardware systems. Accordingly, in some embodiments, the hardware manager module 202 is configured to enable communications to and receive communications from one or more hardware systems 110 of a first set 109a (e.g., product identifier scanner systems, such as optical bar code scanners) according to an intermediary first hardware communications protocol (e.g., a single scanner communications protocol regardless of a type of scanner system or scanner manufacturer); enable communications to and receive communications from one or more hardware systems 110 of a second set 109b (e.g., printer systems, such receipt printers) according to an intermediary second hardware communications protocol (e.g., a single printer communications protocol regardless of a type of printer system or printer manufacturer); enable communications to and receive communications from one or more hardware systems 110 of a third set 109c (e.g., card reader systems, such as credit card reader systems) according to an intermediary third hardware communications protocol (e.g., a single card reader communications protocol regardless of a type of card reader system or card reader manufacturer); and other such single hardware communications protocols each corresponding to a single one of the different sets 109 of hardware systems 110.

In some implementations, a hardware supplier (e.g., distributor, manufacturer, etc.) that intends to enable a hardware system corresponding to a first set 109 of hardware systems (e.g., a printer system) is provided a corresponding first hardware communications library, software development kit or the like, corresponding to the single hardware communications protocol utilized within the network intermediary system 114 and associated with the first set of hardware systems. As introduced above, typically manufactures employ their own standard hardware communications and/or API protocol that is unique to the manufacturer if not to the particular type of hardware system, and different than the first predefined hardware communications protocol corresponding to the first set of hardware systems and different than other local hardware API protocols utilized by the other hardware systems of the first set of hardware systems. Accordingly, the hardware supplier utilizes the supplied first hardware communications library to establish an internal transformation library, within the hardware system, that defines translations of a set of hardware commands in accordance with the first hardware communications protocol to a corresponding set of hardware commands in accordance with a first local API protocol utilized internal to the first hardware system, and the transformation library defines translations from a set of local hardware responses in accordance with the first local API protocol to a corresponding set of hardware responses in accordance with the first hardware communications protocol. The hardware manager module 202, in some embodiments, thus utilizes a different, single predefined communications protocol per set 109 of the multiple different sets 109 of hardware systems with which the network intermediary system 114 is communicating regardless of the hardware system 110, type of hardware system, manufacturer of the hardware system, or other such factors. Instead, the hardware system 110 utilizes the hardware communications library, software development kit or the like corresponding to the set 109 of hardware systems with which the particular hardware system is associated, and establishes an internal transformation library based on that hardware communications library.

In some embodiments, the API handler module 204 is configured to identify and/or trigger one of the multiple different shared applications 120 of the shared resource services 118 to be activated in response an event at a client POS system and/or hardware system (e.g., based on a change in state), in response to each application service request from the client POS systems 106 and/or the hardware systems, and the like. The requests can include multiple different requests and/or activation instructions to initiate one or more shared APIs 205 that are utilized to implement one or more corresponding shared resource applications 120 to respectively implement one or more services. The shared APIs 205, in part, define the available interactions between software applications and/or applications of hardware systems. In some implementations, one or more of the APIs 205 define calls or requests that can be made to a corresponding application, how to make those calls, data formats used between the API handler module 204 and the shared resource applications 120, and other such parameters.

The shared applications 120 can include services regarding adding one or more products to a set of products a customer is attempting to purchase and/or adding one or more products to a virtual cart, initiating a product lookup based on product identifying information, initiating the charging of a credit card, initiating a debiting of a debit card, initiating a debiting of a gift card, initiating the acquisition of payment based on government subsidies, initiating a refund to a credit card, initiating an activation of a gift card, initiating adding an amount to a gift card, confirming conditions corresponding to a purchase of a product, other such services, or a combination of two or more of such services.

The shared applications 120 are shared through the API handler module 204 across the multiple different sets 105 of client POS systems 106 and the plurality of different sets 109 of hardware systems 110. The API handler module 204 activates shared APIs in triggering one or more of the shared resource applications 120. Further, shared APIs and the shared applications 120 typically are not specific to one of the different sets 105 of client POS systems 106 or one of the plurality of different sets 109 of hardware systems 110. The API handler module 204 is further configured to receive responses from some or all of the shared applications 120. The responses are typically in based on the application service being performed. Further, the API handler module 204 typically forwards the received responses, and/or information from the responses, to the state manager module 206.

The state manager module 206 is configured to manage state information corresponding to requests and responses between the client POS systems 106, the hardware systems 110 and the shared resource applications 120, and distribute the relevant state information to a relevant one of the client POS systems 106, the hardware systems 110 and the shared resource applications 120 in implementing and completing transactions through the client POS systems 106. In some embodiments, the state manager module further updates the respective state information during each of multiple different phases of a transaction. This updated state information is shared between one or more of a client POS system 106, a hardware system 110 and a shared resource application 120 actively implementing the transaction.

In some embodiments, the available one or more states, of the state manager module 206 corresponding to a particular shared API and/or shared resource application 120, are consistent across each of the multiple different sets 105 of client POS systems 106 that share and utilize the particular shared resource application 120 regardless of a type of POS system or manufacturer of the POS system. Similarly, the one or more states corresponding to a particular shared API and/or shared resource application 120 are independent of which of a particular client POS system 106 of the different sets 105 of client POS systems 106 initiates the implementation of the particular shared resource application 120. Further, in some embodiments, the state information maintained by the state manager module corresponding to a particular shared resource application 120, of the plurality of shared resource applications, is consistent for each implementation of the particular shared resource application regardless of which of the different sets 105 of client POS systems 106 and/or sets 109 of hardware systems 110 initiates the implementation of the particular shared resource application. Accordingly, in some implementations, the state information is source device independent and consistent across system components, and is dependent on the relevant transaction information being utilized by a shared resource application 120 and/or hardware system 110 and the respective state.

In some embodiments, the network intermediary system 114 includes the one or more optional view component modules 210-211 that are optionally utilized in supplying relevant display and/or graphical user interface (GUI) information to one or more client POS systems 106 that optionally elect to receive GUI information that dictate the rendering and/or functionality provided through one or more GUIs and/or other user interfaces as part of one or more processes implemented through the respective POS system. The client POS systems 106 can be configured to optionally utilize the GUI information in populating and/or generating one or more GUIs and/or other such interfaces. For examples, the GUI information may dictate one or more types of display options or buttons to include in a GUI, functionality associated with the one or more options, information to be displayed, how information is to be displayed, where information and/or options are to be displayed, other such information, and typically a combination of two or more of such GUI information. Again, the GUI information is optional and client POS systems can optionally elect to utilize some, all or none of the GUI information. Some embodiments provide client POS systems 106 with optional navigation APIs 216 that facilitate the transition between optional functional GUIs that provide access to different services and/or functions through the network intermediary system 114. The client POS systems can elect to utilize one or more of these functional GUIs. Other client POS systems may implement different local GUIs utilizing information provided by one or more of the view component modules 210-211, state manager module 206, API handler module 204 or other components. Further embodiments optionally active and/or include the one or more navigation APIs 216 that enable access to relevant view component modules 210-211 and render a GUI, based at least in part on the component information from the view component modules 210-211, that are supplied to one or more client POS systems 106 that optionally elect to utilize system generated GUIs.

Figure 3:
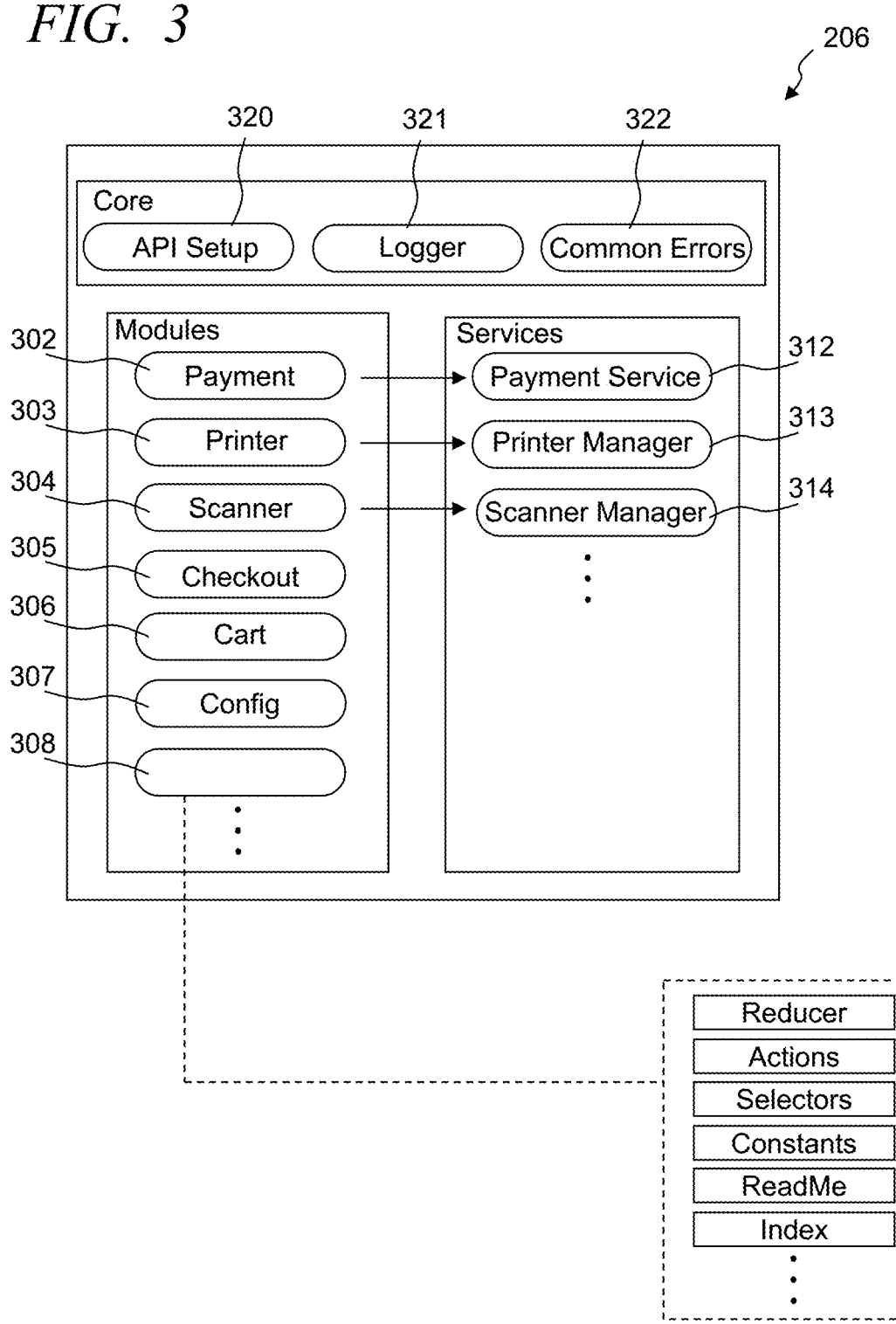
FIG. 3 illustrates a simplified block diagram of an exemplary state manager module, in accordance with some embodiments.

FIG. 3 illustrates a simplified block diagram of an exemplary state manager module 206, in accordance with some embodiments, implemented through multiple state manager sub-modules 302-307. In some embodiments, the state manager module 206 manages the different states and state information through the state manager sub-modules 302-307. Further, in some implementations, one or more or each of the state manager sub-module 302-307 corresponds to one of a shared service accessible through the different shared applications 120. Further, each state manager sub-module 302-307 is configured to manage and/or maintain state information corresponding to at least a current state of each active transaction utilizing one of the shared applications 120 for a respective shared service and being implemented through the sets of different client POS systems. In some embodiments, one or more of the state manager sub-modules each corresponds to a different one of the sets 109 of hardware systems 110, and each of the two or more of the state manager sub-modules corresponding to one of the sets of hardware systems is configured to maintain state information corresponding to at least a current state of one or more hardware systems of the respective set of hardware systems.

The state manager sub-modules, in some implementations, operate independent of the other state manager sub-modules and manage the state information relevant to the respective functionality and/or service. The state manager module 206 manages states of communications and/or state of operation information between the client POS systems 106 and the hardware systems 110, between the client POS systems 106 and the resource applications 120, and between the hardware systems 110 and the resource applications 120. The state information can include, for example, hardware devices that are active, error information and/or states, response states, and other such information. The states and/or state information are dependent on the hardware system and/or shared application, where different states and different numbers of states are maintained for different shared applications, and hardware systems. For example, there may be many more error states of a printer hardware system (e.g., out of paper, out of ink, lid open, unsuccessful print, etc.) than for a scanner system. In some embodiments, the state manager module 206 includes one or more standard or core state manager sub-modules that can manage state information about the operation of the networked retail point of sale system 100, such as but not limited to a API setup state manager sub-module 320 that manages state information about the shared resource applications 120, a log state manager sub-module 321 that manages information logging events, a system error state manager sub-module 322 that manages error states regarding errors occurring over the system, other such common or core state manager sub-module, or a combination of two or more of such core state manager sub-modules.

As described above, the state manager module 206 maintains and updates state information for each phase of a transaction. In some embodiments, the state manager module, in updating the state information, is configured to maintain conditional error state information initiated by a shared resource application 120 in response to a conditional error event preventing completion of a service function being performed by the shared resource. The state manager module manages this information, and in some embodiments causes at least some of the conditional error state information to be communicated to an appropriate client POS system initiating the service of the shared resource application. Similarly, responses to the error condition can similarly be maintained by the state manager module 206 and/or communicated to the shared resource application as part of a process to address the conditional error.

For example, one or more conditions may be set in order to complete a purchase of a particular item. Such conditions may include age restrictions, identification of person making the purchase (e.g., with pharmacy purchases), limits on a number of an item that can be purchased, other purchase conditional errors. Similarly, conditional errors may occur as a result of a hardware system operation (e.g., printer out of paper, card reader was unsuccessful, card reader lost network connection, invalid scan, etc.). Accordingly, the state manager module 206 manages error conditions and relevant error state information.

Figure 4:
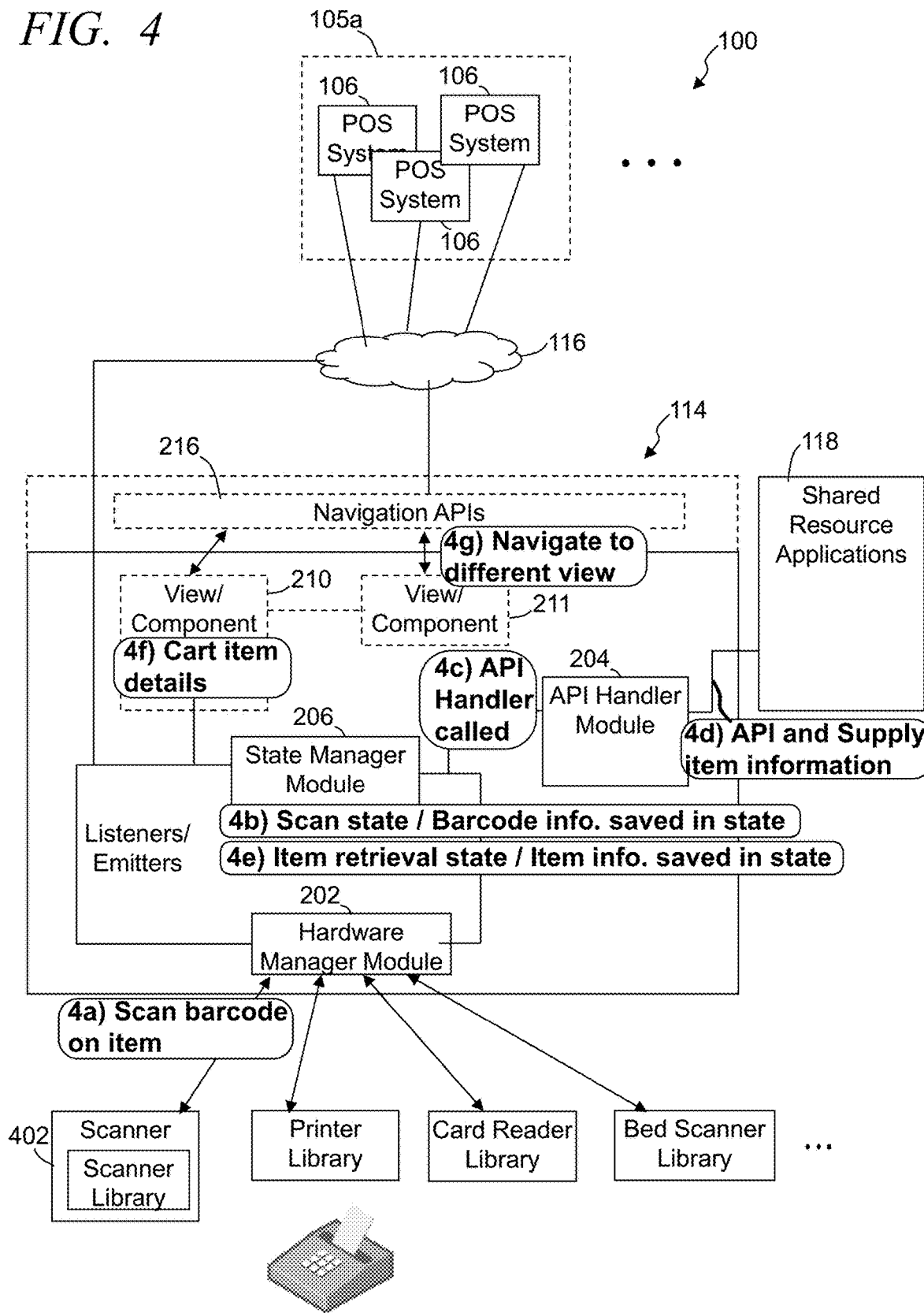
FIG. 4 shows a simplified block diagram of an exemplary network intermediary system and an exemplary cart transaction process, in accordance with some embodiments.

FIG. 4 shows a simplified block diagram of an exemplary network intermediary system 114 as part of an exemplary networked retail point of sale system 100 while further illustrating an exemplary cart transaction process, in accordance with some embodiments. In this example, the network intermediary system 114 supports the additional of a product to a virtual cart for purchase by a customer of the retail store. In step 4a, scanned product identifying information is received through the hardware manager module 202 from a scanner hardware system 402. The scanner hardware manager module identifies, based on the source of information and type of information, a shared resource application 120 that is to be activated and forwards the scanned information. The state manager in step 4b updates the scanner state. In some embodiments, a scanner state manager sub-module 304 updates a corresponding state information for the scan event, and in some instances saves some or all of the event and/or scan information. In step 4c, the API handler module 204 is notified of the event, which in this example is a scan of a product and receives at least the scan information. In step 4d, the API handler module 204 activates one or more shared APIs to trigger the relevant one or more shared resource applications 120 and communicates at least the relevant scan information to the relevant shared resource application. The activated shared resource application 120, in this example, accesses a product inventory database 126 and/or other product database, and utilizes the scan information (e.g., relevant barcode identifying number received from the scanner hardware) to identify the product scanned and acquire relevant product information (e.g., one or more of product identifying information, price, product description, manufacture and/or supplier information, product location within a retail store environment, inventory level, and/or other such information). In step 4e, the API handler receives the acquired product information from the shared resource application and the scanner state manager sub-module updates at least the state of the event, and in some instances updates the state information to include some or all of the product information.

As described above, in some instances a client POS system may be configured to take advantage of the optional view component module 210-211 in rendering some or all of a GUI. In some embodiments, optional step 4f is implemented where an optional relevant view component module 210 (e.g., a cart view component) detects the change in the updated state and/or receives the acquired product information and outputs relevant display and/or GUI information based on the scan event and at least some of the product information. The steps 4a-4f can be repeated any number of times as additional products are scanned with an intention, in this example, to add the product to a virtual cart or listing of products a customer intends to purchase. In some implementations, the client POS system waits in the current view (e.g., add products to cart GUI view) for subsequent product information corresponding to a subsequent product scanned to be added to the customer cart. In some embodiments, the client POS system 106 can further be optionally configured, for example in response to an activation of an option associated with the displayed information, to utilize the navigation API module 216 to navigate to activate one or more other events (e.g., a check-out event) and render a different corresponding GUI associated with the other event. Navigation APIs, in some implementations, are APIs that are triggered on the client POS systems 106 in response to predefined changes in state information and/or the occurrence of one or more events through a shared resource application 120 and/or hardware systems 110. At least some navigation APIs are configured to activate a different GUI on a corresponding client POS system based on action by a user, such as in response to a user selecting a graphical option in a GUI (e.g., "Checkout" option); based on response from shared applications; based on events occurring at a particular hardware system; and/or other such events or triggers. In this example, once the scanning of products is complete an option is typically activated through a client POS system 106 to initiate a different event or function. An option can be initiated through the client POS system to acquire payment from the customer through a check-out function or event. In some embodiments, the activation of a new event can optionally activate one or more navigation APIs 216, in step 4g, to initiate a corresponding view component 211, such as a check-out view component in this example to cause a check-out GUI to be rendered through the client POS system as part of a checkout process.

Figure 5:
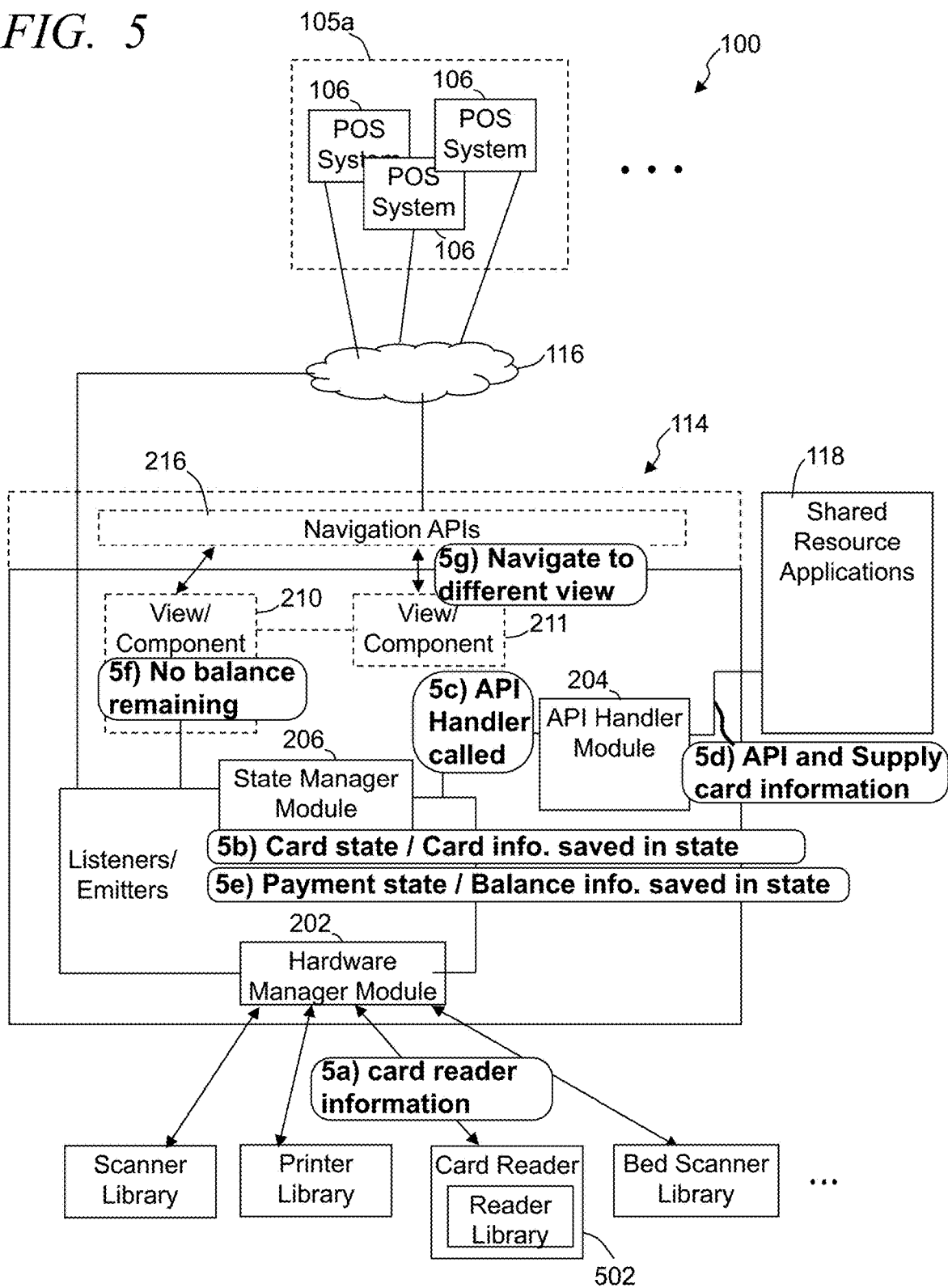
FIG. 5 shows a simplified block diagram of an exemplary network intermediary system and an exemplary checkout transaction process, in accordance with some embodiments.

FIG. 5 shows a simplified block diagram of an exemplary network intermediary system 114 as part of an exemplary networked retail point of sale system 100 while further illustrating an exemplary checkout transaction process, in accordance with some embodiments. In this example, the network intermediary system 114 supports the acquisition of payment for one or more products identified in a cart listing or virtual cart identifying products a customer intends to purchase. Further, the payment may be for some or all of a total amount due for the products. In step 5a, the hardware manager module 202 receives even information, in this example, of card information from a card reader hardware system 502 with which a customer has interacted to supply card information. The card may be a credit card, a debit card, a gift card, a government subsidies card, or other such card. The card reader hardware system 502 is configured to utilize the internal card reader transformation library to put the relevant information into an appropriate format and communicate the card information in accordance with the predefined card reader hardware communications protocol that it utilized by the network intermediate system 114 in communications between the network intermediary system 114 and any of the different card reader hardware systems of the set of card reader hardware components with which the card reader hardware system 502 is associated. In some implementations, this includes communication of the card information in accordance with an encrypted format and/or other protection can be applied to the card information.

In step 5b, card reader state information is created and/or updated to indicate receiving card information from a particular card reader. A card reader or payment hardware manager sub-module and/or the state manager module 206 further recognizes the particular card reader hardware system 502 as the source of the card information and further identifies an association between the card reader system and a particular client POS system 106 awaiting payment information. For example, the particular POS system as part of a checkout procedure may initiate a payment acquisition process and the hardware manager module 202 and/or state manager module 206 is notified that the particular client POS system 106 is awaiting payment, and/or the notification may specifically include an identifier of the card reader hardware system 502 with which the particular client POS system is associated (e.g., is physically proximate to and/or within a threshold distance of the particular POS system (e.g., at a same checkout lane within a retail store, secured with the particular POS system or physical secured as part of a system that includes the particular POS system, the particular POS system communicates an identifier of the card reader hardware system 502 from which it is expected payment information, or the like). In some embodiments, a payment state manager sub-module 302 updates the state information corresponding to the checkout and payment process, and in some embodiments some or all of the card information is saved in the state, typically in an encrypted format or other protected format.

In step 5c, the API handler module 204 detects the state change and/or is notified of an API call by the card reader hardware system 502. In step 5d, the API handler module 204, in response to the state information and/or the receipt of the card information, calls or triggers one or more shared APIs, such as a Visa API, to initiate one or more relevant shared resource applications 120 to acquire payment information, such as from a third party card service (e.g., one or more shared credit card applications). As described above, in some implementations, the shared resource applications are accessed and implemented, through one or more communication networks 116 (e.g., the Internet, intranet, cellular network etc.), through one or more cloud based servers and/or databases, and typically are external to the network intermediary system 114. One or more of the shared APIs may be managed by the retail store, such as a gateway API, that enable access to and/or provide security in accessing one or more third party applications 120. The API handler module 204 receives one or more responses from the one or more shared resource application activated to acquire payment. The one or more responses include information about whether payment was successfully received or one or more errors occurred and/or one or more conditional errors occurred. Again, conditional errors typically correspond to a failure of a service or even based on a condition that is to be satisfied prior to completion of the service. For example, prior to completing the acquisition of payment, a conditional error may be issued, particularly with debut cards, where a customer is to satisfy one or more conditions, such as entering in a pin number at the card reader hardware system 502 or other keypad. Further, the API handler module 204 notifies the state manager module 206 of the status of the response from the shared resource application(s). In step 5e, the state manager payment sub-module 302 updates the corresponding state information based on whether the full payment received, partial payment received, one or more conditional errors, one or more errors and/or other relevant state information.

In the example payment process illustrated in FIG. 5, when payment is confirmed, the card reader or state manager payment sub-module 302, in step 5e, updates the state information. Based on the updated state information corresponding to the payment information from the shared resource application, payment balance information can be provided, in step 5*f*, to a view component module 210 to provide a GUI and/or GUI information to be used in rendering payment balance information at the client POS system. In some implementations when a balance is still due (e.g., payment of part of the total by a first card, such as a gift card), the payment GUI can be maintained and one or more of steps 5*a*-5*f* can be repeated to obtain further payment and/or one or more other payment processes can be implemented. When no further payment is due and there is no further balance, some embodiments provide that information through an optional view component module 210 to a relevant client POS system. In some embodiments, one or more navigation APIs 216 may be activated in step 5*g* to navigate to a different GUI view, such as a print receipt GUI view and/or a print receipt process is implemented through the 114 the network intermediate system to activate one or more shared resource applications and one or more printer hardware systems to print one or more receipts and/or other information (e.g., product information, return policy information, coupon(s), warranty information, and/or other such information). For example, some embodiments initiate a subsequent event or service, such as a receipt service to print a receipt through the network intermediary system 114 interfacing with one or more printer hardware systems. In some embodiments, one or more navigation APIs are initiated, such as a receipt view API, to activate one or more view components to provide a receipt view GUI and/or GUI information for use in rendering by the relevant POS system a receipt view API.

The API handler module 204, in some embodiments, provides function blocks of shared APIs that are triggered through user interface options, calls from one or more other shared resource APIs and/or application 120, or the like (e.g., through JavaScript user interface code). Again, the API handler module 204 provides access to optional functionality that client POS systems 106 and/or hardware systems 110 can optionally utilize to take advantage of these shared services through the network intermediary system 114. Further, the API handler module provides an abstraction of the interface between client POS systems and the shared resource applications 120, and similarly between the hardware systems and the shared resource applications 120, through an established library of numerous APIs that respectively trigger and/or interface to multiple applications providing optional microservices.

In some embodiments, the API handler module 204 is configured to receive application service requests from each of the client POS systems 106 utilizing the shared resource applications 120 and requesting to implement any one of the shared resource applications. Similarly, the API handler module 204 is further configured to receive service requests from each of the hardware systems 110 requesting to implement any one of the shared resource applications, and/or receive information from a hardware system to be utilized in satisfying a request from a client POS system. Based on the respective requests, the API handler module 204 in some embodiments is configured to identify the requested shared resource application 120, initiates a respective API and routes relevant state information acquired from the state management module and/or other relevant request information to the requested shared resource application. In some embodiments, the API handler module is configured to identify a source (e.g., a particular client POS system or particular hardware system) of an application service request and identify request information communicated with the application service request. Based on the source of the application service request and the request information communicated with the application service request, the API handler module is configured to identify a shared resource application of the resource applications to be activated and forward at least some of the request information to be utilized by the identified resource application.

Further, some shared resource applications perform one or more functions and/or services based on the requests. Similarly, many of the shared resource applications return response information based on the service performed and the request information received. The API handler module 204, in some embodiments, is configured to receive the response information from the respective applications and through the respective API, and direct the response information to the requesting client POS system or hardware system and/or to the state manager module 206, which in turn may direct the relevant information to the requesting client POS system or hardware system. In some embodiments, the API handler module 204 establishes API sub-modules providing an accessible service that is shared across the system and can be used by the different sets 105 of client POS systems 106 and/or the different sets 109 of the hardware systems 110.

Figure 6:
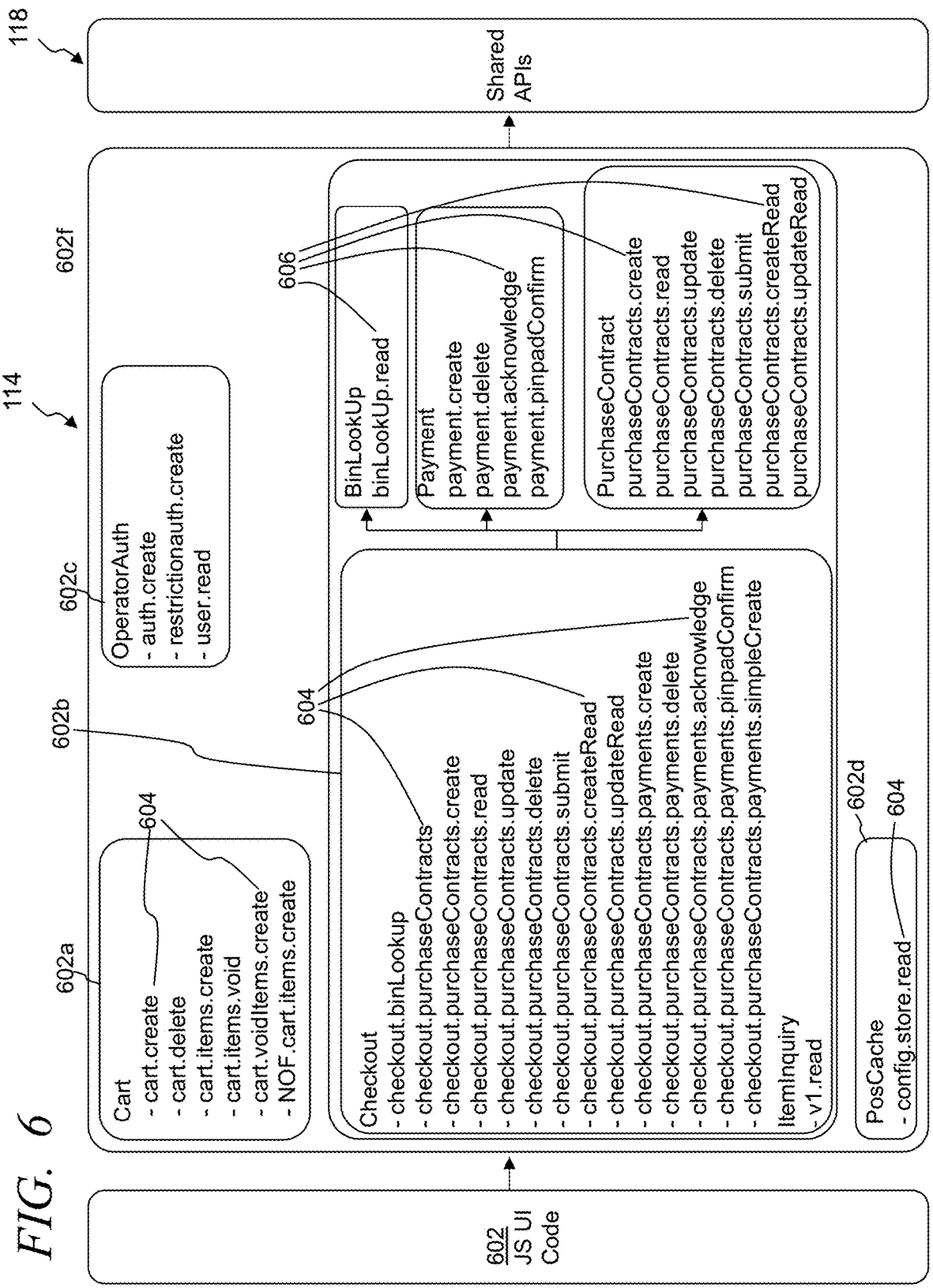
FIG. 6 illustrates a simplified representation of some an exemplary API hander module, in accordance with some embodiments.

FIG. 6 illustrates a simplified representation of some an exemplary API handler module 204 comprising multiple subsets of shared APIs establishing API hander sub-modules 602*a*-602*d*, in accordance with some embodiments. Each of the subsets of the shared APIs or API handler sub-modules 602*a*-602*d*, in some implementations, cooperatively operated to implement a respective one of multiple corresponding shares services on behalf of at least one of the client POS systems and the hardware systems. The API handler sub-modules 602*a*-602*d* are associated with a service or function available through one or more shared resource applications 120. Further, some or all of the API handler sub-modules 602 include one or more calls 604 to the corresponding shared resource APIs that trigger the respective one or more shared resource applications 120 providing the functionality of a particular service. Some calls 604 are calls to sets of one or more sub-calls 606 that provide the actual calls to the one or more shared resource applications 120. For example, API handler sub-modules include a cart API sub-module 602*a* that provides calls for cart services (e.g., creating a virtual cart or product listing of products intended to be purchased by a customer, deleting a cart, deleting an item from a cart, adding an item to a cart, etc.); a checkout API sub-module 602*b* that provides calls for checking out and obtaining payment, which may include calls to sub-calls 606. Some calls 604 are calls to sets of one or more sub-calls 606 (e.g., a bin lookup, payment sub-calls, purchase contract sub-calls, etc.); operator authorization sub-module 602*c*; a configuration sub-module 602*d*; and other such sets of call to different services available through the shared resource applications 120.

As a further example, some embodiments provide a POS cache sub-module 602*d* that provides configurations to client POS systems 106 of different sets 105 of client POS systems. In some embodiments, some or all of the client POS systems 106 utilize a configuration in part to define accessibility and/or limits to which resource services and shared resource applications that the POS system is authorized to implement and use. Further, some configuration information specifies access authorization that is defined based on a particular store, a particular department of a store, etc., in which the POS system operates and/or with which set 105 of POS systems a particular POS system is associated. As such, upon activation a client POS system 106, in some embodiments, accesses a configuration API through the POS cache sub-module 602*d* and downloads the configuration corresponding the store and/or department within which it operates. In some instances, some or all of the configuration is saved in the state manager module 206 and the state manager module uses the configuration to restrict access to authorized shared resource applications and/or shared APIs as dictated by the relevant configuration. At least some of the calls 604 and/or sub-calls 606 can activate one or more shared resource applications. For example, a checkout API sub-module 602b may include API calls 604 to sub-calls 606 (e.g., "binLookUp.read" sub-call) that is or includes an HTTP call to a particular shared resource application 120 to implement at least part of the service accessible through the API handler module 204. Other calls may be calls to memory and/or to one or more databased to retrieve and/or store data (e.g., product information, authorization information, customer information, store information, location information, other retail information, or a combination of two or more of such information), calls to trigger one or more notifications, calls to activate functionality of one or more hardware systems 110, or other such calls.

As described above, the hardware manager module 202 is configured to operate as an intermediary module between a plurality of different sets 109 of hardware systems 110, the multiple different sets 105 of client POS systems 106 that operate in association with one or more retail stores, and a plurality of shared resource applications 120. Further, the hardware manager module 202 is configured to output communications and receive communications, for each set 109 of hardware systems 110 of the plurality of different sets of the hardware systems, in accordance with a single one of predefined hardware communication protocol, of a set of predefined hardware communications protocols, regardless of a type of hardware system or manufacturer of a respective one of the hardware systems of the respective set of hardware systems cooperatively operating with the hardware manager module 202. Further, the hardware manager module 202, in managing communication with the sets of hardware systems, is configured to communicate in some embodiments with each hardware system 110 of a first set 109a of hardware systems (e.g., printer hardware systems) according to a first hardware communications protocol (e.g., a printer communications protocol) regardless of a manufacturer of the printer hardware system, type of printer hardware system, operating system of the printer hardware system, API communications protocol or other factors. Similarly, the hardware manager module 202 is configured to communicate in some embodiments with each hardware system 110 of a second set 109b of hardware systems (e.g., product scanner hardware systems) according to a second hardware communications protocol (e.g., a scanner communications protocol) regardless of a manufacturer of the product scanner hardware system, type of product scanner hardware system, operating system of the product scanner hardware system, API communications protocol or other factors.

As introduced above, each set 109 of hardware systems 110, of the plurality different sets of hardware systems, is configured to perform a different physical function than the physical function of the other sets 109 of hardware systems. For example, a first set 109a of hardware systems 110 may be printer hardware systems that print one or more types of documents, a second set 109b of hardware systems may be card reader hardware systems that acquire card information (e.g., credit card information, gift card information, government issued card information, government subsidies card information, debut card information, etc.), a third set 109c of hardware systems may be product scanner hardware systems (e.g., optical barcode scanners), a fourth set 109d of hardware systems may be RFID tag readers, a fifth set of hardware systems may be weight or scale hardware systems, and/or other sets of hardware systems.

Similarly, hardware systems 110 within a single set 109 often include different types of hardware systems and/or are from different manufacturers implementing different internal hardware APIs. For example, in some embodiments a first set of hardware systems may be printer hardware systems, with at least two of those printer systems comprising printer different printer systems from two different manufacturers, and each of the two different printer systems is configured to execute different printer APIs each utilizing a different local printer API protocol. The hardware manager module 202, however, is configured to communicate with each different hardware system of a set of hardware systems (e.g., different printer systems) according to the single intermediary hardware communications protocol for that set 109. For example, the hardware manager module is configured to communicate with each different printer system according to the single intermediary printer communications protocol defined by a printer API library 231 regardless of the printer API executed by the respective different printer systems 241 such that each different printer system is configured to execute a transformation layer to transform communications received according to the intermediary printer communications protocol to a respective local printer API protocol executed on the specific printer and to transform communications from the local printer API protocol to the intermediary printer communications protocol prior to communicating to the network intermediary system 114.

Each hardware system 110 further utilizes a respective internal transformation library, established based on the relevant API library for that set, to transform the internal API communications protocol into the appropriate predefined transform communications from the local printer API protocol to the intermediary printer communications protocol prior to communicating to the retail network intermediary system 114 intermediary hardware communications protocol. For example, a first printer hardware system of at least two different printer hardware systems comprises a first transformation library accessed by a respective first transformation layer of the first printer system. The first transformation library defines translations of a set of print commands in accordance with the predefined intermediary printer communications protocol, utilized by the network intermediary systems 114 for each printer hardware system, to a corresponding set of print commands in accordance with a first local API protocol utilized internal to the first printer system. Similarly, the first transformation library defines translations from a set of local printer responses in accordance with the first local API protocol to a corresponding set of printer responses in accordance with the predefined intermediary printer communications protocol.

Figure 7:
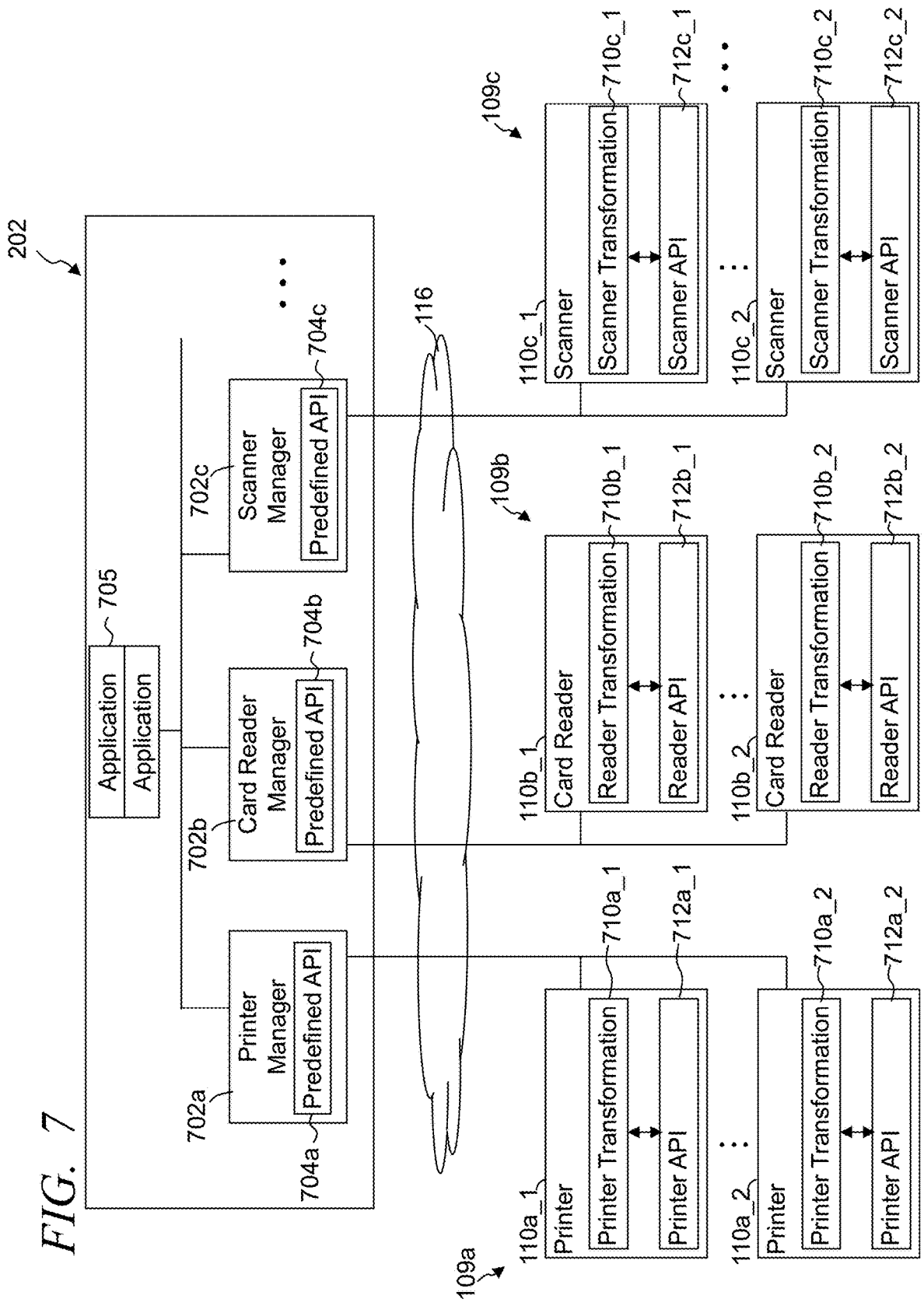
FIG. 7 illustrates a simplified block diagram of an exemplary representation of a hardware manager module, in accordance with some embodiments.

FIG. 7 illustrates a simplified block diagram of an exemplary representation of a hardware manager module 202, in accordance with some embodiments. Again, the hardware manager module 202 integrates a common manager across multiple different hardware systems. The hardware manager module 202, in some embodiments includes multiple hardware specific sub-modules 702a-702c that each correspond to one of the sets 109 of different hardware systems 110 that interface with the retail network intermediary system 114. For example, the hardware manager module 202 can include a printer manager sub-module 702a, a card reader manager sub-module 702b, a product scanner manager sub-module 702c, a weight scale manager sub-module, a register cash drawer manager sub-module, a scanner bed manager sub-module, and/or other such sub-modules corresponding to the different sets of hardware systems. In some embodiments, each hardware manager sub-module 702a-702c includes a corresponding predefined API 704a-704c that provides the corresponding intermediary predefined communications protocol corresponding to the respective set 109 of hardware systems cooperatively operating with the hardware manager module 202.

The hardware manager module 202 typically further implements one or more applications 705 to interface with the state manager, identify hardware system sources of communications, identify intended recipient client POS systems 106 and/or shared resource applications 120, add additional hardware systems, remove a hardware system, enable updating of one or more of the corresponding predefined APIs 704, other such functionality, and typically a combination of such functionality. In some embodiments, one or more of the applications 705 can be implemented through known application protocols, such as JavaScript, React Native, etc. The hardware manager sub-modules 702 in some implementations are similarly developed to effectively interact with one or more other applications 705. For example, some or all of a sub-module 702 can be implemented as a React Native module. Further, in some embodiments, each predefined API 704 for a respective set 109 of hardware systems is independent of the other APIs 704, and similarly can be developed independently of the others and/or upgraded independently of the others. In some embodiments, each hardware system 110 further utilizes a respective internal API transformation library 710a, established based on the relevant predefined API library for that set 109 of hardware systems, to transform between the internal API communications protocol utilized by the hardware system API 712 and the intermediary predefined communications protocol corresponding to that set 109 of hardware systems and utilized by the corresponding hardware manager sub-module 702. The hardware manager sub-modules 702 are typically each configured to output communications and receive communications, for a corresponding one set of hardware systems of the plurality of different sets of the hardware systems, in accordance with a single one predefined hardware communications protocol, of a set of a plurality of predefined hardware communications protocols, corresponding to the set of hardware systems regardless of a type of hardware system or manufacturer of a respective one of the hardware systems of the respective set of hardware systems cooperatively operating with the hardware manager module. Further, the network intermediary system architecture enables plugin architecture to simplify hardware interaction, while plugins can be developed independently.

In some embodiments, a non-transitory protocol database 127 is maintained to store multiple sets of hardware communications protocol libraries. Each predefined hardware communications protocol libraries corresponds to one of the plurality of different sets of hardware systems and dictates the corresponding predefined intermediary hardware communications protocol utilized in communicating with each of the hardware systems of the corresponding set of the multiple different set 109 of hardware systems 110. Some embodiments further include a central control circuit 130 that provides at least some control over the networked retail point of sale system 100. Similarly, in some implementations the central control circuit 130 provides the ability to update system components, add components, remove components perform other maintenance, check status of components and/or other such functionality. The central control circuit 130 is communicatively coupled over the one or more distributed communication networks 116 with the protocol database 127 and/or other databased. In some embodiments, the central control circuit is configured to receive an instruction to enable use of an additional hardware system and/or that an additional hardware system is to be added to the networked retail point of sale system 100. For example, a user can initiate a command, such as through a GUI provided by the central control circuit 130, to notify the central control circuit 130 that the additional hardware system is to be added, to incorporate an additional hardware system, a hardware system is being replaced, and/or other such instruction. Further, the central control circuit 130 typically identifies from the instruction that the additional hardware system is associated with a first set of hardware systems of the plurality of hardware systems. In some embodiments, the central control circuit causes the first hardware communications library, software development kit, or the like that corresponds to the first set of hardware systems to be communicated over the distributed network 116 to a third party hardware system distributor associated with the additional hardware system that is to be added.

As with other hardware systems, the additional hardware system typically utilizes a different local hardware API protocol that is different than the first predefined hardware communications protocol corresponding to the first set of hardware systems, as well as different than one or more other local hardware API protocols utilized by one or more other hardware systems of the first set of hardware systems. In some embodiments, the central control circuit 130 is further configured to update a listing of the first set of hardware systems, available for use by the one or more POS systems 106, the shared resource applications 120 and/or authorized to interact with the shared resource applications, to include the additional hardware system without modifying the first predefined hardware communications protocol corresponding to the first set of hardware systems. In implementations, the central control circuit 130 initiates the updating of the listing of hardware systems of the first set of hardware systems in response to detecting the presence of the additional hardware system in the networked retail point of sale system 100 and accessible to one or more POS systems of the sets of POS systems.

Figure 8:
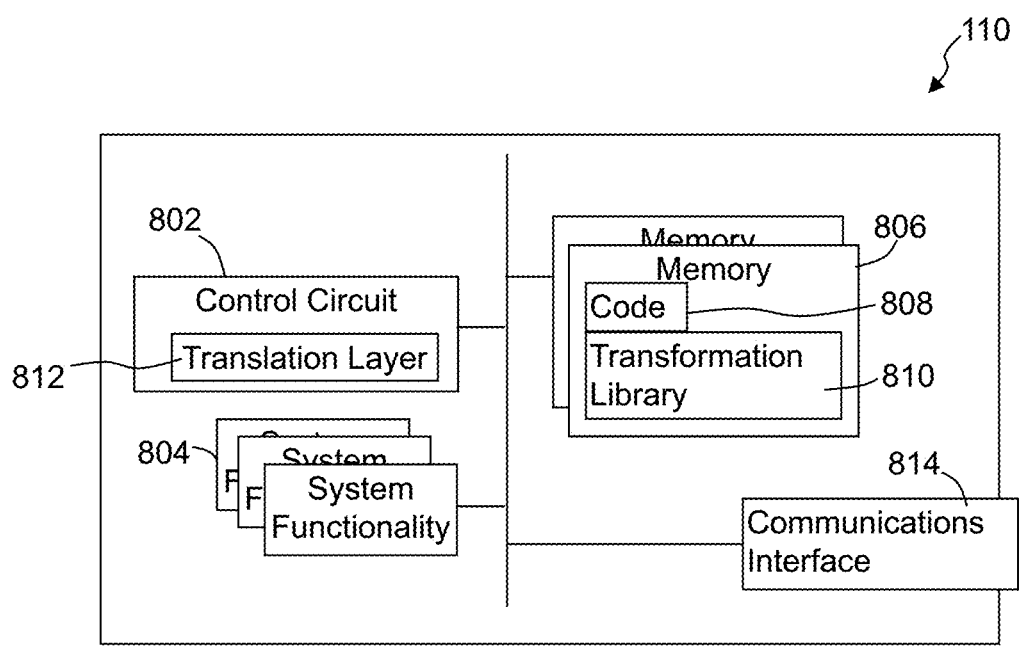
FIG. 8 illustrates a simplified block diagram of an example hardware system, in accordance with some embodiments.

FIG. 8 illustrates a simplified block diagram of an example hardware system 110, in accordance with some embodiments. The hardware system 110 includes one or more hardware control circuits 802 that provides control over and/or implements the functionality systems 804 of the hardware system (e.g., printing functionality for a printer hardware system, card reader functionality for a card reader hardware system, scanner functionality for a product scanner hardware system, etc.). The hardware system 110 further includes one or more non-transitory memory 806 storing code 808 that is executed by the hardware control circuit 802 in implementing functionality. One or more wired and/or wireless communication interfaces 814 (e.g., USB, USB-C, HDMI, ethernet, BLUETOOTH, WI-FI, cellular, etc.) are configured to enable the hardware system 110 to communicate directly or over a communication network 116 with one or more external components, such as the network intermediary system 114. Further, the memory 806 stores a transformation library 810 that is utilized by a transformation layer 812 in translating communications received from the predefined intermediary hardware communications protocol and into an internal API communications protocol, and communications in the internal API communications protocol into the predefined intermediary hardware communications protocol corresponding to the set 109 of hardware systems in which the hardware system 110 is associated.

Referring to at least FIGS. 1-2B and 6, in some embodiments, the central control circuit 130 enables the updating of one or more of the intermediary hardware communications protocols. The central control circuit 130, in some implementations, is configured to receive an instruction that a first predefined hardware communications protocol, associated with a first set of hardware systems, has been updated. Based on this update, the central control circuit 130 is configured to cause an updated first hardware communication library, corresponding to the updated first predefined hardware communications protocol, to be communicated to each of multiple third party hardware system distributors that are each associated with one of the first set of hardware systems without modifying the updated first predefined hardware communications protocol corresponding to the first set of hardware systems. The hardware manager module 202 is further configured to utilize the updated first predefined hardware communications protocol in subsequent communications with each of the hardware systems 110 of the first set 109 of hardware systems without changes to local hardware API protocols utilized on the different hardware systems of the first set of hardware systems. The hardware systems are typically updated with an updated internal transformation library supplied by the respective hardware system supplier and/or manufacturer enabling the respective hardware system to implement translations between the predefined intermediary communications protocol utilized by the hardware manager module 202 and the local internal API protocol utilized internal to the respective hardware system. Typically, the update to the transformation library does not require a modification of the local internal API protocol utilized internal to the hardware system. Instead, the update to the transformation library enables the appropriate translations to maintain the local internal API protocol. Accordingly, subsequent communications, received from any of the different hardware systems of the first set of hardware systems, are received in accordance with the updated first predefined hardware communications protocol based on a transformation from a respective local hardware API protocol to the updated predefined intermediary hardware communications protocol.

At least some of the hardware systems 110 are configured to be triggered or engaged by one or more of the client POS systems 106 and/or the shared resource applications 120. Further, the hardware manager module 202, in some embodiments, identifies a hardware system 110 to be activated in response to a request or call from a client POS system 106 or shared resource application 120, and/or identify a client POS system 106 or shared resource application 120 to receive a response from a respective hardware system. In some implementations, the state manager module 206 maintains state information about which POS system is cooperating with which hardware system and that information is made accessible by the hardware manager module 202. In some instances, the hardware manager identifies an intended hardware system based on an identifier of the hardware system in a request issued by a client POS system or shared resource application. The hardware manager module 202, in some embodiments, is further configured to receive a response communication from a hardware system implementing a particular hardware function (e.g., print, card reading, product scan, etc.). The response communication is in accordance with the predefined intermediary hardware communications protocol of the set of predefined hardware communications protocols utilized by the network intermediary system 114. The hardware manager module 202 can be configured to extract state information from the response communication, and forward the state information to the state manager module 206 that is configured to distribute the received state information to a client POS system 106 associated with the hardware system and/or to a shared resource application 120 that is shared by the multiple different sets of client POS systems operated in association with the retail store. As one non-limiting example, the response can be received in response to a hardware command communicated to the hardware system 110 directing the hardware system to implement a hardware function on behalf of the requesting client POS system 106. In other instances, the hardware system is activated without a command from a POS system or shared resource application, and the hardware manager module identifies an intended recipient client POS system and/or resource application based on the identifier of the hardware system, information within the communication and/or other such information. Again, the hardware manager module, in at least some instances, communicates with the state manager module 206 to acquire state information associated with the hardware system in determining a recipient client POS system and/or resource application. For example, the state management module maintains state information that includes an association between a particular client POS system 106 and a particular hardware system. As one non-limiting example, the state manager module 206 can maintain information associating a particular client POS system with a particular product bar code scanner hardware system and a particular receipt printer hardware system with which the particular POS system is configured to utilize).

Figure 9:
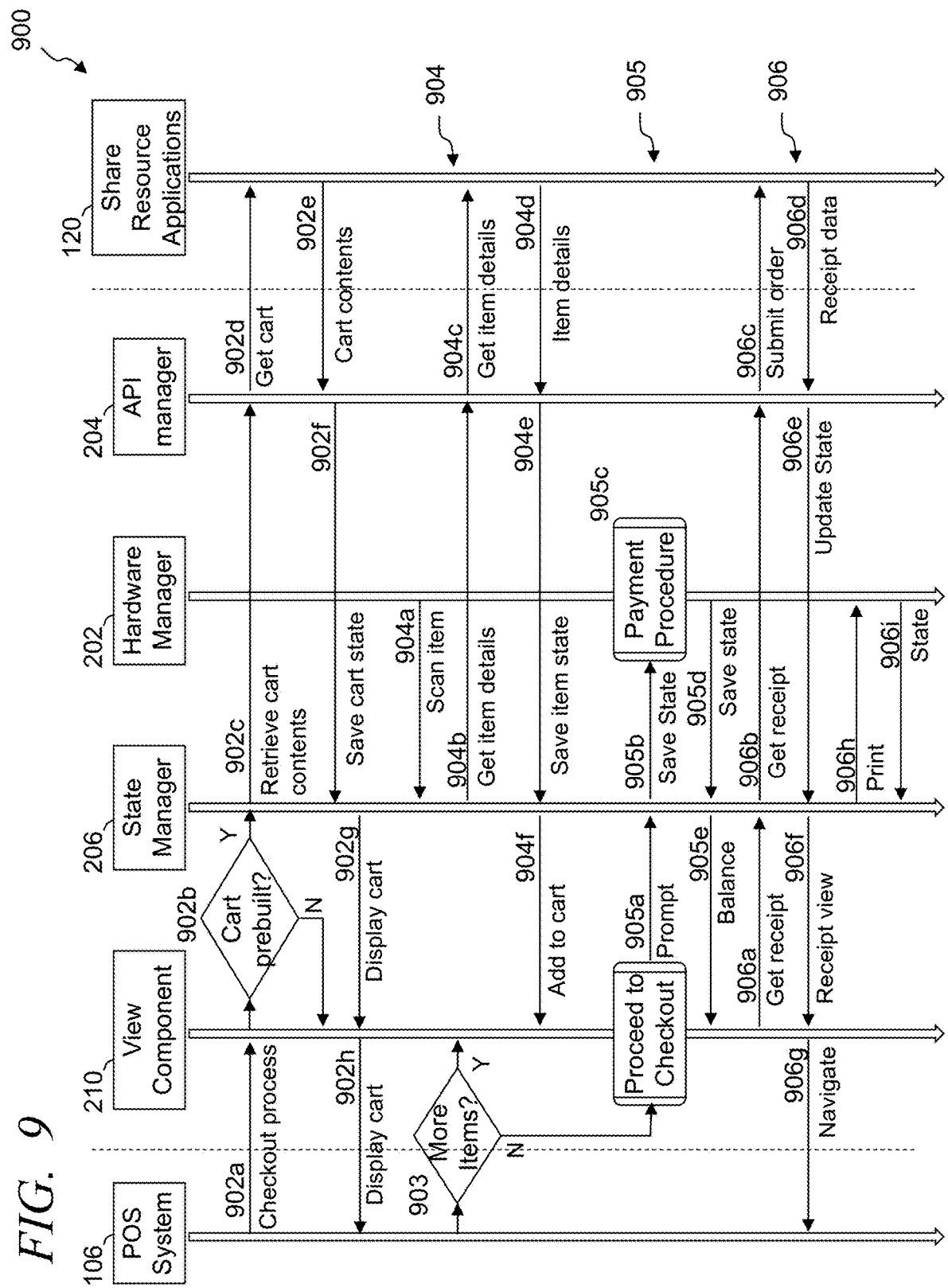
FIG. 9 illustrates a simplified diagram of a series of exemplary processes preformed as part of a checkout of a customer, in accordance with some embodiments.

FIG. 9 illustrates a simplified diagram of a series of exemplary processes preformed as part of a checkout of a customer, in accordance with some embodiments. In step 902a, a checkout process can be initiated by a client POS system 106. Some embodiments include optional step 902b where a checkout process can be initiated through a selection at a particular client POS system 106. In some implementations, for example, a view component module 210 can provide a GUI and/or GUI information to enable POS system to display a GUI that includes a "Checkout" option that can trigger the activation of the checkout process. Further, in some embodiments, a view component module 210 may cause a checkout GUI to be displayed in response to the checkout option being selected. Some embodiments include optional step 902b where it is determined whether a cart and/or listing of products has already been created, such as through scanning one or more products using a scanner hardware system. When a cart needs to be created and/or products are to be added the process advances to a process 904 to add products. When it is determined in step 902b and a cart is built, the state manager module 206 is notified of the request to checkout and updates a state of at least the sub-process 902 indicating the state change to the checkout process. In step 902c, the state manager module 206 in some embodiments notifies the API handler module 204 and/or the API handler module detects the corresponding change in state.

In step 902d, the API handler module receives the relevant cart identifier information, customer identifier information and/or other information from the state manager module 206 and/or from the client POS system 106, identifies one or more relevant shared resource applications 120 to be activated to obtain cart information, which typically includes a total cost to be paid, and utilizes respective APIs to activate the one or more identified shared resource applications 120. In response to the API activations, the relevant one or more shared resource applications 120 use the relevant cart identifier information (or other relevant information) to return the relevant cart information. The API handler module 204 notifies the state manager module 206 of the receipt of the cart information and the state manager module in step 902*f* updates the state information corresponding to at least the checkout process. In some embodiments, the view component in step 902*g* detects and/or is notified of the state change and can initiate a change in view in step 902*h* to display some or all of the cart information.

Some embodiments include optional step 903 where it is determined whether additional products are to be added to a cart. This step may be initiated in response to an option being selected through a GUI at the client POS system 106, in response to identifying in step 902*b* that a cart is not prebuilt, a detection that a cart is not complete, a detection of a scan of a product by a product scanner hardware system, and/or other such events. When additional products are to be added the view component can optionally maintain a GUI and/or provide GUI information to be rendered corresponding to a product add process 904.

In some embodiments, the hardware manager module 202 is notified in step 904*a* by a product scanner hardware system that a product has been scanned. The product scanner hardware system, in some implementations, further provides the relevant product information captured by the scan (e.g., barcode number, identifier number, etc.). Further, the notification and/or product information has been translated based on a transformation library accessed through a transformation layer of the scanner hardware system to comply with the relevant predefined intermediary product scanner communications protocol that is consistently used by the hardware manager module 202 in communicating with each of the different product scanner systems of a given set of product scanner systems available for use with a retail store or retailer. In step 904*b* the state manager updates state information corresponding to the particular client POS system 106 with which the product scanner hardware system is associated. In some embodiments, the hardware manager module 202 determines that the scanned product information corresponds to a particular client POS system based on the scanner hardware system providing the product information and/or the information provided, and notifies the state manager module 206 of the association between the scanner hardware system and the corresponding client POS system.

In step 904*c*, the API handler module 204 is notified of and/or detects the change in state corresponding to product identifying information being acquired. Based on the state information the API handler module identifies one or more relevant shared APIs that are to be activated to call respective one or more shared resource applications 120. For example, the APIs can include a product identifier API configured to call a product lookup shared resource application that accesses one or more databases (e.g., product inventory database 126, product identifier database, etc.) and retrieves product information (e.g., price, name, identifying information, discount and/or sale information, limits, conditional error state information, etc.). The retrieved product information is returned in step 904*d* and the state manager module 206 updates the corresponding state information. In step 904*f*, the view component module 210 optional provides GUI information for a cart view rendered through the client POS system to display the addition of the identified product to the cart.

In some embodiments, a payment process 905 is implemented as part of or in relation to a checkout process. In step 905*a*, a prompt is received from the POS system 106 and/or the view component module 210 that a cart is complete and payment is to be acquired. In step 905*b*, the state manager module 206 updates the state information associated with the particular client POS system and/or cart regarding the initiation of acquiring the payment. Other information may further be saved as part of the state information and/or in association with the updated state, such as the total cost of the products in the cart, a type or method of at least partial payment, product information, and/or other such information. Product information may additionally or alternatively be provided and one or more shared resource application may be utilized to calculate a total including relevant tax and/or service fees, apply any discounts, and/or other such services. In some embodiments, payment is initiate through a hardware system, such as a card reader system, a cash in-take and/or till system, a payment scan system (e.g., through RFID, BLUETOOTH or the like in association with a device, such as a customer's mobile phone, a payment card, etc.), or other such hardware system. Accordingly, some embodiments include 905*c* where the hardware manager module 202 receives payment information from one of the hardware systems. In step 905*d* the state information is updated by the state manager module. Some embodiments include step 905*e* where a balance is provided and the view component provides GUI information to display a balance due by the customer.

Further, some embodiments include a receipt process 906, which may be initiated in some instances based on confirmation of payment of at least some of the total due. In step 606*a*, a get receipt action may be initiated by the POS system and/or a view component receiving a confirmation that a sale is complete. In step 906*b*, the state manager updates a state corresponding to the get recipe information action. In step 906*c*, the API handler module 204 detects that change in state and/or is notified of the request to get receipt information and identifies one or more APIs to activate corresponding one or more shared resource applications 120 to obtain relevant information to be included in the receipt. In step 906*d*, the receipt information is received. In step 906*e*, the state manager module 206 updates relevant state information. Some embodiments include step 906*f* where a view component module 210 detects the state change and/or is notified of the receipt information. In step 906*g*, the view component generates relevant GUI information to provide a receipt view as part of a displayed GUI or as a separate GUI. In step 906*h*, the hardware manager module 202 receives a command and/or detects the updated state and received the receipt information. The hardware manager module identifies a corresponding printer hardware system that is associated with the particular client POS system 106. In some instances, the print command from a POS system includes a printer identifier that is to be used to print. Other embodiments maintain relationships between client POS systems and hardware systems. The hardware manager module 202 communicates a command using a predefined intermediary printer communications protocol to print the recipe. In some implementations, a printer hardware system provides a confirmation of the completed printing or otherwise may provide a conditional error or error. In step 906*i*, the hardware manager module 202 can provide a confirmation to the state manager module 206 that updates relevant state information regarding the printing of the receipt.

Figure 10:
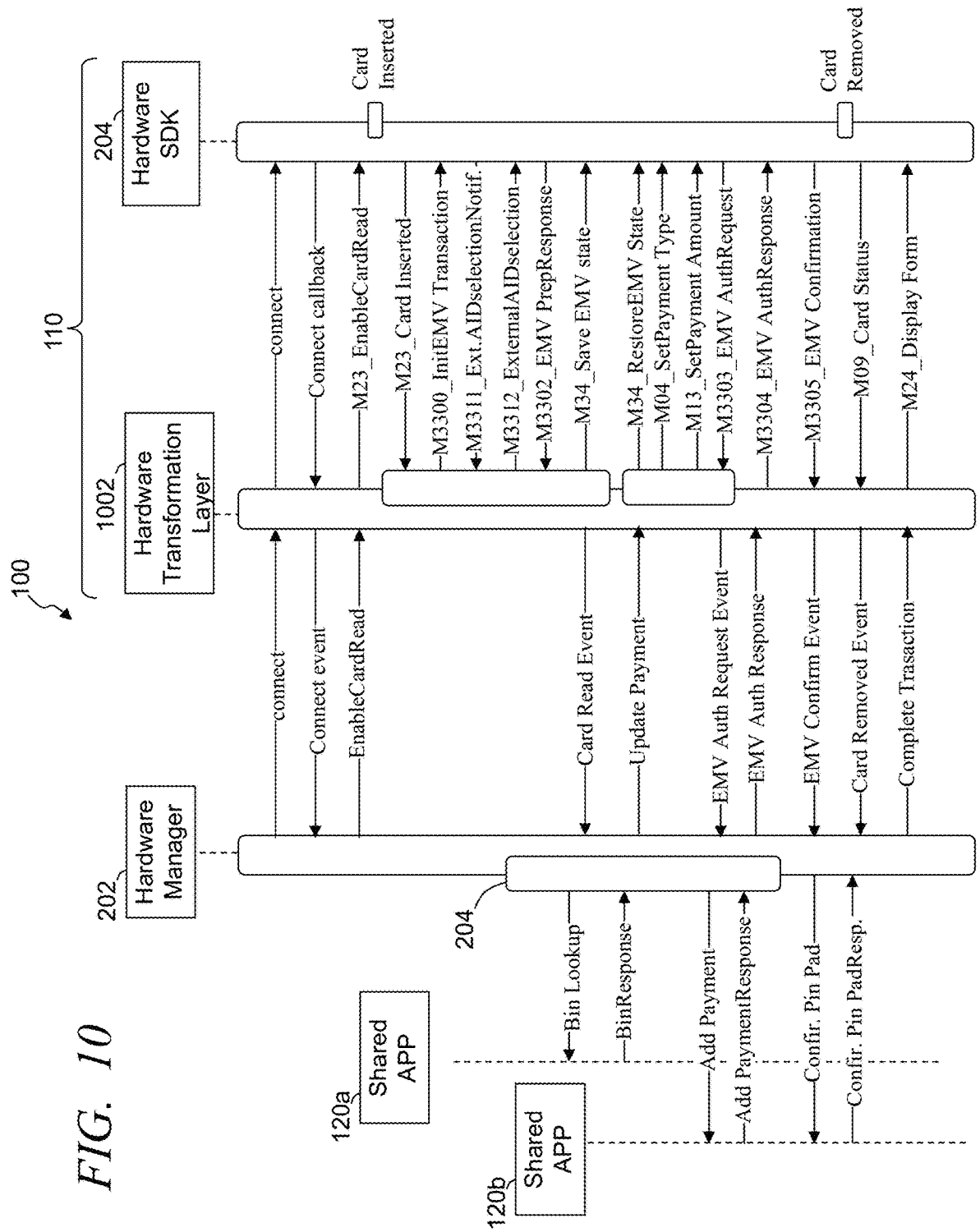
FIG. 10 illustrates a simplified diagram of an exemplary card reading process, in accordance with some embodiments.

FIG. 10 illustrates a simplified diagram of an exemplary card reading process, in accordance with some embodiments. The hardware manager module 202 coordinates the operation of the card reader hardware system 110. The hardware system 110 employs an internal hardware APIs in accordance with an internal software development kit (SDK). A transformation layer 1002 utilizes an internal transformation library to provide the translation between the internal hardware communications protocol and the predefined hardware communications protocol used by the hardware manager module 202 and the network intermediary systems 114. One or more calls received from the hardware system 110 can trigger one or more shared resource applications 120a, 120b through the API handler module 204. In this example, a card is read by the card reader hardware system and information is exchanged between the card reader hardware system and the network intermediary systems 114 to utilize shared resource applications 120 to acquire payment information from a third party source through a third party shared resource application 120b based on the card information acquired by the card reader hardware system 110.

As introduced above, the state manager module 206, in some instances, further maintains state information corresponding to conditional error states. Such conditional error states can occur, for example, in response to a shared resource application 120 being unable to complete a particular service because of one or more conditions that are to be met prior to having authority to complete the service. Such restrictions can include, for example but not limited to, age restrictions, customer identifier information, time of day restriction, number of products limit, confirming request for the service is from a limited sub-set of one or more the sets 105 of POS systems 106, other such conditions, or a combination of two or more of such conditions.

In some embodiments, the state manager module 206 is configured to maintain conditional error state information initiated by a shared resource API in response to a conditional error event preventing continued processing and/or completion of an API function being performed by the shared resource application. With at least some error conditions a response is received. The state manager module is configured to receive conditional error response information. In some instances, the conditional error response is received from a client POS system based on the conditional error event. The state manager module uses the response and/or response information and updates the state information with the conditional error response information to be subsequently shared with the respective shared resource application. Further, with some conditional errors, the API handler module 204 communicates the conditional error response information to the shared resource application in advancing the service being performed by the shared resource application.

As one non-limiting example, a checkout shared resource application may include a conditional error requesting a confirmation that a customer attempting to purchase an alcoholic beverage product is over a government set age limit. Accordingly, the state manager module maintains state information regarding the exchanges and the different states of the service being implemented by the client POS system and/or shared resource application 120, including states of a conditional error. A shared resource application 120 may identify that condition is to be met before continuing and/or completing a service, and issue one or more conditional errors to the API handler module 204 through the respective API. A state of the service and/or transaction is updated by the state manager module 206 regarding the conditional error. Based on the conditional error, one or more actions is initiated. For example, a view component module 210 can initiate the display of a notification and/or one or more options (e.g., enter customer date of birth, confirm customer's identification, limit on number of product exceeded, etc.). In some instances, the conditional error is satisfied based merely on the displaying of information. In other instances, response information is needed prior to advancing in the service implemented by the particular shared resource application. For example, when the conditional error is an age restriction, some embodiments halt the process of the shared resource application, and the state manager updates state information when a response is received through the POS system (e.g., entry of a customer's birthday, a confirmation that the associate confirmed an age, etc.). The response is provided to the shared resource application through the API handler module and corresponding API. When the condition is not met, the shared resource application can issue a subsequent conditional error or other error, which cause updated state information and other actions. Alternatively, when the condition is satisfied the shared resource application continues to the process of providing the requested service.

In some embodiments, the hardware manager module 202 may similarly receive errors and/or conditional errors from one or more hardware components (e.g., out of paper, out of ink, no card information acquired, invalid scan, etc.). One or more of these errors can cause an update to state information, and similar to conditional errors cause information to be displayed on the POS system. State information can be updated based on responses and/or when a subsequent notification is received from the hardware system that the error condition is corrected. Again, the error and/or conditional error notifications are typically received at the hardware manager module 202 in accordance with the predefined intermediary communications protocol corresponding to the set of hardware systems with which the reporting hardware system is associated.

Figure 11:
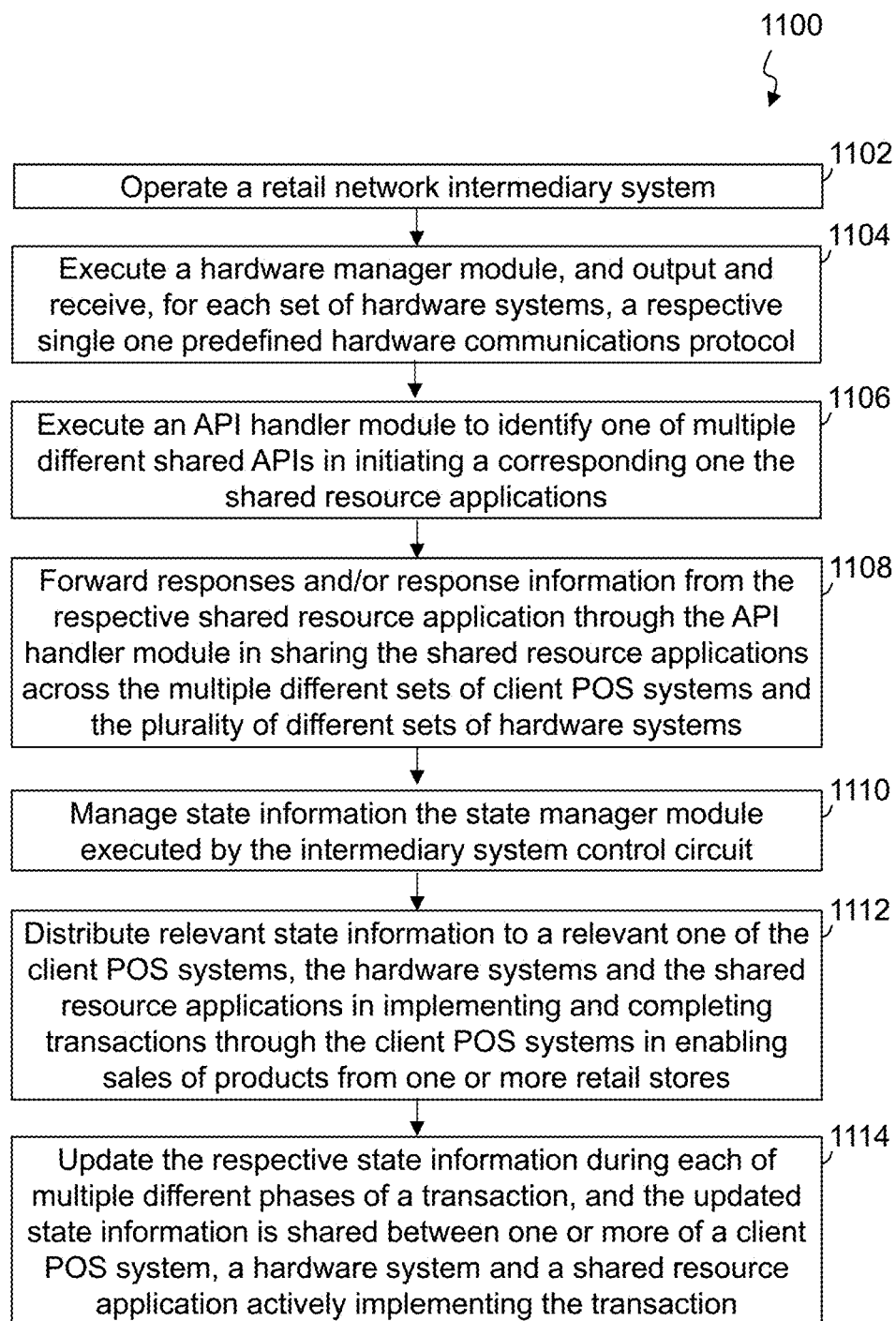
FIG. 11 illustrates a simplified flow diagram of a process of enabling a distributed, networked retail point of sale system, in accordance with some embodiments.

FIG. 11 illustrates a simplified flow diagram of a process 1100 of enabling a distributed, networked retail point of sale system, in accordance with some embodiments. In step 1102, a retail network intermediary system 114 is operated, where the network intermediary system 114 is communicatively coupled, over one or more distributed computer networks 116, with multiple different sets 105 of client POS systems 106 operated in association with one or more retail stores, a plurality of different sets 109 of hardware systems 110 configured to be engaged by the client POS systems, and a plurality of shared resource applications 120. Further, the network intermediary system 114 is operated between the client POS systems 106 and the hardware systems 110, between the client POS systems 106 and the resource applications 120, and between the hardware systems 110 and the resource applications 120. The network intermediary system 114 is reusable across the multiple different sets of client POS systems 106 and comprises an intermediary system control circuit 115 configured to execute computer program modules.

In step 1104, a hardware manager module 202 is execute, through the intermediary system control circuit 115, and outputs and receives, for each set of hardware systems 110 of the plurality of different sets 109 of the hardware systems 110, a single one predefined hardware communications protocol, of a set of predefined hardware communications protocols, regardless of a type or manufacturer of a respective one of the hardware systems of the respective set of hardware systems cooperatively operating with the hardware manager module 202. In some embodiments, communications with the sets of hardware systems 110 are managed through the hardware manager module and comprise communicating with each hardware system 110 of a first set of hardware systems, regardless of a manufacturer, according to a first hardware communications protocol, and communicating with each hardware system of a second set of hardware systems, regardless of a manufacturer, according to a second hardware communications protocol. As described above, each set of hardware systems, of the plurality different sets of hardware systems, is configured to perform a different physical function than the physical function of the other sets of hardware systems. For example, the first hardware communications protocol can comprise a printer communications protocol where the first set of hardware systems comprise printer systems, and the second hardware communications protocol can comprise a scanner communications protocol where the second set of hardware systems comprises product scanner systems. Further, the printer hardware systems typically include at least two different printer systems from two different manufacturers, and each of the two different printer systems is typically configured to executing different printer APIs each utilizing a different printer local API protocol. In some embodiments, the hardware manager module 202 communicates with each hardware system communicates with each different printer system according to the single printer communications protocol defined by a printer API library regardless of the printer API executed by the respective printer system such that each different printer system is configured to execute a transformation layer to transform communications received according to the printer communications protocol to a respective local printer API protocol executed on the specific printer and to transform communications from the local printer API protocol to the printer communications protocol prior to communicating from the printer system.

In step 1106, an API handler module 204 is executed, through the intermediary system control circuit 115, to identify one of multiple different shared APIs in initiating and/or to be utilized to initiate a corresponding one the shared resource applications 120 to be activated in response to each application service request from the client POS systems 106 and the hardware systems 110.

In step 1108, responses and/or response information is received from the respective shared resource application are forwarded through the API handler module in enabling sharing the shared resource applications 120 across the multiple different sets of client POS systems 106 and the plurality of different sets of hardware systems 110. Again, the shared resource applications 120 are not specific to one of the different sets of client POS systems or one the plurality of different sets of hardware systems. The shared resource applications 120 are not specific to one of the different sets 105 of client POS systems 106 or one the plurality of different sets 109 of hardware systems 110. In some embodiments, each application service request is received from each of the client POS systems 106 and each of the hardware systems 110 requesting to implement any one of the shared resource applications 120. The requested shared resource application is identified through the API handler module, and the API handler module routes relevant request information and/or state information acquired from the state manager module 206 to the requested shared resource application 120. In some embodiments, the API handler module further identifies a source of an application service request (e.g., a particular client POS system or a particular hardware system) and obtains request information communicated with the application service request. Based on the source of the application service request and the request information communicated with the application service request, the API handler module identifies a particular shared resource application 120 of the resource applications to be activated and forwards at least some of the request information to be utilized by the particular shared resource application. The API handler module 204, in some implementations, cooperatively operates multiple subsets of the shared resource APIs, establishing API hander sub-modules 602a-602d, to implement a respective one of multiple corresponding shares services on behalf of at least one of the client POS systems 106 and the hardware systems 110.

In step 1110, state information is managed through a state manager module 206 executed by the intermediary system control circuit 115. The state information includes state information corresponding to requests and responses between the client POS systems 106, the hardware systems 110 and the shared resource applications 120. The state manager module 206, in some embodiments, is configured to direct response information from an initiated shared resource application 120 to the requesting client POS system 106 or hardware system 110. In some embodiments, the management of the state information includes executing a plurality of state manager sub-modules. Each state manager sub-module corresponds to a shared service accessible through the different shared APIs 205. Further, in some implementations, the management of the states can include maintaining, through the plurality of state manager sub-modules 302-308, state information corresponding to at least a current state of each active transaction utilizing one of the shared APIs and being implemented through the sets of different client POS systems. In step 1112, the relevant state information is distributed to a relevant one of the client POS systems 106, the hardware systems 110 and the shared resource applications 120 in implementing and completing transactions through the client POS systems in enabling sales of products from one or more retail stores.

In step 1114, the respective state information is further updated during each of multiple different phases of a transaction, and the updated state information is shared between one or more of a client POS system 106, a hardware system 110 and a shared resource application 120 actively implementing the transaction. In some embodiments, the updating of the state information comprises maintaining conditional error state information initiated by a respective shared resource application 120 in response to a conditional error event preventing completion of a shared service being performed by the shared resource application. In some instances, at least some of the conditional error state information is communicated to a requesting client POS system 106. Further, as described above, a response may be received based on the conditional error that enables the shared resource application to continue in attempts to complete the requested application service. In some embodiments, conditional error response information is received, through the state manager module 206, from a client POS system 106 based on the conditional error event. The state manager module 206 typically updates the state information based on and/or with the conditional error response information. In some instances for some conditional error events, the conditional error response information is communicated through the API handler module 204 to the shared resource application 120 associated with the error event in advancing the application service being performed by the shared resource application.

In some embodiments, the available states, of the state manager module corresponding to a particular shared resource application, are consistent across each of the multiple different sets 105 of client POS systems 106 that share and utilize the particular shared resource application 120 and are independent of which of a particular client POS system 106 of the different sets 105 of client POS systems 106 initiates the implementation of the particular shared resource application. Accordingly, state information is consistent across the different sets 105 of client POS systems and are independent of the type of POS system, manufacturer, retail store department in which the POS system is operating, and the like.

Figure 12:
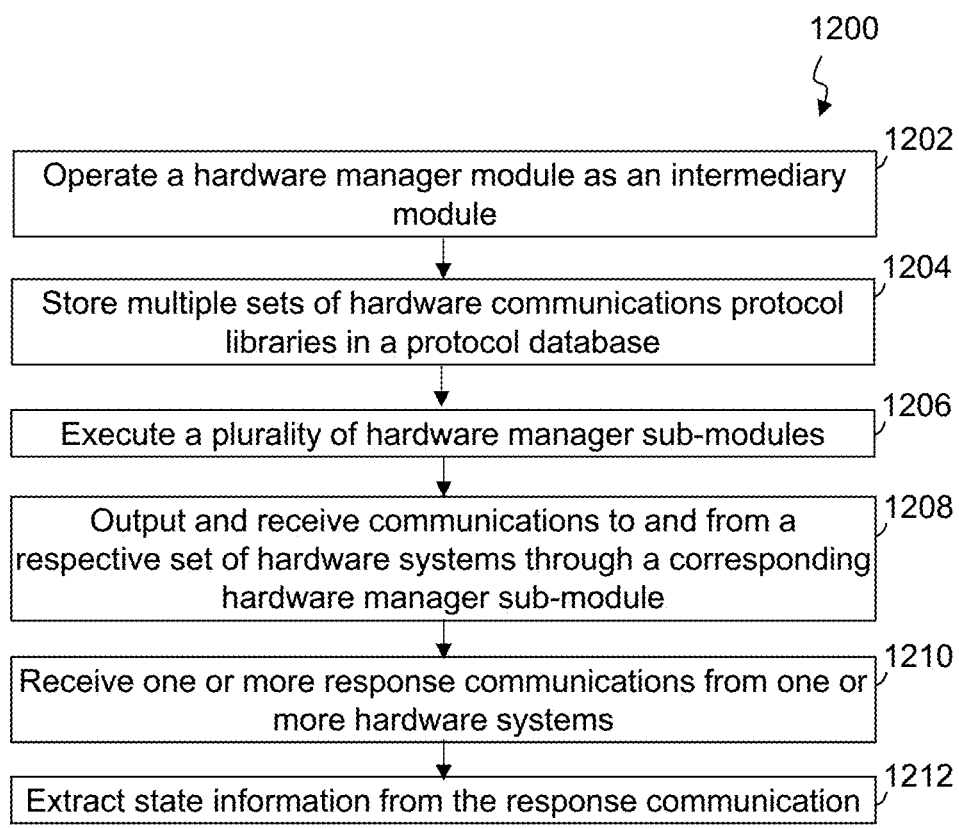
FIG. 12 illustrates a simplified flow diagram of a process of managing hardware systems of a networked retail POS system, in accordance with some embodiments.

FIG. 12 illustrates a simplified flow diagram of a process 1200 of managing hardware systems 110 of a networked retail POS system, in accordance with some embodiments. In step 1202, a hardware manager module 202, implemented through an intermediary system control circuit 115, is operated as an intermediary module between multiple different sets 105 of client POS systems 106 operated in association with a retail store, a plurality of different sets 109 of hardware systems 110 configured to be engaged by the client POS systems 106, and a plurality of shared resource applications 120. Some embodiments include step 1204 where multiple sets of hardware communications protocol libraries are stored in one or more protocol databases 127. Each set of predefined hardware communications protocol libraries corresponds to one of the plurality of different sets 109 of hardware systems 110.

In step 1206, a plurality of hardware manager sub-modules 702 are executed as part of the hardware manager module 202 that each correspond to a single one of the sets 109 of hardware systems 110. In step 1208, for each set 109 of hardware systems 110 of the plurality of different sets of the hardware systems, communications are outputted from a corresponding one of the hardware manager sub-modules 702 to the respective set of hardware systems and communications are received at the corresponding hardware manager sub-module 702 from the respective set 109 of hardware systems 110. Further, the communications are communicated and received in accordance with a single one predefined hardware communications protocol, of a set of a plurality of predefined hardware communications protocols, regardless of a type of hardware system or manufacturer of a respective one of the hardware systems of the respective set of hardware systems cooperatively operating with the hardware manager module.

In step 1210, one or more response communications are received from a particular hardware system 110 implementing a first hardware function (e.g., printing, card reading, product scanning, weighing, etc.) and is associated with a set of hardware systems each providing the first hardware function. The one or more response communications are received through the network intermediary system 114 in accordance with a predefined hardware communications protocol, of the set of predefined hardware communications protocols, corresponding to the set 109 of hardware systems with which the particular hardware system is associated. Some embodiments include optional step 1212 where state information is extracted from the response communication, and the state information is forwarded to the state manager module 206. In some embodiments, the state manager module 206 is configured to distribute the state information to a shared resource application 120 that is shared by the multiple different sets of client POS systems 106 operated in association with the retail store. In some implementations, the API handler module 204 detects the state change and initiates action based on the state change and the information associated with the state change. Still further, in some instances, the hardware manager module 202 communicates some or all of the information received in the response communication from the hardware system to the API handler module 204. Based on the information in the response communication, the API handler module may identify one or more shared APIs to be utilized in continuing and/or initiating an operation of one or more shared resource applications 120. Some or all of the steps and/or a series of steps may be repeated.

In some embodiments, communications in step 1206 with the sets of hardware systems 110 are managed, through the hardware manager module 202, to communicate with each hardware system 110 of a first set of hardware systems, regardless of manufacturer, according to a first hardware communications protocol, and to communicate with each hardware system 110 of a second set of hardware systems, regardless of manufacturer, according to a second hardware communications protocol. As described above, each set of hardware systems, of the plurality different sets of hardware systems, is typically configured to perform a different physical function than the physical function of the other sets of hardware systems and/or a physical function in a different way or through a different process. For example, the first set of hardware systems can comprise printer systems, and the second set of hardware systems can comprise product scanner systems. Accordingly, the first hardware communications protocol can comprise a printer communications protocol, and the second hardware communications protocol can comprise a scanner communications protocol.

Some embodiments, as part of step 1206, managing the communications to communicate, through the hardware manager module 202, with each of two different printer systems according to the single printer communications protocol defined by a printer API transformation library 710 regardless of the printer API 712 executed by the respective printer system. Each different printer system can be configured to execute a transformation layer to transform communications received according to the printer communications protocol to a respective local printer API protocol executed on the specific printer and to transform communications from the local printer API protocol to the printer communications protocol prior to communicating to the network intermediary system 114. For example, the networked retail point of sale system 100 can include at least two different printer systems. A first printer system can include a first transformation library 710 accessed by a respective first transformation layer of the first printer system. In some embodiments, the first transformation library 710 defines translations of a set of print commands in accordance with the intermediary predefined printer communications protocol to a corresponding set of print commands in accordance with a first local API protocol utilized internal to the first printer system according to a first printer API 712. Similarly, the first transformation library further defines translations from a set of local printer responses in accordance with the first local API protocol to a corresponding set of printer responses in accordance with the printer communications protocol.

Figure 13:
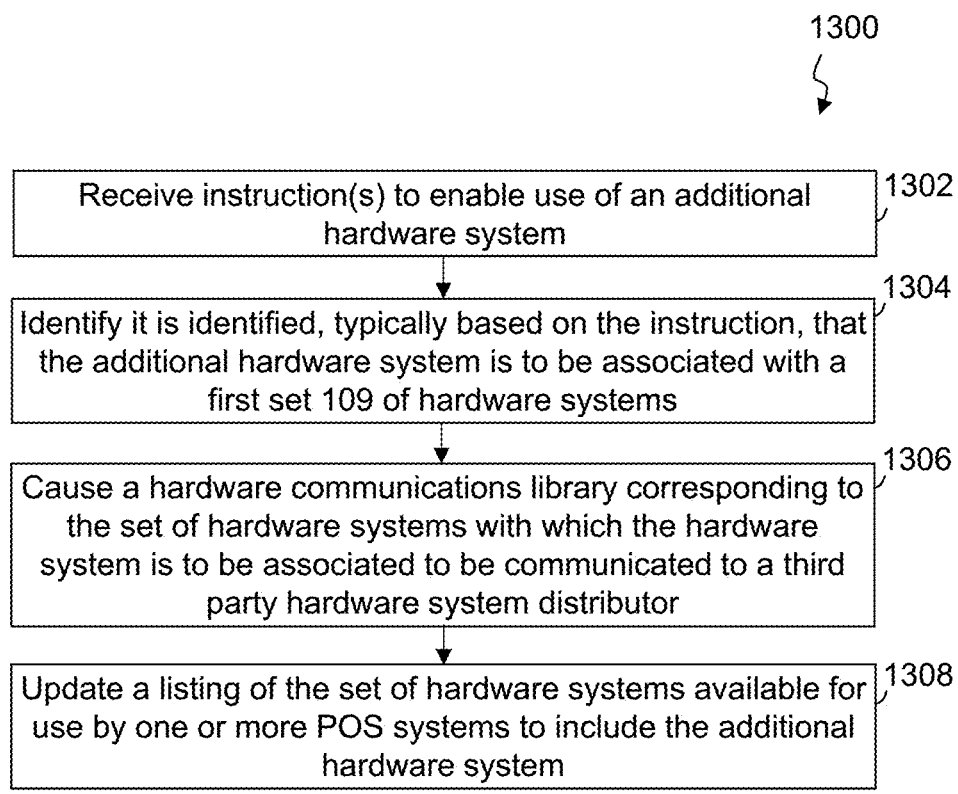
FIG. 13 illustrates a simplified flow diagram of a process of incorporating one or more additional hardware systems to be utilized with the retail network intermediary system, in accordance with some embodiments.

FIG. 13 illustrates a simplified flow diagram of a process 1300 of incorporating one or more additional hardware systems to be utilized with the retail network intermediary system 114, in accordance with some embodiments. In step 1302, an instruction is received to enable use of an additional hardware system. In step 1304, it is identified that the additional hardware system is to be associated with a first set 109 of hardware systems 110 of the plurality of hardware systems. The identification of the set of hardware systems can be identified based on an identification defined with the instruction, the retail network intermediary system 114 determines a type of hardware functionality provided by the hardware system being added through one or more communications with the hardware system, other such methods or a combination of two or more of such methods. In step 1306, a first hardware communications library (which in some implementations comprises an SDK), of the multiple sets of hardware communications protocol libraries and corresponding to the first set of hardware systems, is caused to be communicated over the distributed network 116 to a third party hardware system distributor (e.g., hardware system manufacturer, vendor, etc.). Typically, the additional hardware system utilizes a different local hardware API protocol that is different than the first predefined hardware communications protocol corresponding to the first set of hardware systems, and different than other local hardware API protocols utilized by one or more other hardware systems of the first set of hardware systems. In step 1308, a listing of the first set of hardware systems available for use by the one or more POS systems 106 is updated to include the additional hardware system without modifying the first predefined hardware communications protocol corresponding to the first set of hardware systems.

Figure 14:
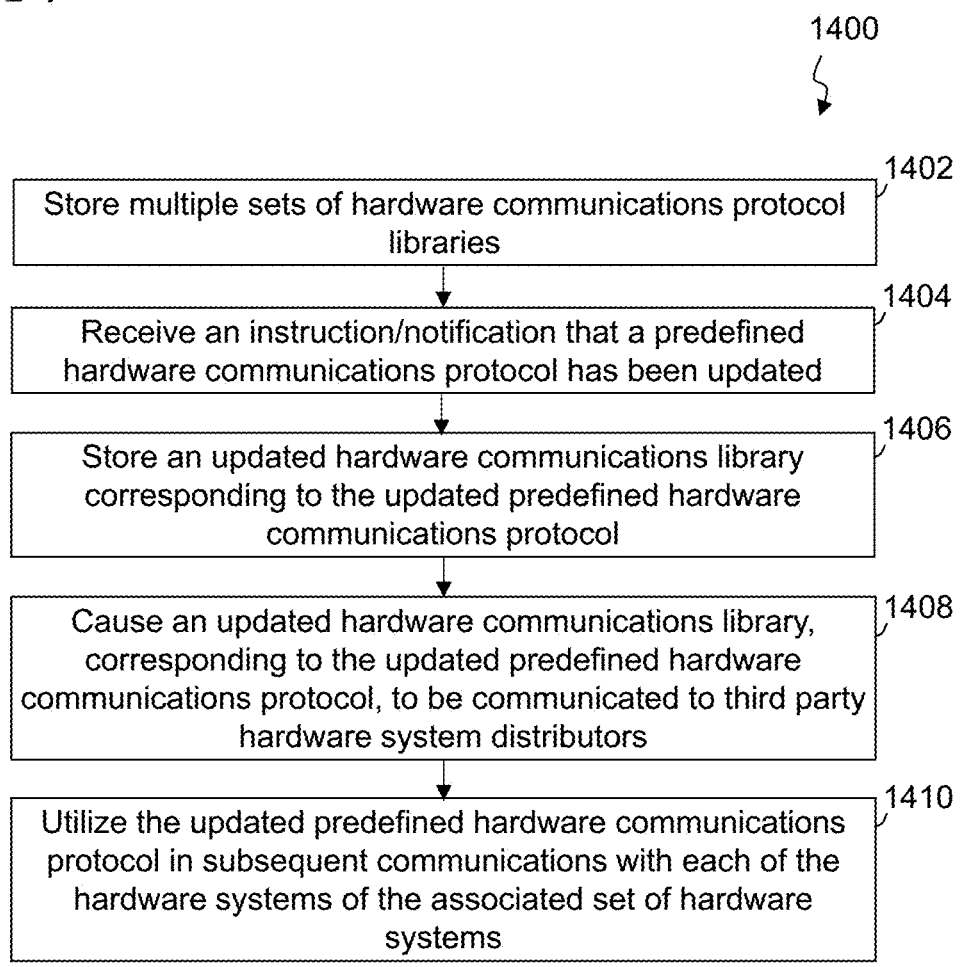
FIG. 14 illustrates a simplified flow diagram of a process of enabling updating of one or more of the predefined hardware communications protocols, in accordance with some embodiments.

FIG. 14 illustrates a simplified flow diagram of a process 1400 of enabling updating of one or more of the predefined hardware communications protocols, in accordance with some embodiments. In step 1402, multiple sets of hardware communications protocol libraries are stored, in the protocol database 127. Each set of predefined hardware communications protocol libraries corresponds to one of the plurality of different sets 109 of hardware systems 110. In step 1404, an instruction is received that a first predefined hardware communications protocol, associated with a first set of hardware systems, has been updated. In some implementations, a user updates the first predefined hardware communications protocol and/or a respective API library or SDK and communicates an instruction to the network intermediary system 114 to incorporate and utilize the updated first predefined hardware communications protocol, typically in place of the existing first predefined hardware communications protocol. The update may provide additional functionality, correct one or more errors, and/or other such updates. Some embodiments include step 1406, where an updated first hardware communications library corresponding to the updated first predefined hardware communications protocol is stored in the protocol database 127.

In step 1408, an updated first hardware communications library, corresponding to the updated first predefined hardware communications protocol, is caused to be communicated to each of multiple third party hardware system distributors that are each associated with one of the first set of hardware systems without modifying the updated first predefined hardware communications protocol corresponding to the first set of hardware systems. In some embodiments, the intermediary system control circuit 115 initiates the communication of the updated first hardware communications library, while in other implementations a separate component or an external system is triggered by the network intermediary system 114. In step 1410, the updated first predefined hardware communications protocol is utilized, through the hardware manager module 202, in subsequent communications with each of the hardware systems 110 of the first set of hardware systems without changes to local hardware API protocols utilized on the different hardware systems of the first set of hardware systems.

Figure 15:
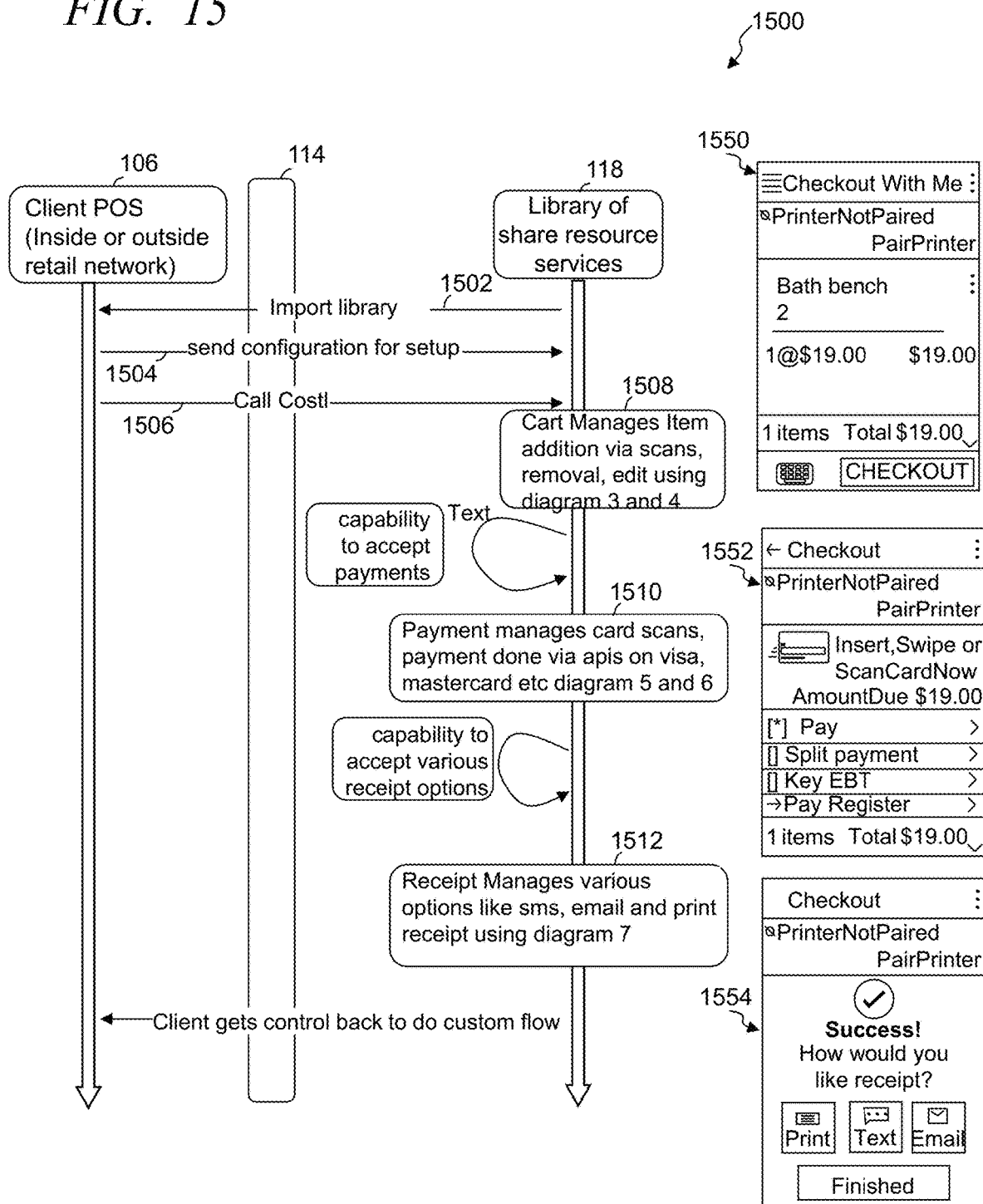
FIG. 15 illustrates a simplified flow diagram of an exemplary process of a client POS system utilizing, through the network intermediary system, a library of shared resource services, in accordance with some embodiments.

FIG. 15 illustrates a simplified flow diagram of an exemplary process 1500 of a client POS system 106 utilizing, through the network intermediary system 114, the library of shared resource services 118, in accordance with some embodiments. The client POS system can be internal to a retail network or accessing the retail network from outside of the retail network. Further, the client POS system can be a stationary POS system or a mobile POS system (e.g., store associate mobile phone, store associate mobile tablet, customer mobile phone, customer mobile tablet, dedicated mobile POS system, etc.). In optional step 1502 a configuration library is acquired from the shared resource services 118, and a configuration setup is communicated to the shared resource services in step 1504. In step 1506, the client POS system 106 requests services from the shared resource services to add products to a cart and purchase products. For example, a series of multiple shared APIs can be called by the API handler module 204 to activate multiple different shared resource applications 120 to implement relevant shared services to build and/or populate a listing of products to be purchased and/or virtual cart in step 1508. In some instances, for example, one or more shared APIs can be called to implement "Add to Cart" service (which may be initiated by a request from the client POS system 106, in response to a scanner hardware system scanning one or more products and/or other such actions); "Remove from Cart" service; "Edit Cart" service (e.g., increase or decrease a number of the same product); and/or other such cart build services. In some embodiments, one or more view component modules 210 can provide GUI information and/or a GUI corresponding to the cart build process that is optionally utilized by the client POS system to render a cart GUI 1550.

In some embodiments, the client POS system 106 utilizes payment services from the shared resource services 118. One or more shared resource applications 120 can be activated in performing a manage payment process 1510. For example, the hardware manager module 202 can acquire card information from card reader hardware system 110 and one or more shared resource applications can be called through the API handler module to utilize one or more credit card payment applications 120 to receive payment for some or all of a total amount owed for the products being purchased. In some embodiments, one or more view component modules 210 can provide relevant payment GUI information and/or one or more payment GUIs 1552 are optionally rendered by the client POS system and enable a user to interact through the network intermediary system 114 to, for example, select a desired method of payment, provide confirmation information, provide security information, and/or other such functionality provided by the respective GUIs and corresponding shared resource applications responding to input received from the user through the client POS system.

In some instances, a process flow includes a receipt process 1512 that is utilizes one or more receipt services implemented through one or more shared resource applications 120 controlled through the API calls from the API handler module 204. Such application services can include acquiring receipt information, activating a printer hardware system, electronically communicating an electronic receipt, other such services or a combination of two or more of such services. In some embodiments, one or more view component modules 210 can provide relevant receipt GUI information and/or one or more receipt GUIs 1554 are optionally rendered by the client POS system 106 the can provide receipt information, provide one or more receipt options (e.g., print receipt option, text message receipt information, email receipt information, etc.).

Figure 16:
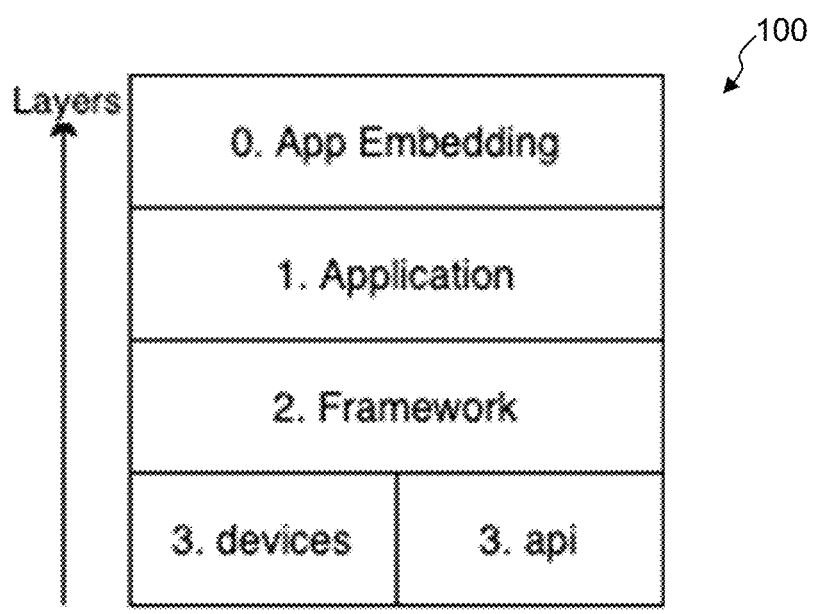
FIG. 16 illustrates a simplified block diagram of an exemplary functional layered framework representation of the networked retail point of sale system, in accordance with some embodiments.

In some embodiments, the network intermediary system 114 operates within an organizational scheme that can be represented as stacked layers of functionality, in cooperation with the client POS systems 106, the hardware systems 110 and the shared resource applications 120. FIG. 16 illustrates a simplified block diagram of an exemplary functional layered framework representation of the networked retail point of sale system 100, in accordance with some embodiments. Shown are different layers in which the functional aspects, which in some embodiments is implemented through sets of software, of the networked retail point of sale system 100 can be organized. Layer 0 represents of the software applications of the network intermediary system 114 are embedded in another application of a system. Layer 0 can be interpreted to contain the other layers (e.g., lower layers as illustrated in FIG. 16), and in some implementations user interface views and/or GUIs. Layer 1 comprises the network intermediary system 114 and the functionality provided by at least the hardware manager module 202, the API handler module 204 and the state manager module 206. These are typically implemented as internal applications that are cooperatively utilized with one or more client POS systems to provide the framework enabling the networked retail point of sale system 100. Layer 2 represents the shared state functionality that allows an application to optionally reutilize shared states (a common saved data format) in the application, yet not be tied to reusing the look and feel of embedding the network intermediary system 114. Layer 3 represents lower-level libraries that the client POS system can optionally use, while not utilizing some or all of the shared state logic. Each layer utilizes one layer below itself (e.g., layer 1 utilizes layer 2, and layer 2 utilizes layer 3). Each layer itself can be interpreted as and/or comprises a library (component or part) utilized by the framework stack. In some embodiments, each library can take configuration at startup that modifies how the library or layer works before it is given to the framework stack and begins normal operations.

Figure 17:
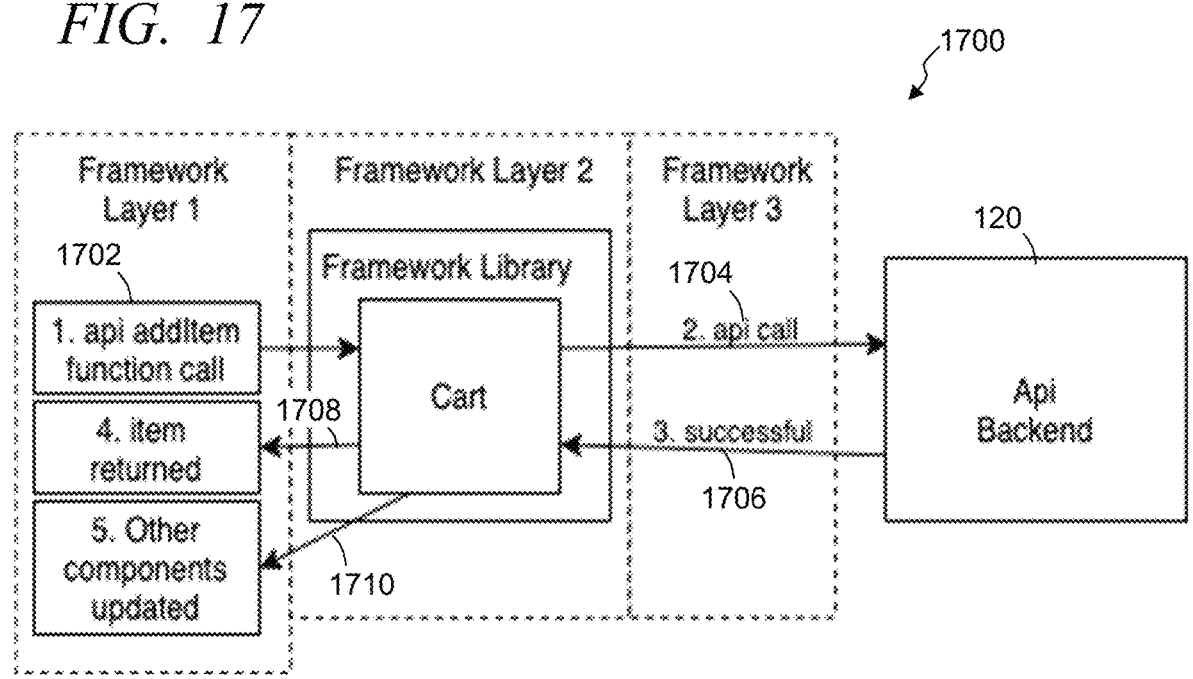
FIG. 17 illustrates an exemplary process flow of adding a product successfully to a cart state at a representative framework level, in accordance with some embodiments.

FIG. 17 illustrates an exemplary process flow 1700 of adding a product successfully to a cart state at a representative framework level, in accordance with some embodiments. In step 1702, a addItem function, from framework layer 1, is called in framework layer 2. Layer 2, in step 1704, utilizes an API call directed to layer 3 to add the item. The API call (e.g., from the API handler module 204) is directed over the distributed network 116 to activate one more shared resource applications 120. In response to successfully adding the item the cart, a response is received in step 1706 and a corresponding state in layer 2 is updated (e.g., through the state manager module 206). Further, the state information and/or other relevant information is returned in step 1708 to the addItem function call from layer 1. The updated state, in some embodiments, can also induce updates in step 1710 of other components of the system.

Figure 18:
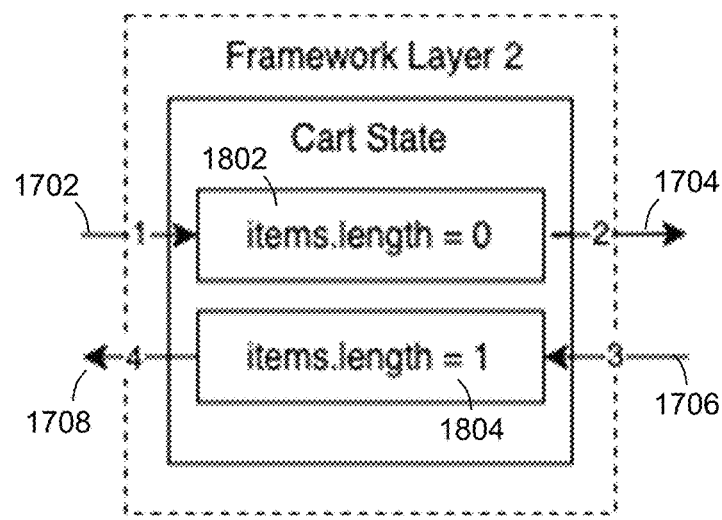
FIG. 18 illustrates a simplified block diagram representation of exemplary state changes in the process of successfully adding an item to a cart, in accordance with some embodiments.

FIG. 18 illustrates a simplified block diagram representation of exemplary state changes in the process of successfully adding an item to a cart consistent with FIG. 17, in accordance with some embodiments. In response to the addItem function call from framework layer 1, the state manager module 206 in step 1802 updates that state in layer 2 consistent with the pending request. Similarly, the state manager module in step 1804 state in layer 2 is again updated based on the response is received in step 1706 indicating the successful addition of the item.

Figure 19:
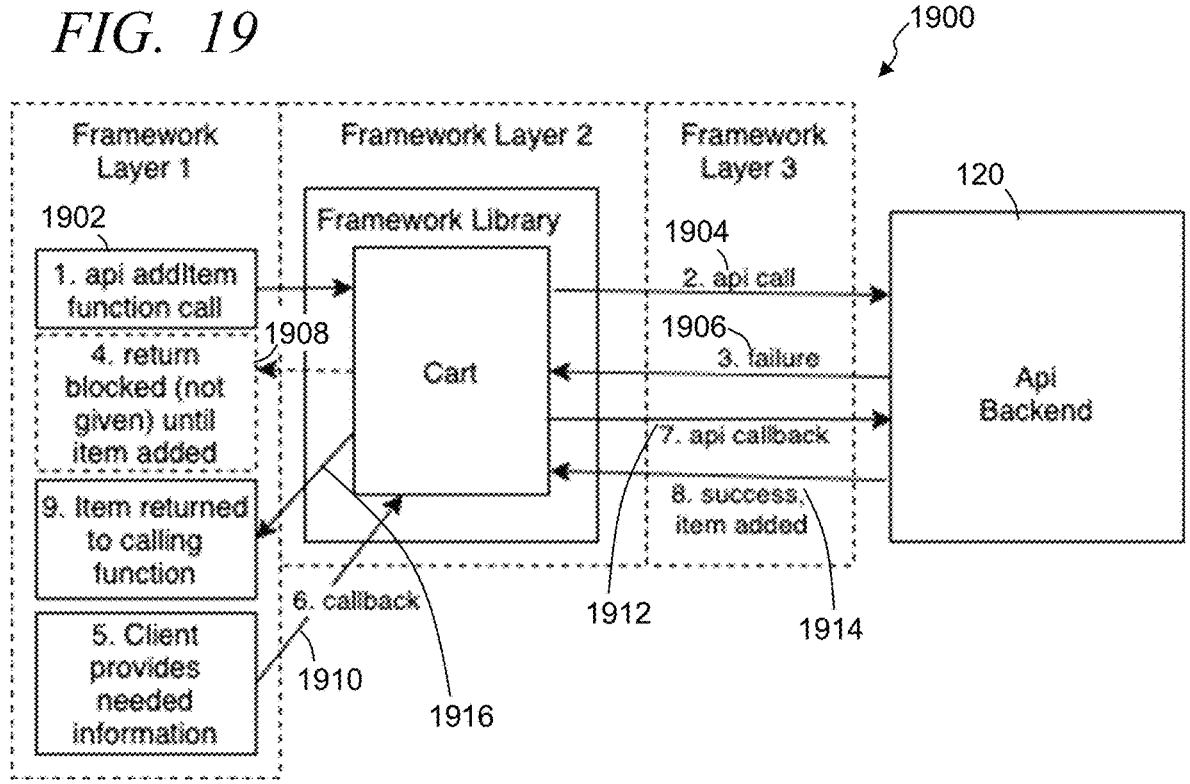
FIG. 19 illustrates an exemplary process flow of a failure to add an item successfully to a cart state at a representative framework level, in accordance with some embodiments.

As described above, in some instances one or more errors and/or conditional errors may occur. FIG. 19 illustrates an exemplary process flow 1900 of a failure to add an item successfully to a cart state at a representative framework level, in accordance with some embodiments. In step 1902, a addItem function, from framework layer 1, is called in framework layer 2. Layer 2, in step 1904, utilizes an API call directed to layer 3 to add the item. In some embodiments, the API call (e.g., from the API handler module 204) is directed over the distributed network 116 to activate one more shared resource applications 120. In response to a failure to add the item the cart, a fail response is received from the shared resource application 120 in step 1906 and a corresponding state in layer 2 is updated (e.g., through the state manager module 206). For example, a conditional error may occur where information is to be obtained before the item is added (e.g., item is age restricted and a birthdate of the customer is to be obtained). In step 1908, a called to the addItem function (at position 4) waits, in some instances indefinitely while in other instances based on a threshold time limit, until the item is added successfully to the cart. In order to satisfy the addItem failure, in some instances, a callback is used at step 1910. For example, the callback may reside in the cart state and is commonly used by a dialog option and/or other entry function, to take data from the user and make the addItem request again. Layer 2, in step 1912, utilizes an API call directed to layer 3, based on the callback in step 1910, to provide relevant information, confirm one or more actions or other such state information based on conditional error or other reason the addItem failed. In response to successfully adding the item the cart, a response is received in step 1914 and a corresponding state in layer 2 is updated (e.g., through the state manager module 206). Further, the state information and/or other relevant information is returned in step 1916 to the addItem function call from layer 1. Accordingly, in some embodiments, when the addItem request is successful, the framework layer 1 addItem function call is successfully returned the data and becomes "un-blocked".

Figure 20:
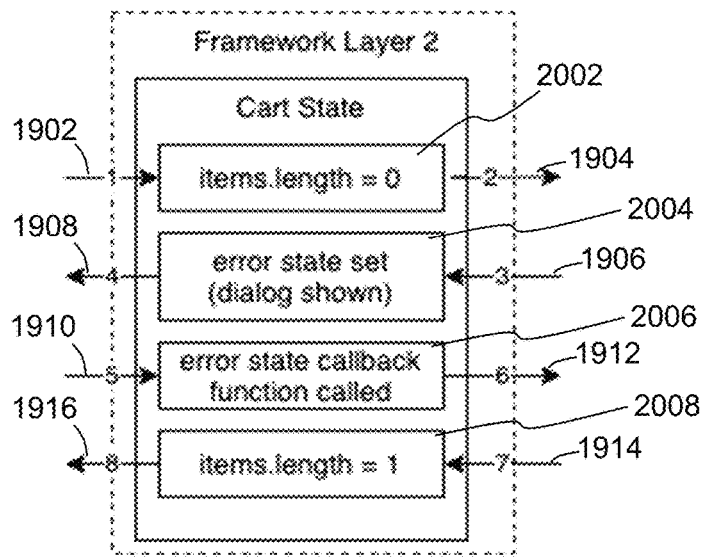
FIG. 20 illustrates a simplified block diagram representation of exemplary internal state changes in the process when adding an item is unsuccessful, in accordance with some embodiments.

FIG. 20 illustrates a simplified block diagram representation of exemplary internal state changes in the process 1900 when adding an item is unsuccessful, and the addItem awaits a callback to satisfy one or more conditions before the item can be added successfully, in accordance with some embodiments. In response to the addItem function call from framework layer 1, the state manager module 206 in step 2002 updates that state in layer 2 consistent with the pending request. The state manager module in step 2004 further updates state in layer 2 based on the error state received in step 1906 indicating the unsuccessful addition of the item. The state is further updated in step 2006 to reflect the error state callback based on the callback in step 1910. The state in layer 2 is again updated in step 2008 based on the response to the call back is received in step 1914 indicating the successful addition of the item.

Figure 21:
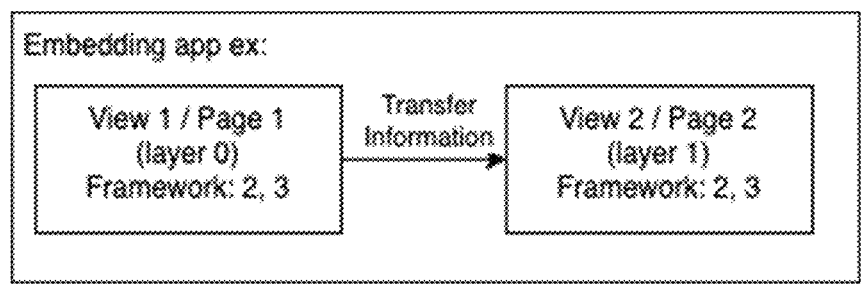
FIG. 21 shows a simplified block diagram of an example of information transfer occurring based on one application embedding another application (layer 0), in accordance with some embodiments.

FIG. 21 shows a simplified block diagram of an example of information transfer occurring based on one application embedding another application (layer 0), in accordance with some embodiments. In this example, information is to be transferred from layer 0 (the embedding application) to layer 1 (e.g., a network intermediary system application that is embedded and implements one or more modules when executed). The information that is transferred supports synchronizing two different framework libraries that are utilized within the single application. Layer 0 and layer 1 utilize layers 2 and 3 for different instances of the same library, which is the reason the data is transferred.

Figure 22:
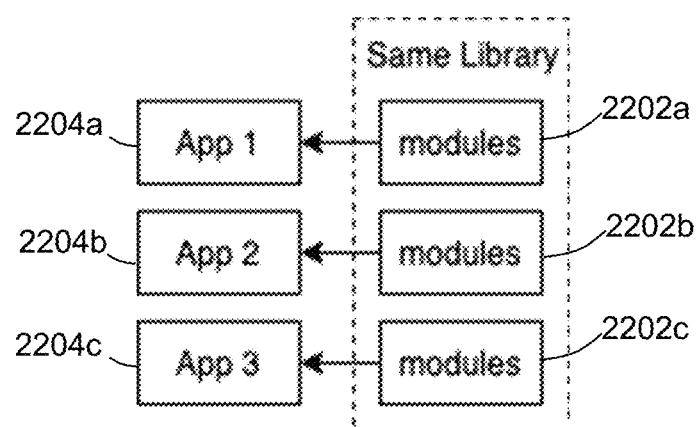
FIG. 22 shows an example diagram illustrating how the framework layer 2 can be reutilized by many different shared resource applications, in accordance with some embodiments.

FIG. 22 shows an example diagram illustrating how the framework layer 2 can be reutilized by many different shared resource applications, in accordance with some embodiments. The library 2202a-2202c is a separate instance in every corresponding application 2204a-2204c. Some embodiments provide the networked retail point of sale system 100 that streamlines the use of client POS systems 106 and/or checkout experience for customers of a retail store and/or stores associated with a retailer. The network intermediary system architecture allows similar POS experiences across multiple different sets 105 of client POS systems 106 (e.g., self-checkout POS systems, mobile checkout POS systems, associate operated POS systems, different department POS systems, etc.) while further providing interoperability of transactions across these platforms in part through the shared resource services 118 implemented through one or more shared resource applications 120. In some embodiments, the network intermediary system 114 provide substantially a uniform checkout experience for customers across the multiple different sets 105 of client POS systems that are clients of the network intermediary system 114. Such sets 105 of client POS systems can include self-checkout lane POS systems, staffed or associate operated lane POS systems, mobile lanes POS systems, different department POS systems, including outlying registers (e.g., Garden POS systems, Pharmacy POS systems, Auto Care Center POS systems, Firearms POS systems, Grocery Pick up POS systems, returns POS systems, layaway POS systems, etc.).

In some embodiments, the network intermediary system 114 is built on micro frontend architecture, where in some instances a micro frontend is an architectural style where independently deliverable frontend applications are cooperatively utilized and/or composed into a greater whole. The implementations using micro frontends provide, in at least some implementations, smaller, more cohesive and maintainable codebases, more scalable organizations with decoupled, autonomous teams and the ability to upgrade the frontend, update the frontend, rewrite parts the frontend and/or perform other such modifications without any impact to customers. Further, the network intermediary system architecture enables easier incremental upgrades to some or all of the network intermediary system 114. Unlike a monolith frontend, the network intermediary system architecture continues to deliver new features to client POS systems and/or customers without impacting the POS systems or customers. Further, the network intermediary system 114 enables greater freedom to make case-by-case decisions on individual parts or modules of the network intermediary system 114, and to make incremental upgrades to the architecture, dependencies, and user experiences. Additionally, if there is an error or breaking change in the framework of the network intermediary system 114, each micro frontend client can be upgraded when it makes sense, rather than being forced to stop everything and upgrade everything at once. Additionally, the micro frontend architecture allows experimentation with new technologies and/or new modes of interaction in a more isolated fashion that other systems.

In some embodiments, the network intermediary system 114 utilized simplified, decoupled codebases. The smaller codebases are typically simpler and easier for developers to work with. In some implementations, the network intermediary system 114 limits and/or avoids the complexity arising from unintentional and inappropriate coupling between components that should not know about each other. We will discuss more about these codebases in detail in Shared component libraries section. Additionally, in some embodiments, the network intermediary system 114 pushes implementation to be explicit and deliberate about how data and events flow between different modules and/or parts of the network intermediary system application(s). The micro frontends, similar to microservices, provides independent deployability. This reduces the scope of given deployments, which in turn reduces the associated risk. For example, regardless of how or where a Pharmacy application is hosted, the network intermediary system micro frontend has its own continuous delivery pipeline, which builds, tests and deploys it through production.

In some implementations, the network intermediary system 114 enables autonomous teams. As a benefit of decoupling both codebases and release cycles, the network intermediary system 114 enables teams to have full ownership to deliver value to customers, which enables quicky and effective implementation and/or modifications. Additionally, the network intermediary system 114 provides higher cohesiveness among other micro frontend teams such as Pharmacy, Layaway, and further provides business features as a standalone POS solution by itself.

Figure 23:
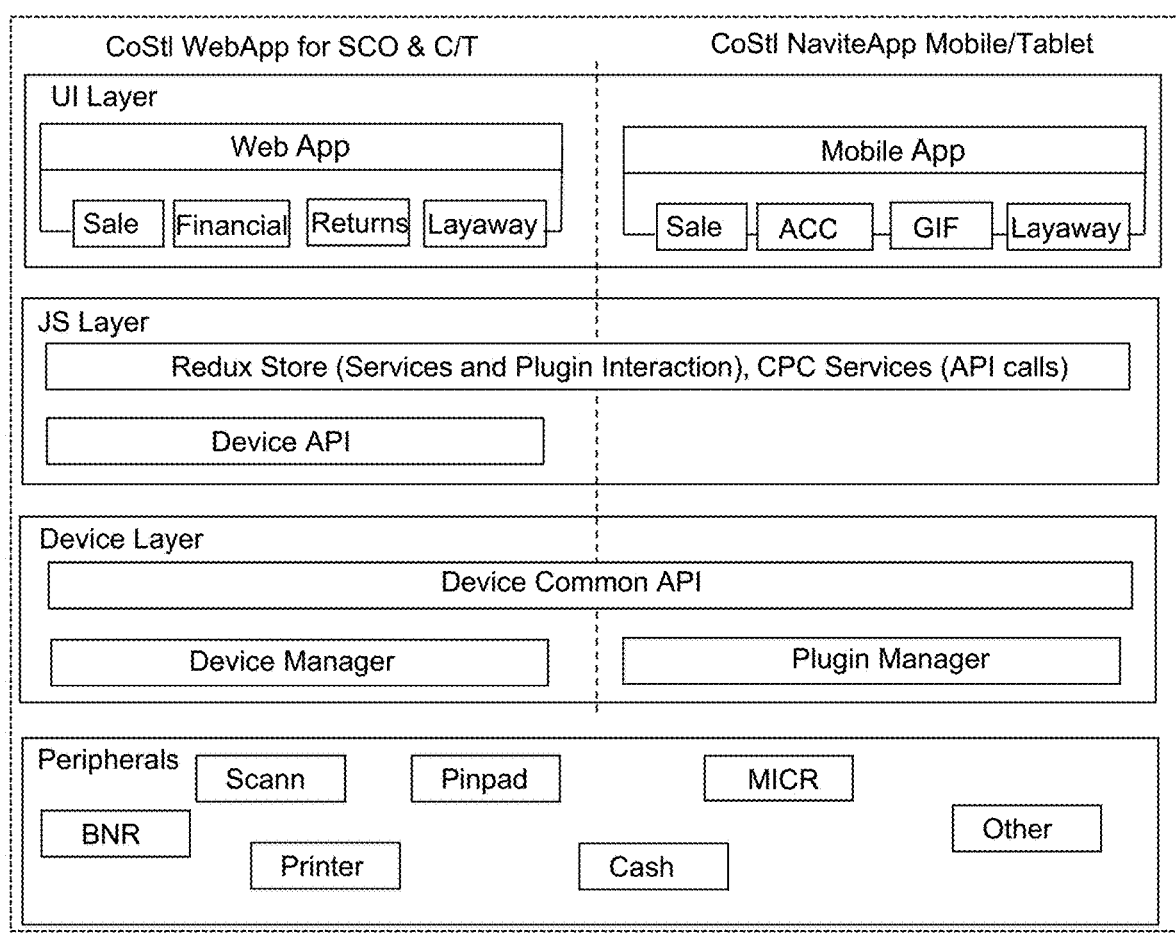
FIG. 23 shown an example layered architecture of the network intermediary system in accordance with some embodiments.

In some embodiments, the network intermediary system 114 comprises a framework that both technically and logically fits both Webapp and Native applications. FIG. 23 shown an example layered architecture of the network intermediary system 114 in accordance with some embodiments. The network intermediary system 114 effectively cooperates multiple different sets 105 of different types of POS systems 106 together and provides a platform, services, and tools that are shared through the intermediary interface. As part of the network intermediary system framework, POS Webapp receives pre-written, reusable libraries by the network intermediary system 114 to communicate with the shared resource services 118, and also to maintain states of services and/or transactions (e.g., cart states, purchase contract states, etc.). In some embodiments, a mobile and/or tablet framework comprises Electrode React Native, and React Native and JS libraries, with a device layer build on React Native for Mobile and Tablet POS systems. Some embodiments, such as with some self-checkout (SCO) POS systems the framework comprises browser build application in ReactJS and reuses the same libraries for redux and java, with a device layer build using MQ on browser-based systems.

Some embodiments include and/or implement a network intermediary system desktop architecture. Associated staffed checkout lanes in retail stores play vital roles completing purchases the POS systems. POS systems 106 typically include one or more POS controllers that include one or more processors executing specialized code that can be utilized across multiple different POS systems in one or more retail stores. POS reports, store management functions, store resets, TLOG (transaction log) processing applications and many other background and support applications run on these POS systems. For example, some POS system controllers runs on the IBM 4690 operating system. The POS controllers are configured to control terminals/registers and manage the communication with the upstream systems. The software that is deployed on these POS systems typically work with a variety of peripheral hardware systems (e.g., printers, product scanners, card readers, etc.). Previous implementations of the POS systems utilized a variety of software applications that have been deployed on these POS systems. Typically, however, the maintenance of these POS systems limit the ability to modify and/or upgrade. The network intermediary system 114 enables upgrades of software applications without a need to upgrade the hardware of POS systems to gain more return on investment (ROI) and economies of scale.

Some POS systems are customer self-checkout (SCO) POS systems that are typically heavily dependent on vendor and/or manufacturer software. Such software is typically proprietary, costly and controlled by the vendor and/or manufacturer. Accordingly, such vendor software use can significantly imped development of new features. The network intermediary system 114 simplifies the incorporation of new software, applications and/or features allowing easier development of software and/or applications, and often applications that are common across multiple different sets 105 of POS systems 106 (e.g., common to both associate staffed lane POS systems and customer self-checkout lane POS systems). Further, the abstraction of the applications through the shared resource services 118 and/or the view components 210 that are shared across multiple different sets of POS systems enables similar interfaces to be utilized and run on different types of POS systems and different sets of POS systems. Additionally, the network intermediary system 114 enables the development and delivery of business value features faster to the market with a higher level of quality and stability.

In some embodiments the network intermediary system 114 and/or desktop network intermediary system comprises at least three layers: (a) a set of frontend web applications, such as but not limited to sale (e.g., providing core POS and checkout), as well as other applications including layaway, returns, financial services, and/or other such frontend applications; (b) a device management framework that provides abstractions for POS peripheral control to the frontend applications; and (c) a shared application library that receives front-end calls from POS web applications. Device management framework APIs enable POS applications to readily integrate with hardware systems in an operating system (OS) and protocol-independent way. In some embodiments, the device management framework is a POS device management framework written in Java that controls the communication with POS systems attached to a register using "Device Controllers". The device management framework can be run on a register using Sky OS with OEM drivers in case of no UPOS drivers available. The register is physically connected to hardware systems, such as Printer/magnetic ink character recognition (MICR) systems, handheld product scanner, printer, cash drawer, external mechanical keyboard, side keyboard, card reader, etc. Some embodiments further provide a diagnostic application that can run in the browser on the register with a UI to establish communications back and forth between the hardware systems devices through the device management framework.

In some embodiments, include the shared resource application library comprises a JavaScript library that is shared by the multiple sets 105 of POS systems 106. The shared resource applications receive front-end calls from the plurality of POS systems of the different sets of POS systems (e.g., through a POS web application) and place a formatted message onto the AMQ for consumption. The POS application (hosted in the frontend architecture) can be configured to have access to the complete list of hardware systems that the respective POS system can utilized to perform relevant functions.

Figure 24:
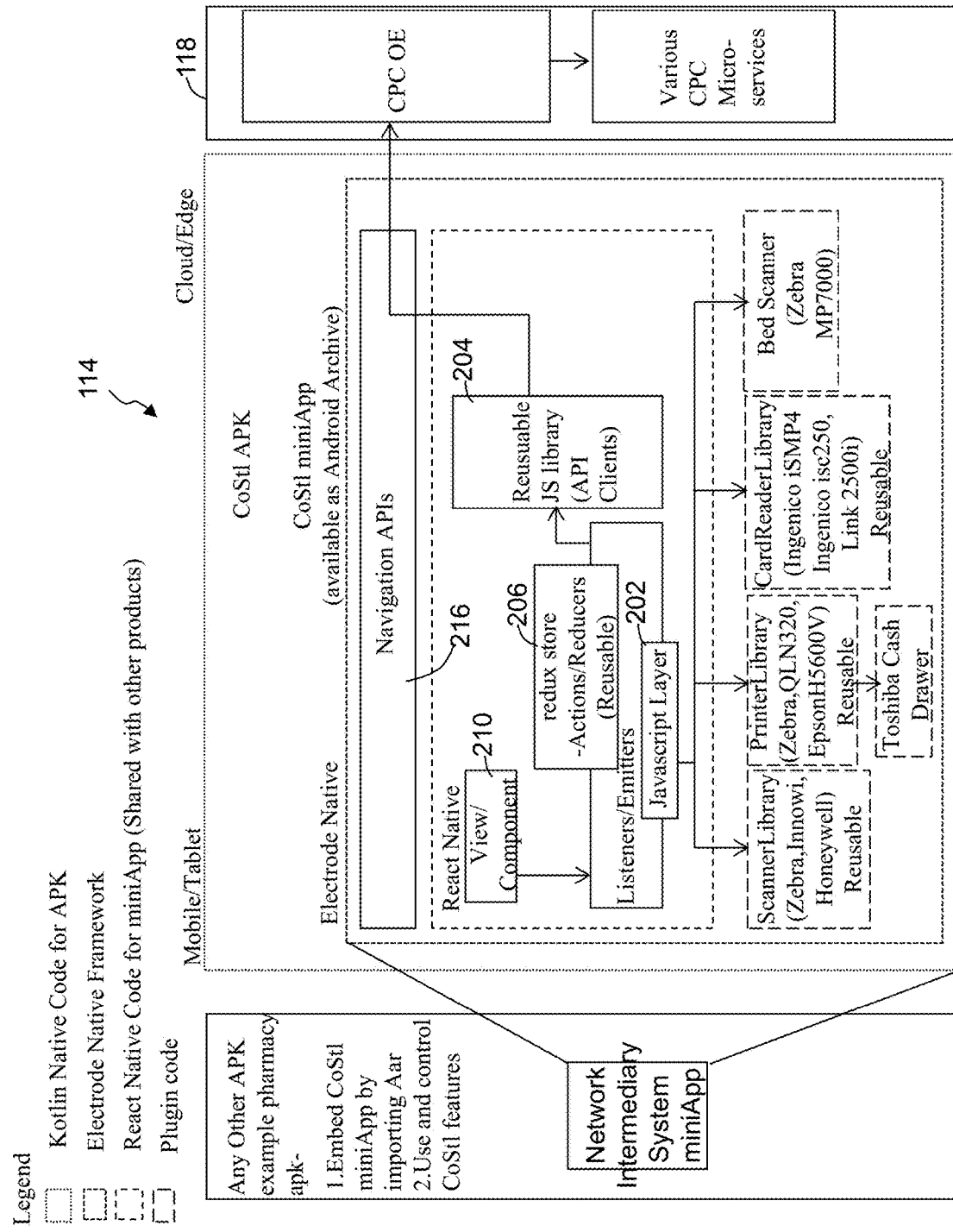
FIG. 24 illustrates a simplified block diagram representation of an exemplary network intermediary system implemented through a mobile and/or tablet architecture, in accordance with some embodiments.

FIG. 24 illustrates a simplified block diagram representation of an exemplary network intermediary system 114 implemented through a mobile and/or tablet architecture, in accordance with some embodiments. As described above, in some embodiments, the network intermediary system 114 can be partially or fully implemented through one or more software applications comprising code executed on a particular mobile device based on mobile and/or tablet architectures. Some embodiments utilize, for example, React Native for ANDROID, ReactJS for web, and a shared JavaScript shared resource application library that shared between React Native and ReactJS. Further, some implementations utilize common code between our various hardware configurations. Some implementations provide at least improved reusability, reduced or no POS or hardware vendor dependency, faster delivery and/or implementation, and a single change provides distributed benefit based on the shared configuration. Network intermediary system native applications can be built using an Electrode Native platform. Client POS applications executed on a mobile device and/or client POS systems 106 external to a mobile device can readily utilize a cart and/or checkout feature through the shared resource applications 120, and in some implementations can embed a MiniApp with control of the flow (e.g., a React Native MiniApp). Electrode Native can remove the need of writing boiler plate code for navigation between Client and MiniApp. It also enables various features like reusing their own theme (color scheme of UI components) to provide seamless integration. In some embodiments, the MiniApp is configured to orchestrate between plugins and API client calls.

Some embodiments provide shared component libraries of GUI information and/or GUIs. A library of shared, reusable user interface view components are optionally utilized by POS systems to provide visual consistency across micro frontends. The component libraries reduce effort through re-use of code, and visual consistency. In addition, the component library can serve as a living style guide, and act as a point of collaboration between developers and designers.

In some embodiments, the network intermediary system 114 offers multiple such reusable view components that can be used by one or more of the client POS systems 106. As shown in the architecture diagram of FIG. 24, the network intermediary system 144 provides numerous commonalities both in functionality and/or shares services of the end user, and with hardware device communication. In some embodiments, the network intermediary system utilizes number of reusable JavaScript libraries as well reusable device controllers and plugins. Further, at least some reusable JavaScript libraries provide retries and failovers functionality.

The network intermediary system 114 includes the API handler module 204. In some embodiments, the API handler module utilizes a library of APIs to implement and/or consumes one or more of the shared resource services 118. The shared resource applications 120 are utilized with JavaScript clients. The API handler module 204 in cooperation with the state manager module 206 operate, in part, to save needed states and/or state information shared between API requests (cart id, env base URL, store ID, etc.), provide a typing interface for JavaScript API, provide simple JavaScript APIs to call one or more of the shared resource applications 120, and/or other such functionality. For example, some embodiments provide for the shared use of a shared Upfront JS library that is a reusable Java Script library that can be leveraged by relevant web applications needing to communicate with the shared Upfront application to send/publish messages to the Upfront application. These web applications can benefit from this out of the box library. The Upfront application is an application/service used to communicate issues, alerts, and other statistics to in-store associate handheld devices. Many applications have custom built modules to connect to the Redis client, format messages such that the Upfront application can ingest the messages, and then have a way to observe and/or process any responses. Most of the clients utilizing the Upfront application are JS based applications. JS applications typically have the ability to bring in modules at build time then seamlessly utilize them within their own application. Systems do not have to include their own set of connections and message builders, and instead take advantage of a single JS library maintained relative to the Upfront application.

As described above, some POS systems can be configured to utilize the UI view component library, which provide in part a productivity booster for clients that simply use the view components without development effort and achieve the same UX standards across the multiple different POS system apps. Client applications can import the UI component of their choice and use them as they seem fit. UI view components (e.g., associate keyboard, Number Pad, Quantity Picker etc.) can be leveraged by various clients, which some are being written in React JS.

In some embodiments, the JavaScript library provides a JS API layer with which the front end can interact. Importing this library on one or more front-end applications enables a connection to the device management framework AMQ and allows the front-end application to communicate. This file contains the API layer with which the front end interacts. In order to use the request functionality, a request service or function can be called. In order to use the response functionality, a setter can be utilized to set a callback for each response that is to be considered.

The state manager module 206 provides redux modules that hold states that are at least relative to shared resource services 118, shared resource applications 120, native plugins (e.g., android react native plugins) and/or other such state information. In some embodiments, the state manager module 206 comprises a plurality of state manager sub-modules. In some instances, one or more of these state manager sub-modules can be associated with a set of hardware systems and/or shared services. These module's actions and reducers are imported and can be used in parallel with other modules from an applications redux store. In some embodiments, these modules extend an applications current store. For example, a client can bind to a state change for a module and dispatch an action in their own store.

The dependencies of these modules, in some embodiments, are also modular and can be defined in a similar or same manner as the module using the store context. This allows modules to be used as the application needs them and not bring all the code from another module. For example, a cart sub-module utilizes a context of a store to have a 'cart' key. That key can define how the store will be configured: blocking, shared services client calls. The cart sub-module can have a dependency on the existence of a shared resource client to exist that allows the cart to make shared services API calls. That dependency is also defined in the store's context as the API key.

Figure 25:
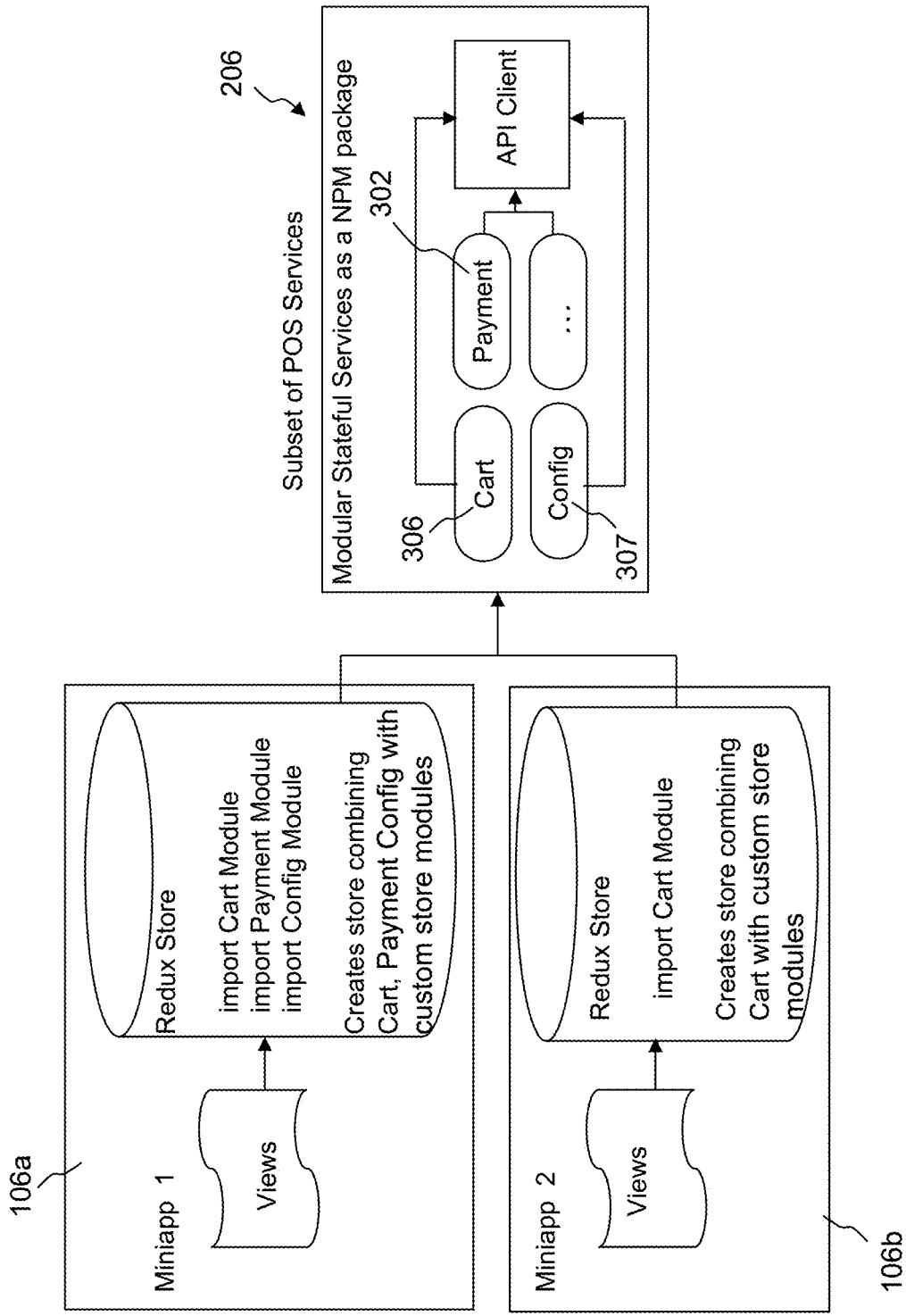
FIG. 25 shows a simplified flow diagram of exemplary front end client POS systems employing respective front end MiniApps, in accordance with some embodiments.

FIG. 25 shows a simplified flow diagram of exemplary front end client POS systems 106a-106b employing respective front end MiniApps that communicatively couples with and cooperates with a state manager module 206 of the network intermediary system 114, in accordance with some embodiments. As illustrated, in some embodiments, the client POS systems 106 can be configured to optionally utilize some services and/or provided through the network intermediary system 114 while optionally not using other functionality. Typically, a set 105 of POS systems 106 are similarly configured to optionally utilize the same first subset of services of the network intermediary system 114 and optionally not utilize the same second subset of services. For example, a first client POS system 106a may utilize share resource services of cart build service through a cart module, payment service through a payment module and a configuration service through a configuration module. The second client POS system 106b can be configured to utilize the services of cart build service through a cart module. One or more of the state manager sub-modules can be utilized to maintain state information corresponding to the implementation of the one or more services or functionalities, such as but not limited to a cart state manager sub-module 306, a payment state manager sub-module 302, a configuration state manager sub-module 307, and other such sub-modules.

In some embodiments, the cart state manager sub-module 306 maintains states and provides information and/or actions communicated to corresponding cart services implemented though a set of share resource cart applications. These share resource applications cause changes to the cart state that is maintained and updated through the cart state manager sub-module 306. These actions include can include, for example, adding an item (with or without restrictions), voiding items, clearing a cart, deleting a cart, updating an item's quantity, transferring a based on a cart identifier, and other such services.

In some embodiments, the state manager module 206 includes one or more payments state manager sub-modules 302. The payments state manager sub-module at least temporarily maintains changes to states and/or state information regarding the operation of one or more payment shared resource applications configured to acquire payment for products through one or more payment methods (e.g., credit card, gift card, debit card, government subsidies, cash, check, etc.). In some embodiments, the payments state manager sub-module 302 comprises a React Native module (e.g., for ANDROID platform), and holds orchestration between corresponding one or more shared APIs and corresponding one or more payment plugins to complete a payment process.

Some embodiments provide share resource checkout services. A checkout state manager sub-module can be implemented in the state manager module 206, in some implementations, that tracks and maintains state information and/or actions communicated to at least a set of checkout shared resource applications 120 that in part enable the retail store to implement one or more checkout procedures to establish purchase contracts that effect the checkout states, in some implementations, compile relevant state information prior to initiate a payment process, and/or other such actions that can effect states relative to a checkout. These changes in state are at least temporarily captured and updated through the checkout state manager sub-module. A configuration state manager sub-module 307, in some embodiments, at least temporarily maintaining state information regarding identifying information of a device (e.g., a particular client POS system 106, hardware system 110, and/or other devices) and fetches device configuration for the shared resource services. The device configuration, in some implementations, is saves into state for use with the shared resource services 118 (e.g., device configuration from Cloud-Power Checkout (CPC)). Some embodiments include an item inquiry state management sub-module that maintains state information associated with one or more item query shared resource applications 120 (e.g., rough an item inquiry API implemented through the API handler module 204). In some implementations, the state information can include information received from one or more hardware system 110, such as from a product scanner system, as well as at least state changes associated with the inquiry (e.g., in process, complete, returned item information, not found, and/or other such states).

The state manager module 206, in some embodiments, includes a login state manager sub-module that maintains state information through cooperative operation with one or more operator authentication shared resource applications 120 that can operationally be utilized by one or more of the client POS systems 106. These one or more operator authentication shared resource applications 120, in some applications, enable a user to log in the client POS system. The login state manager sub-module monitors the states of login and at least temporarily holds the changes and/or responses in the corresponding states. For example, one or more operator authentication shared resource applications 120 may utilize one or more authentication techniques (e.g., username and password, single sign-on (SSO), etc.), and the login state manager sub-module can be configured to maintain state information associated with the process of utilizing the one or more authentication techniques.

Some embodiments include one or more printer state manager sub-module 303 that holds state information associated with the hardware manager module 202 interacting with one or more printer hardware systems. For example, the hardware manager modules 202 may utilize a predefined printer API consistent with the predefined intermediary printer communications protocol, and the printer API enables connecting to and interacting with a set of one or more printers. In some embodiments, the printer state manager sub-module 303 comprises a React Native module (e.g., for android platform). Similarly, the state manager module 206, in some embodiments, includes one or more scanner state manager sub-modules 304 configured to at least temporarily hold state information corresponding to a scanner API implemented through the hardware manager module 202 consistent with the predefined scanner communications protocol enabling connecting to and interacting with a set of one or more product scanners systems. In some embodiments, the scanner state manager sub-module 304 comprises a React Native module (e.g., for android platform). One or more other state manager sub-modules may be implemented, such as but not limited to one or more transaction state manager sub-modules that provide an ability to perform pay at register POS system, one or more APP pay state manager sub-modules. Such pay applications (APP), in some embodiments, are operated on customer's mobile device that wirelessly communicates with a corresponding receiver system associated with one or more client POS systems to authorize payment through an account associated with the respective customer and/or the customer's mobile device (e.g., APPLE PAY, WALMART PAY, etc.). In some embodiments, one or more APP pay shared resource applications are activated, and state information is maintained through the APP pay state manager sub-module (e.g., through polling, tracking, etc.).

In some embodiments the device management framework provides a POS device management framework written in Java and configured to control the communication with client POS systems 106 attached to corresponding registers using device controllers. The device management framework, in some embodiments, provides a real-time, fast, lightweight, and secure event-driven platform for cloud-scale applications. The device management framework, in some implementations, comprises AMQ, device management framework applications and controllers. The device management framework is configured to receive and send message from and/or to both client POS systems 106 (and/or the one or more POS applications executed on POS systems) and hardware systems 110. In some implementations, a new instance of EventManager is created when the device management framework starts. Further, in starting, the device management framework in some embodiments also starts a runner thread that goes through the events in the EventManager and processes each event one by one. Similarly, when the device management framework loads up, the class loader loads one or more or each Device Controller class and device manager class maintains all the controllers.

The networked retail point of sale system 100, in some embodiments, comprises a micro frontend and libraries that are reused across multiple different sets 105 of POS systems 106. The networked retail point of sale system 100 includes the network intermediary system 114 and the multiple client POS systems the front end libraries to implement multiple shared resource services 118 (e.g., cart, checkout and other such operation services). Further, the network intermediary system 114 provides reusable hardware integration leveraging code to interface to easily adopt different vender implementation (e.g., payment using Ingenico iSMP4, Verifone devices, and/or other such devices or combination of devices). The networked retail point of sale system 100.

In some embodiments, the networked retail point of sale system 100 comprises a micro frontend for use with different sets 105 of client POS systems 106 (and/or POS applications operated on the POS systems) providing different functionality and/or interfaces that provided in the other sets of the multiple sets of POS systems. The micro frontend, in some embodiments, comprises one or more easily integrated and highly cohesive applications that are reusable across different client POS applications or clients (e.g., store manager POS systems and/or applications (e.g., allows store manager to check state of POS registers), pay at pickup POS systems and/or applications (e.g., a GIF dispense that can be used for grocery pay at pickup), and other such POS applications), as well as reusable across different POS systems (e.g., different department POS systems (e.g., Auto Care Center POS systems—along with auto care services, store associates can also sell general merchandise with ability to take payments using same hardware without extra coding/effort; layaway POS system, which again enables store associated to sell general merchandise and ability to take payments using same hardware without extra coding/effort; customer self-checkout POS systems; store associate operated POS systems; mobile POS systems; and/or other such POS systems. Further, the networked retail point of sale system 100 allows POS systems to enable payment through multiple different methods, when such POS systems previous were limited (e.g., additional payment method through government sponsored subsidies, directed spend, etc.). Still further, in some embodiments, the networked retail point of sale system 100 is configured to operate via omni channel, which enables support of at least mobile shopping applications (e.g., Scan and Go Micro frontend on .com APP). Similarly, in some embodiments, the micro frontend architecture for the network intermediary system 114 is configured to be hosted on substantially any POS system, and in some implementations as one or more embedded APPs. The network intermediary system architecture, in some embodiments, packages the views, states, plugins and backend client libraries. Further, multiple hosting POS systems and/or hosting POS APPs enable seamless experience when the hosting is switched between POS systems and/or a server.

Figure 26:
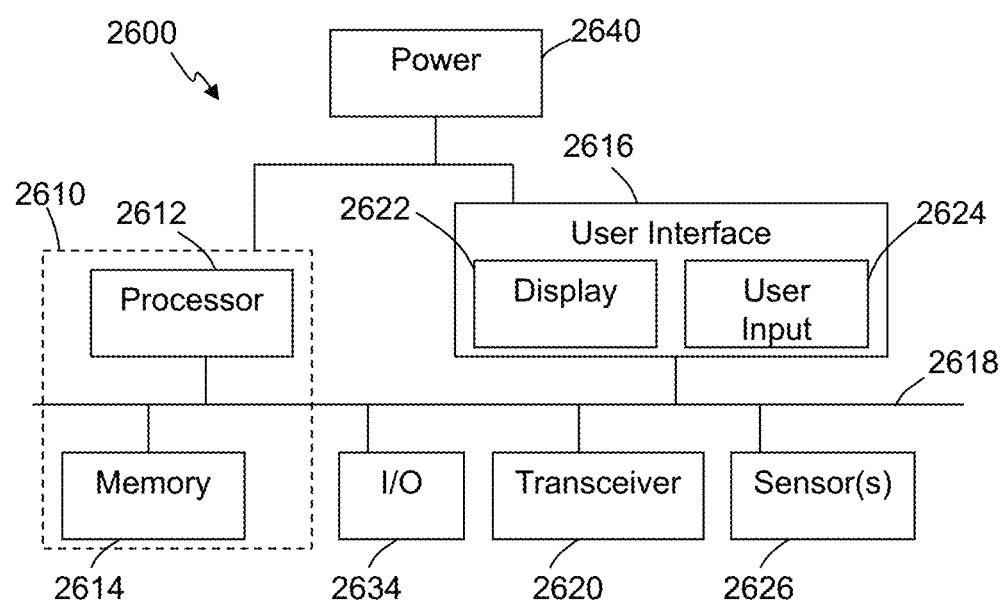
FIG. 26 illustrates an exemplary system for use in implementing methods, techniques, devices, apparatuses, systems, servers, sources and providing access to rendered retail environments, in accordance with some embodiments.

Further, the systems, circuits, circuitry, components devices, processes, methods, techniques, functionality, services, servers, sources and the like described herein may be utilized, implemented and/or run on many different types of devices and/or systems. FIG. 26 illustrates an exemplary system 2600 that may be used for implementing any of the components, circuits, circuitry, systems, functionality, apparatuses, processes, or devices of the network intermediary systems 114, the intermediary system control circuit 115, central control circuit 130, client POS system 106, POS control circuit, hardware system 110, hardware control circuits 802, servers, databases, store associate mobile devices, customer mobile devices, inventory system, inventory demand system, and/or other above or below mentioned systems, components, circuits, devices, or parts of such systems, components, circuits, circuitry, functionality, apparatuses, processes, or devices. However, the use of the system 2600 or any portion thereof is certainly not required.

By way of example, the system 2600 may comprise a control circuit or processor module 2612, memory 2614, and one or more communication links, paths, buses or the like 2618. Some embodiments may include one or more user interfaces 2616, and/or one or more internal and/or external power sources or supplies 2640. The control circuit 2612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 2612 can be part of control circuitry and/or a control system 2610, which may be implemented through one or more processors with access to one or more memory 2614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 2600 may be used to implement one or more of the above or below, or parts of, components, circuits, systems, processes and the like.

The user interface 2616 can allow a user to interact with the system 2600 and receive information through the system. In some instances, the user interface 2616 includes a display 2622 and/or one or more user inputs 2624, such as buttons, touch screen, track ball, keyboard, mouse, etc., which can be part of or wired or wirelessly coupled with the system 2600. Typically, the system 2600 further includes one or more communication interfaces, ports, transceivers 2620 and the like allowing the system 2600 to communicate over a communication bus, a distributed computer and/or communication network 116 (e.g., a local area network (LAN), the Internet, wide area network (WAN), etc.), communication link 2618, other networks or communication channels with other devices and/or other such communications or combination of two or more of such communication methods. Further the transceiver 2620 can be configured for wired, wireless, optical, fiber optical cable, satellite, or other such communication configurations or combinations of two or more of such communications. Some embodiments include one or more input/output (I/O) ports 2634 that allow one or more devices to couple with the system 2600. The I/O ports can be substantially any relevant port or combinations of ports, such as but not limited to USB, Ethernet, or other such ports. The I/O interface 2634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 2626 to provide information to the system and/or sensor information that is communicated to another component, such as the intermediary system control circuits 115, the central control circuit 130, the network intermediary system 114, a hardware system 110, a client POS system 106, an inventory system, one or more store associate mobile devices, one or more customer mobile devices, and/or other such systems. The sensors can include substantially any relevant sensor, such as optical-based scanning sensors to sense and read optical patterns (e.g., bar codes), radio frequency identification (RFID) tag reader sensors capable of reading RFID tags in proximity to the sensor, motion sensors, distance measurement sensors (e.g., optical units, sound/ultrasound units, etc.), location sensors (e.g., GPS, triangulation, point of reference, accelerometer, gyroscope, etc.), and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 2600 comprises an example of a control and/or processor-based system with the control circuit 2612. Again, the control circuit 2612 can be implemented through one or more processors, controllers, central processing units, logic, software and the like. Further, in some implementations the control circuit 2612 may provide multiprocessor functionality.

The memory 2614, which can be accessed by the control circuit 2612, typically includes one or more processor-readable and/or computer-readable media accessed by at least the control circuit 2612, and can include volatile and/or nonvolatile media, such as RAM, ROM, EEPROM, flash memory and/or other memory technology. Further, the memory 2614 is shown as internal to the control system 2610; however, the memory 2614 can be internal, external or a combination of internal and external memory. Similarly, some or all of the memory 2614 can be internal, external or a combination of internal and external memory of the control circuit 2612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 116. The memory 2614 can store code, software, executables, scripts, data, content, lists, programming, programs, log or history data, user information, customer information, product information, and the like. While FIG. 26 illustrates the various components being coupled together via a bus, it is understood that the various components may actually be coupled to the control circuit and/or one or more other components directly.

Some embodiments provide a hardware API signature that defines functionality for each set 109 (scanner, printer, payment) of hardware systems 110, which in some instances is a minimum for functionality for the hardware system to operate. The hardware functionality, in some implementations, is extended to work for the framework modules and their functionality (e.g., JavaScript, client, etc.). Further, states and/or state information is shared, in some implementations, for the purposes of POS when states are grouped into predefined services or purposes. For example, when the system fails to add an item to the cart, the system generates a callback and that callback has a signature. In some implementations, a callback flow is stateless. For example, when it is known that an item being added has an age condition, the system can verify a customer's age before the API call. The system can then add the relevant conditional parameter(s) with a first request and avoid a conditional error event and not have to implement a callback. This provides a stateless error state process. Some embodiments define a minimum set of functionality for each module that includes actions and state. For instance, a cart module is configured to be able to add an item, and have an error correspond to a defined error of a set of one or more error states for adding an item. In addition, adding an item typically includes a cart with totals. The cart module, in some embodiments provide a minimum set of functionality for a cart: functions and state. Some embodiments include a set of retailer specific functionality. Further, some embodiments categorize the functionality and state (generally), and a parent can be defined for a cart. Other modules (e.g., payment and checkout modules) can similarly be configured.

Some embodiments comprise the hardware manager module 202 as part of a retail payment system that enables multiple different sets 109 of different hardware systems 110 and/or applications to communicate using a standard protocol and/or command set regardless of the manufacturer of the hardware system, a version of the hardware system, an operating system of the hardware system, etc. to receive the command and/or communication. Further, in some implementations, the hardware systems 110 interfacing with the hardware manager module comprise a transformation layer that utilizes a transformation library that is applied by a hardware system control circuit to provide translation between a predefined intermediate communications protocol specific to the set of hardware systems, and an internal hardware API protocol of the hardware system. In some embodiments, a hardware vendor, manufacture, distributor or the like is provided with an SDK to the predefined intermediary communications protocol of the corresponding set of hardware systems for use in developing the transformation library.

Generally speaking, pursuant to various embodiments, systems, apparatuses and methods are provided herein useful to provide a networked retail point of sale system. In some embodiments, the network retail point of sale system, comprises: a retail network intermediary system communicatively coupled, over a distributed computer network, with multiple different sets of client point-of-sale (POS) systems operated in association with a retail store, a plurality of different sets of hardware systems configured to be engaged by the client POS systems, and a plurality of shared resource applications. The network intermediary system operates between the client POS systems and the hardware systems, between the client POS systems and the resource applications, and between the hardware systems and the resource applications. Further, the network intermediary system is reusable across the multiple different sets of client POS systems and comprises an intermediary system control circuit configured to execute computer program modules. The intermediary system control circuit is configured to execute a hardware manager module configured to output and receive, for each set of hardware systems of the plurality of different sets of the hardware systems, a single one predefined hardware communications protocol of a set of a plurality of predefined hardware communications protocols regardless of a type of hardware system or manufacturer of a respective one of the hardware systems of the respective set of hardware systems. The intermediary system control circuit is configured to execute an application program interface (API) handler module configured to implement one of multiple different shared APIs to initiate a corresponding one of the shared resource applications to be activated in response to each application service request from the client POS systems and the hardware systems, and forward responses from the respective shared resource applications, wherein the shared resource applications are shared through the API handler module across the multiple different sets of client POS systems and the plurality of different sets of hardware systems and the shared resource applications are not specific to one of the different sets of client POS systems or one of the plurality of different sets of hardware systems. Additionally, the intermediary system control circuit is configured to execute a state manager module configured to manage state information corresponding to requests and responses between the client POS systems, the hardware systems and the shared resource applications, and distribute the relevant state information to a relevant one of the client POS systems, the hardware systems and the shared resource applications in implementing and completing transactions through the client POS systems.

In some embodiments, the state manager module comprises a plurality of state manager sub-modules, wherein two or more of the state manager sub-module corresponds to a shared service accessible through the different shared APIs, and each of the two or more of the state manager sub-modules corresponding to one of the shared services is configured to maintain state information corresponding to at least a current state of each active transaction utilizing one of the shared resource applications and being implemented through the sets of different client POS systems. The state manager module, in some implementations, is configured to update the respective state information during each of multiple different phases of a transaction, and the updated state information is shared between one or more of a first client POS system, a first hardware system and a first shared resource application actively implementing the transaction. Additionally, the state manager module, in updating the state information, is configured to maintain conditional error state information initiated by the first shared resource application in response to a conditional error event preventing completion of a shared service being performed by the first shared resource application, and the state manager module communicates at least some of the conditional error state information to the first client POS system.

In some embodiments, the available states, of the state manager module corresponding to a particular shared resource application, are consistent across each of the multiple different sets of client POS systems that share and utilize the particular shared resource application and are independent of which of a particular client POS system of the different sets of client POS systems initiates the implementation of the particular shared resource application. In some implementations, multiple subsets of the shared APIs are cooperatively operated to implement a respective one of multiple corresponding shares services on behalf of at least one of the client POS systems and the hardware systems. The state manager module, in some embodiments, is configured to maintain conditional error state information initiated by a first shared resource application in response to a conditional error event preventing completion of an application service being performed by a first shared resource application. Further, the state manager module is configured to receive conditional error response information from a first client POS system based on the conditional error event, update the state information with the conditional error response information to be subsequently shared with the first shared resource application. The API handler module, in some instances, is configured to communicate the conditional error response information to the first shared resource application in advancing the application service being performed by the first shared resource application. Additionally or alternatively, the API handler module, in some embodiments, is configured to receive each application service request from each of the client POS systems and each of the hardware systems requesting to implement any one of the shared resource applications, identify the requested shared resource application, route relevant state information acquired from the state manager module to the requested shared resource application, receive response information, and direct the response information to the requesting client POS system or hardware system.

In some embodiments, the API handler module is configured to: identify a source of a first application service request and obtain request information communicated with the first application service request; and identify, based on the source of the first application service request and the request information communicated with the first application service request, a shared first resource application of the resource applications to be activated and forward at least some of the request information to be utilized by the first resource application. The hardware manager module, in managing communication with the sets of hardware systems, is configured to communicate with each hardware system of a first set of hardware systems, regardless of a manufacturer, according to a first hardware communications protocol; and to communicate with each hardware system of a second set of hardware systems, regardless of a manufacturer, according to a second hardware communications protocol. Each set of hardware systems, of the plurality different sets of hardware systems in some instances, is configured to perform a different physical function than the physical function of the other sets of hardware systems. The first hardware communications protocol, in some instances, comprises a printer communications protocol, and the second hardware communications protocol comprises a scanner communications protocol. Accordingly, the first set of hardware systems comprises printer systems, and the second set of hardware systems comprises product scanner systems. In some embodiments, the printer systems comprise two different printer systems from two different manufacturers, and each of the two different printer systems is configured to executing different printer APIs each utilizing different local printer API protocol. The hardware manager module is configured to communicate with each different printer system according to the single printer communications protocol defined by a printer API library regardless of the printer API executed by the respective printer system such that each different printer system is configured to execute a transformation layer to transform communications received according to the printer communications protocol to a respective local printer API protocol executed on the specific printer and to transform communications from the local printer API protocol to the printer communications protocol prior to communicating to the network intermediary system.

Some embodiments provide methods of enabling a distributed, networked retail point of sale system. Some of the methods comprise: operating a retail network intermediary system communicatively coupled, over a distributed computer network, with multiple different sets of client point-of-sale (POS) systems operated in association with a retail store, a plurality of different sets of hardware systems configured to be engaged by the client POS systems, and a plurality of shared resource applications. The operating the network intermediary system comprises operating the network intermediary system between the client POS systems and the hardware systems, between the client POS systems and the resource applications, and between the hardware systems and the resource applications. The network intermediary system is reusable across the multiple different sets of client POS systems and comprises an intermediary system control circuit configured to execute computer program modules. The operating a retail network intermediary system comprises: executing, through the intermediary system control circuit, a hardware manager module in outputting and receiving, for each set of hardware systems of the plurality of different sets of the hardware systems, a single one predefined hardware communication protocol of a set of a plurality of predefined hardware communications protocols regardless of a type or manufacturer of a respective one of the hardware systems of the respective set of hardware systems; identifying, through an application program interface (API) handler module executed on the intermediary system control circuit, one of multiple different shared APIs in initiating a corresponding one the shared resource applications to be activated in response to each application service request from the client POS systems and the hardware systems; forwarding, through the API handler module, responses from the respective shared applications, and sharing through the API handler module the shared resource applications across the multiple different sets of client POS systems and the plurality of different sets of hardware systems, wherein the shared resource applications are not specific to one of the different sets of client POS systems or one the plurality of different sets of hardware systems; and managing, through a state manager module executed by the intermediary system control circuit, state information corresponding to requests and responses between the client POS systems, the hardware systems and the shared resource applications, and distributing the relevant state information to a relevant one of the client POS systems, the hardware systems and the shared resource applications in implementing and completing transactions through the client POS systems.

In some embodiments, the method further comprises executing a plurality of state manager sub-modules, wherein each state manager sub-module corresponds to a shared service accessible through the different shared APIs; and wherein the managing the states comprises maintaining, through the plurality of state manager sub-modules, state information corresponding to at least a current state of each active transaction utilizing one of the shared APIs and being implemented through the sets of different client POS systems. The respective state information can be updated during each of multiple different phases of a transaction, and sharing the updated state information between one or more of a first client POS system, a first hardware system and a first shared resource application actively implementing the transaction. The updating the state information, in some embodiments, comprises: maintaining conditional error state information initiated by the first shared resource application in response to a conditional error event preventing completion of a shared service being performed by the first shared resource application; and communicating at least some of the conditional error state information to the first client POS system. The available states, of the state manager module corresponding to a particular shared resource application, are consistent across each of the multiple different sets of client POS systems that share and utilize the particular shared resource application and are independent of which of a particular client POS system of the different sets of client POS systems initiates the implementation of the particular shared resource application.

In some embodiments, the method further comprises: cooperatively operating multiple subsets of the shared resource APIs to implement a respective one of multiple corresponding shares services on behalf of at least one of the client POS systems and the hardware systems. The method in some implementations further comprises: maintaining, through the state manager module, conditional error state information initiated by a first shared resource application in response to a conditional error event preventing completion of an application service being performed by a first shared resource application; and receiving, through the state manager module, conditional error response information from a first client POS system based on the conditional error event, and updating the state information with the conditional error response information; and communicating, through the API handler module, the conditional error response information to the first shared resource application in advancing the application service being performed by the first shared resource application. Further, some embodiments include: receiving each application service request from each of the client POS systems and each of the hardware systems requesting to implement any one of the shared resource applications; identifying, through the API handler module, the requested shared resource application; routing, by the API handler module, relevant state information acquired from the state manager module to the requested shared resource application; receiving response information from the implementation of the requested shared resource application; and directing, by the state manager module, the response information to the requesting client POS system or hardware system.

A method, in some embodiments, further comprises: identifying, through the API handler module, a source of a first application service request and obtaining request information communicated with the first application service request; and identifying, based on the source of the first application service request and the request information communicated with the first application service request, a shared first resource application of the resource applications to be activated and forwarding at least some of the request information to be utilized by the first resource application. In some implementations a method further comprises: managing, through the hardware manager module, communications with the sets of hardware systems comprising communicating with each hardware system of a first set of hardware systems, regardless of a manufacturer, according to a first hardware communications protocol; and communicating with each hardware system of a second set of hardware systems, regardless of a manufacturer, according to a second hardware communications protocol. Each set of hardware systems, of the plurality different sets of hardware systems, is configured to perform a different physical function than the physical function of the other sets of hardware systems. In some implementations, the first hardware communications protocol comprises a printer communications protocol, and the second hardware communications protocol comprises a scanner communications protocol. the first set of hardware systems comprises printer systems, and the second set of hardware systems comprises product scanner systems. The printer systems can comprise two different printer systems from two different manufacturers, and each of the two different printer systems is configured to executing different printer APIs each utilizing a different printer local API protocol. The communicating with each hardware system of the first set of hardware systems comprises communicating with each different printer system according to the single printer communications protocol defined by a printer API library regardless of the printer API executed by the respective printer system such that each different printer system is configured to execute a transformation layer to transform communications received according to the printer communications protocol to a respective local printer API protocol executed on the specific printer and to transform communications from the local printer API protocol to the printer communications protocol prior to communicating from the printer system.

Some embodiments provide retail point-of-sale (POS) hardware management systems, comprising: an intermediary system control circuit configured to execute computer program modules comprising: a hardware management module configured to operate as an intermediary module between multiple different sets of client point-of-sale (POS) systems operated in association with a retail store, a plurality of different sets of hardware systems configured to be engaged by the client POS systems, and a plurality of shared resource applications. The hardware management module comprising a plurality of hardware manager sub-modules each corresponding to one of the sets of hardware systems. Each of the hardware manager sub-modules is configured to output communications and receive communications, for a corresponding one set of hardware systems of the plurality of different sets of the hardware systems, in accordance with a single one predefined hardware communications protocol, of a set of a plurality of predefined hardware communications protocols, corresponding to the set of hardware systems regardless of a type of hardware system or manufacturer of a respective one of the hardware systems of the respective set of hardware systems cooperatively operating with the hardware manager module.

In some embodiments, the hardware manager module, in managing communication with the sets of hardware systems, is configured to communicate with each hardware system of a first set of hardware systems, regardless of manufacturer, according to a first hardware communications protocol; and to communicate with each hardware system of a second set of hardware systems, regardless of manufacturer, according to a second hardware communications protocol. Each set of hardware systems, of the plurality different sets of hardware systems, is configured to perform a different physical function than the physical function of the other sets of hardware systems. The first hardware communications protocol comprises a printer communications protocol, and the second hardware communications protocol comprises a scanner communications protocol. The first set of hardware systems comprises printer systems, and the second set of hardware systems comprises product scanner systems.

The printer systems, in some implementations, comprise at least two different printer systems from two different manufacturers, and each of the two different printer systems is configured to execute different printer APIs each utilizing a different local printer API protocol. Further, the hardware manager module can be configured to communicate with each different printer system according to the single printer communications protocol defined by a printer API library regardless of the printer API executed by the respective printer system such that each different printer system is configured to execute a transformation layer to transform communications received according to the printer communications protocol to a respective local printer API protocol executed on the specific printer and to transform communications from the local printer API protocol to the printer communications protocol prior to communicating to the retail network intermediary system. The hardware management system, in some instances, further comprises the at least two different printer systems. A first printer system of the at least two different printer systems comprises a first transformation library accessed by a respective first transformation layer of the first printer system. The first transformation library defines translations of a set of print commands in accordance with the printer communications protocol to a corresponding set of print commands in accordance with a first local API protocol utilized internal to the first printer system, and the first transformation library defines translations from a set of local printer responses in accordance with the first local API protocol to a corresponding set of printer responses in accordance with the printer communications protocol.

Some embodiments further comprise: a protocol database storing multiple sets of hardware communications protocol libraries, wherein each set of predefined hardware communications protocol libraries corresponds to one of the plurality of different sets of hardware systems; and a central control circuit communicatively coupled with the protocol database over a distributed communications network. The central control circuit is configured to: receive an instruction to enable use of an additional hardware system; identify from the instruction that the additional hardware system is associated with a first set of hardware systems of the plurality of hardware systems; causes a first hardware communications library, of the multiple sets of hardware communications protocol libraries and corresponding to the first set of hardware systems, to be communicated over the distributed network to a third party hardware system distributor, wherein the additional hardware system utilizes a different local hardware API protocol that is different than: the first predefined hardware communications protocol corresponding to the first set of hardware systems, and other local hardware API protocols utilized by one or more other hardware systems of the first set of hardware systems; and update a listing of the first set of hardware systems available for use by the one or more POS systems to include the additional hardware system without modifying the first predefined hardware communications protocol corresponding to the first set of hardware systems.

In some embodiments, the hardware management system further comprises: a protocol database storing multiple sets of hardware communications protocol libraries, wherein each set of predefined hardware communications protocol libraries corresponds to one of the plurality of different sets of hardware systems; and a central control circuit communicatively coupled with the protocol database over a distributed communications network. The central control circuit is configured to: receive an instruction that a first predefined hardware communications protocol, associated with a first set of hardware systems, has been updated; cause an updated first hardware communications library, corresponding to the updated first predefined hardware communications protocol, to be communicated to each of multiple third party hardware system distributors that are each associated with one of the first set of hardware systems without modifying the updated first predefined hardware communications protocol corresponding to the first set of hardware systems. In some implementations, the hardware manager module utilizes the updated first predefined hardware communications protocol in subsequent communications with each of the hardware systems of the first set of hardware systems without changes to local hardware API protocols utilized on the different hardware systems of the first set of hardware systems.

The hardware management module, in some embodiments, is further configured to: receive a response communication from a first hardware system implementing a first hardware function, wherein the response communication is in accordance with a first predefined hardware communications protocol of the set of predefined hardware communications protocols, extract state information from the response communication, and forward the state information to a state manager module that is configured to distribute the state information to a shared resource application that is shared by the multiple different sets of client POS systems operated in association with the retail store.

Further, some embodiments, provide methods of managing hardware systems of a retail point-of-sale (POS) system. Some of these methods comprises: operating a hardware manager module, implemented through an intermediary system control circuit, as an intermediary module between multiple different sets of client point-of-sale (POS) systems operated in association with a retail store, a plurality of different sets of hardware systems configured to be engaged by the client POS systems, and a plurality of shared resource applications; executing a plurality of hardware manager sub-modules that each correspond to a single one of the sets of hardware systems; for each set of hardware systems of the plurality of different sets of the hardware systems, outputting communications from a corresponding one of the hardware manager sub-modules to the respective set of hardware systems and receiving communications at the corresponding hardware manager sub-module from the respective set of hardware systems in accordance with a single one predefined hardware communications protocol, of a set of a plurality of predefined hardware communications protocols, regardless of a type of hardware system or manufacturer of a respective one of the hardware systems of the respective set of hardware systems cooperatively operating with the hardware manager module. Some embodiments further comprise: managing communications, through the hardware manager module, with the sets of hardware systems to communicate with each hardware system of a first set of hardware systems, regardless of manufacturer, according to a first hardware communications protocol; and to communicate with each hardware system of a second set of hardware systems, regardless of manufacturer, according to a second hardware communications protocol; and wherein each set of hardware systems, of the plurality different sets of hardware systems, is configured to perform a different physical function than the physical function of the other sets of hardware systems.

In some methods the first hardware communications protocol comprises a printer communications protocol, and the second hardware communications protocol comprises a scanner communications protocol, and the first set of hardware systems comprises printer systems, and the second set of hardware systems comprises product scanner systems. Some methods in managing the communications comprise:

communicating, through the hardware manager module, with each of two different printer systems according to the single printer communications protocol defined by a printer API library regardless of the printer API executed by the respective printer system such that each different printer system is configured to execute a transformation layer to transform communications received according to the printer communications protocol to a respective local printer API protocol executed on the specific printer and to transform communications from the local printer API protocol to the printer communications protocol prior to communicating to the retail network intermediary system. In some embodiments, one or more methods comprise at least two different printer systems, wherein a first printer system of the at least two different printer systems comprises a first transformation library accessed by a respective first transformation layer of the first printer system, wherein the first transformation library defines translations of a set of print commands in accordance with the printer communications protocol to a corresponding set of print commands in accordance with a first local API protocol utilized internal to the first printer system, and the first transformation library defines translations from a set of local printer responses in accordance with the first local API protocol to a corresponding set of printer responses in accordance with the printer communications protocol.

Some methods further comprise storing, in a protocol database, multiple sets of hardware communications protocol libraries, wherein each set of predefined hardware communications protocol libraries corresponds to one of the plurality of different sets of hardware systems; receiving an instruction to enable use of an additional hardware system; identifying from the instruction that the additional hardware system is associated with a first set of hardware systems of the plurality of hardware systems; causing a first hardware communications library, of the multiple sets of hardware communications protocol libraries and corresponding to the first set of hardware systems, to be communicated over the distributed network to a third party hardware system distributor, wherein the additional hardware system utilizes a different local hardware API protocol that is different than: the first predefined hardware communications protocol corresponding to the first set of hardware systems, and other local hardware API protocols utilized by one or more other hardware systems of the first set of hardware systems; and updating a listing of the first set of hardware systems available for use by the one or more POS systems to include the additional hardware system without modifying the first predefined hardware communications protocol corresponding to the first set of hardware systems. Some embodiments include: storing, in a protocol database, multiple sets of hardware communications protocol libraries, wherein each set of predefined hardware communications protocol libraries corresponds to one of the plurality of different sets of hardware systems; receiving an instruction that a first predefined hardware communications protocol, associated with a first set of hardware systems, has been updated; causing an updated first hardware communications library, corresponding to the updated first predefined hardware communications protocol, to be communicated to each of multiple third party hardware system distributors that are each associated with one of the first set of hardware systems without modifying the updated first predefined hardware communications protocol corresponding to the first set of hardware systems.

In some embodiments, the method further comprises: utilizing, through the hardware manager module, the updated first predefined hardware communications protocol in subsequent communications with each of the hardware systems of the first set of hardware systems without changes to local hardware API protocols utilized on the different hardware systems of the first set of hardware systems. Further, some embodiments include: receiving a response communication from a first hardware system implementing a first hardware function, wherein the response communication is in accordance with a first predefined hardware communications protocol of the set of predefined hardware communications protocols, extracting state information from the response communication, and forwarding the state information to a state manager module that is configured to distribute the state information to a shared resource application that is shared by the multiple different sets of client POS systems operated in association with the retail store.

The networked retail point of sale system 100 provides numerous advantages as described above. Further, the networked retail point of sale system 100 and/or network intermediary system 114 significantly reduces retail store associate training in part because of the common interfaces and functionally across the different client POS systems utilizing the shared resource services and/or shared view components providing common GUIs. The intermediate operability and streamlined cooperation between client POS systems, the hardware systems and the shared resource services further reduces potential errors while improving speed of use and/or checkout of customers. The shared resources greatly reduced the cost to implement, maintain and update. Additionally, the networked aspect of the network intermediary system 114 enables service from substantially anywhere that can access the system, including in some embodiments substantially any internet accessible computer or server, while providing operational intelligence. The network intermediary system 114 effectively makes the POS process substantially hardware system agnostic and/or independent. Still further, the system is fully scalable and maintainable through the modularity of the system and the ease of adding and removing components without the need to take down, reconfigure, update and/or redesign other components and/or aspects of the system.

In some embodiments, the networked retail point of sale system 100 comprises a micro frontend to create abstraction and modularity to providing POS services that can be hosted from substantially anywhere, including on mobile systems through store associate facing APPs for multiple different POS applications utilized in different POS systems and/or departments of a retail store that utilize different POS functionality and/or services. For example, at least the network intermediary system 114 can be hosted on substantially any POS system (e.g., store associate operated register, customer self-checkout register, and outlying client POS systems). Still further, in some embodiments, the networked retail point of sale system 100 is configured to operate via omni channel, which enables support of at least mobile shopping applications (e.g., Scan and Go Micro frontend on .com APP).

Examples of at least some of the shared resource applications 120 and the utilization of the shared resource applications are further described in co-pending U.S. patent application Ser. No. 15/106,658, filed Jun. 20, 2016, which is incorporated herein by reference in its entirety.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A networked retail point of sale system, comprising:
a retail network intermediary system communicatively coupled, over a distributed computer network, with multiple different sets of client point-of-sale (POS) systems operated in association with a retail store, a plurality of different sets of hardware systems configured to be engaged by the client POS systems, and a plurality of shared resource applications, wherein the retail network intermediary system operates between the client POS systems and the hardware systems, between the client POS systems and the shared resource applications, and between the hardware systems and the shared resource applications, and wherein the retail network intermediary system is reusable across the multiple different sets of client POS systems and comprises an intermediary system control circuit configured to execute computer program modules, wherein:
the intermediary system control circuit is configured to execute a hardware manager module configured to output communications and receive communications, for each set of hardware systems of the plurality of different sets of the hardware systems, to a single one predefined hardware communications protocol of a set of a plurality of predefined hardware communications protocols regardless of a type of hardware system or manufacturer of a respective one of the hardware systems of the respective set of hardware systems;
the intermediary system control circuit is configured to execute an application program interface (API) handler module configured to implement one of multiple different shared APIs to initiate a corresponding one of the shared resource applications to be activated in response to each application service request from the client POS systems and the hardware systems, and forward responses from the respective shared resource applications, wherein the shared resource applications are shared through the API handler module across the multiple different sets of client POS systems and the plurality of different sets of hardware systems and the shared resource applications are not specific to one of the different sets of client POS systems or one of the plurality of different sets of hardware systems; and
the intermediary system control circuit is configured to execute a state manager module configured to manage state information corresponding to requests and responses between the client POS systems, the hardware systems and the shared resource applications of active transactions and comprising state information generated by one or more of the shared resource applications utilized in executing at least part of each of the active transactions, and distribute relevant portions of the state information to a relevant one of the client POS systems, the hardware systems and the shared resource applications in implementing and completing the transactions through the client POS systems; and
wherein the API handler module comprises API handler sub-modules each comprising multiple subsets of the shared APIs that are cooperatively operated to implement a respective one of multiple corresponding shared services on behalf of at least one of the client POS systems and the hardware systems, wherein the API handler sub-modules comprise one or more calls to corresponding shared resource APIs that trigger the respective one or more of the shared resource applications, and two or more of the API handler sub-modules comprise calls to a respective set of two or more sub-calls that each provide a call to one or more of the shared resource applications.

2. The networked retail point of sale system of claim 1, wherein the state manager module comprises a plurality of state manager sub-modules, wherein two or more of the state manager sub-modules correspond to the shared services activated through the different shared APIs activating respective ones of the shared resource applications implementing a respective one of the shared services, and each of the two or more of the state manager sub-modules is configured to maintain the state information corresponding to at least a current state of each active transaction utilizing the respective one of the shared resource applications; and
the plurality of state managers sub-modules comprises multiple hardware state manager sub-modules each corresponds to a different one of the plurality of different sets of hardware systems, and each of the multiple hardware state manager sub-modules corresponding to one of the sets of hardware systems is configured to maintain the state information corresponding to at least the current state of one or more hardware systems of the respective set of hardware systems.

3. The networked retail point of sale system of claim 2, wherein the state manager module updates the respective state information during each of multiple different phases of a transaction, and the updated state information is shared between one or more of a first client POS system, a first hardware system and a first shared resource application actively implementing the transaction.

4. The networked retail point of sale system of claim 3, wherein the state manager module, in updating the state information, is configured to maintain conditional error state information initiated by the first shared resource application in response to a conditional error event that is to be satisfied at the first client POS system and that prevents completion of one of the shared services being performed by the first shared resource application until satisfied, and the state manager module communicates at least some of the conditional error state information to the first client POS system.

5. The networked retail point of sale system of claim 2, wherein available states, of the state manager module corresponding to a particular shared resource application, are consistent across each of the multiple different sets of client POS systems that share and utilize the particular shared resource application and are independent of which of a particular client POS system of the different sets of client POS systems initiates the implementation of the particular shared resource application.

6. The networked retail point of sale system of claim 1, wherein multiple subsets of the shared APIs are cooperatively operated to implement a respective one of multiple corresponding shared services, of the shared services, on behalf of at least one of the client POS systems and the hardware systems, wherein the API handler module is configured to identify, in response to a trigger from first shared resource application, a second shared resource application, initiate a second shared API of the shared APIs to activate the second shared resource application and forward request information from the first shared resource application to the second shared resource application based on the trigger from the first shared resource application.

7. The networked retail point of sale system of claim 1, wherein the state manager module is configured to maintain conditional error state information initiated by a first shared resource application in response to a conditional error event to be satisfied prior to completion of an application service being performed by the first shared resource application and forward a portion of the error state information to a first client POS system of the client POS systems; and the state manager module is configured to receive conditional error response information from the first client POS system based on the conditional error event, update the state information with the conditional error response information to be subsequently shared with the first shared resource application;

wherein the API handler module is configured to communicate the conditional error response information to the first shared resource application for use by the first shared resource application in advancing toward completion the application service being performed by the first shared resource application.

8. The networked retail point of sale system of claim 1, wherein the API handler module is configured to receive each application service request from each of the client POS systems and each of the hardware systems requesting to implement any one of the shared resource applications, identify a requested shared resource application of the shared resource applications, route relevant state information acquired from the state manager module to the requested shared resource application, receive response information, and direct the response information to the requesting client POS system or hardware system.

9. The networked retail point of sale system of claim 1, wherein the API handler module is configured to identify a source of a first application service request and obtain request information communicated with the first application service request; and identify, based on the source of the first application service request and the request information communicated with the first application service request, a first shared resource application of the shared resource applications to be activated and forward at least some of the request information to be utilized by the first resource application.

10. The networked retail point of sale system of claim 1, wherein the hardware manager module, in managing communication with the sets of hardware systems, is configured to communicate with each hardware system of a first set of hardware systems, regardless of a manufacturer, according to a first hardware communications protocol; and to communicate with each hardware system of a second set of hardware systems, regardless of a manufacturer, according to a second hardware communications protocol; and wherein each set of hardware systems, of the plurality of different sets of hardware systems, is configured to perform a different physical function than the physical function of other sets of hardware systems of the plurality of different sets of hardware systems.

11. The networked retail point of sale system of claim 10, wherein the first hardware communications protocol comprises a printer communications protocol, and the second hardware communications protocol comprises a scanner communications protocol; and wherein the first set of hardware systems comprises printer systems, and the second set of hardware systems comprises product scanner systems.

12. The networked retail point of sale system of claim 11, wherein the printer systems comprise two different printer systems from two different manufacturers, and each of the two different printer systems is configured to executing different printer APIs each utilizing different local printer API protocol;

wherein the hardware manager module is configured to communicate with each printer system, of the printer systems, according to the single printer communications protocol defined by a printer API library regardless of the printer API executed by the respective printer system such that each printer system is configured to execute a transformation layer to transform communications received according to the printer communications protocol to a respective local printer API protocol executed on the specific printer and to transform communications from the local printer API protocol to the printer communications protocol prior to communicating to the retail network intermediary system.

13. A method of enabling a distributed, networked retail point of sale system, comprising:

operating a retail network intermediary system communicatively coupled, over a distributed computer network, with multiple different sets of client point-of-sale (POS) systems operated in association with a retail store, a plurality of different sets of hardware systems configured to be engaged by the client POS systems, and a plurality of shared resource applications; wherein the operating the retail network intermediary system comprises operating the retail network intermediary system between the client POS systems and the hardware systems, between the client POS systems and the shared resource applications, and between the hardware systems and the shared resource applications, and wherein the retail network intermediary system is reusable across the multiple different sets of client POS systems and comprises an intermediary system control circuit configured to execute computer program modules, wherein the operating the retail network intermediary system comprises:

executing, through the intermediary system control circuit, a hardware manager module in outputting communications and receiving communications, for each set of hardware systems of the plurality of different sets of the hardware systems, to a single one predefined hardware communication protocol of a set of a plurality of predefined hardware communications protocols regardless of a type or manufacturer of a respective one of the hardware systems of the respective set of hardware systems;

identifying, through an application program interface (API) handler module executed on the intermediary system control circuit, one of multiple different shared APIs in initiating a corresponding one the shared resource applications to be activated in response to each application service request from the client POS systems and the hardware systems; forwarding, through the API handler module, responses from the respective shared applications, and sharing through the API handler module the shared resource applications across the multiple different sets of client POS systems and the plurality of different sets of hardware systems, wherein the shared resource applications are not specific to one of the different sets of client POS systems or one the plurality of different sets of hardware systems;

managing, through a state manager module executed by the intermediary system control circuit, state information corresponding to requests and responses between the client POS systems, the hardware systems and the shared resource applications of active transactions and comprising the state information generated by one or more of the shared resource applications utilized in executing at least part of each of the active transactions, and distributing relevant portions of the state information to a relevant one of the client POS systems, the hardware systems and the shared resource applications in implementing and completing transactions through the client POS systems; and executing API handler sub-modules, of the API handler module, each comprising multiple subsets of the shared APIs that are cooperatively operated in implementing a respective one of multiple corresponding shared services on behalf of at least one of the client POS systems and the hardware systems, wherein executing the API handler sub-modules comprises implementing, for each of the API handler sub-modules, one or more calls to corresponding shared resource APIs that trigger the respective one or more of the shared resource applications, wherein two or more of the API handler sub-modules comprise calls to a respective set of two or more sub-calls that each provide a call to one or more of the shared resource applications.

14. The method of claim 13, further comprising:

executing a plurality of state manager sub-modules, wherein each state manager sub-module corresponds to the shared services activated through the different shared APIs activating respective ones of the shared resource applications implementing a respective one of the shared services; and wherein the managing the states comprises maintaining, through the plurality of state manager sub-modules, the state information corresponding to at least a current state of each active transaction utilizing the respective one of the shared APIs; and wherein the executing the plurality of state manager sub-modules further comprises executing multiple hardware state manager sub-modules, of the plurality of state managers sub-modules, each corresponds to a different one of the plurality of different sets of hardware systems, and each of the multiple hardware state manager sub-modules corresponding to one of the sets of hardware systems in maintaining the state information corresponding to at least the current state of one or more hardware systems of the respective set of hardware systems.

15. The method of claim 14, further comprising:

updating the respective state information during each of multiple different phases of a transaction, and sharing the updated state information between one or more of a first client POS system, a first hardware system and a first shared resource application actively implementing the transaction.

16. The method of claim 15, wherein the updating the state information comprises maintaining conditional error state information initiated by the first shared resource application in response to a conditional error event that is to be satisfied at the first client POS system and that prevents completion of one of the shared services being performed by the first shared resource application until satisfied; and communicating at least some of the conditional error state information to the first client POS system.

17. The method of claim 14, wherein available states, of the state manager module corresponding to a particular shared resource application, are consistent across each of the multiple different sets of client POS systems that share and utilize the particular shared resource application and are independent of which of a particular client POS system of the different sets of client POS systems initiates the implementation of the particular shared resource application.

18. The method of claim 13, further comprising:

cooperatively operating multiple subsets of the shared resource APIs to implement a respective one of multiple corresponding shared services, of the shared services, on behalf of at least one of the client POS systems and the hardware systems.

19. The method of claim 13, further comprising:

maintaining, through the state manager module, conditional error state information initiated by a first shared resource application in response to a conditional error event to be satisfied prior to completion of an application service being performed by the first shared resource application and forwarding a portion of the error state information to a first client POS system of the client POS systems; and receiving, through the state manager module, conditional error response information from the first client POS system based on the conditional error event, and updating the state information with the conditional error response information; and communicating, through the API handler module, the conditional error response information to the first shared resource application for use by the first shared resource application in advancing toward completion the application service being performed by the first shared resource application.

20. The method of claim 13, further comprising:

receiving each application service request from each of the client POS systems and each of the hardware systems requesting to implement any one of the shared resource applications;

identifying, through the API handler module, a requested shared resource application of the shared resource applications;

routing, by the API handler module, relevant state information acquired from the state manager module to the requested shared resource application;

receiving response information from the implementation of the requested shared resource application; and directing, by the state manager module, the response information to the requesting client POS system or hardware system.

21. The method of claim 13, further comprising:

identifying, through the API handler module, a source of a first application service request and obtaining request information communicated with the first application service request; and identifying, based on the source of the first application service request and the request information communicated with the first application service request, a first shared resource application of the shared resource applications to be activated and forwarding at least some of the request information to be utilized by the first shared resource application.

22. The method of claim 13, further comprising:

managing, through the hardware manager module, communications with the sets of hardware systems comprising communicating with each hardware system of a first set of hardware systems, regardless of a manufacturer, according to a first hardware communications protocol; and communicating with each hardware system of a second set of hardware systems, regardless of a manufacturer, according to a second hardware communications protocol; and wherein each set of hardware systems, of the plurality of different sets of hardware systems, is configured to perform a different physical function than the physical function of other sets of hardware systems of the plurality of different sets of hardware systems.

23. The method of claim 22, wherein the first hardware communications protocol comprises a printer communications protocol, and the second hardware communications protocol comprises a scanner communications protocol; and wherein the first set of hardware systems comprises printer systems, and the second set of hardware systems comprises product scanner systems.

24. The method of claim 23, wherein the printer systems comprise two different printer systems from two different manufacturers, and each of the two different printer systems is configured to executing different printer APIs each utilizing a different printer local API protocol;

wherein the communicating with each hardware system of the first set of hardware systems comprises communicating with each printer system, of the printer systems, according to the single printer communications protocol defined by a printer API library regardless of the printer API executed by the respective printer system such that each printer system is configured to execute a transformation layer to transform communications received according to the printer communications protocol to a respective local printer API protocol executed on the specific printer and to transform communications from the local printer API protocol to the printer communications protocol prior to communicating from the printer system.

\* \* \* \* \*